(12) United States Patent
Heath

(10) Patent No.: US 7,219,862 B2
(45) Date of Patent: May 22, 2007

(54) SWAY BRACE CLAMP AND CONNECTOR ASSEMBLY

(75) Inventor: Richard W. Heath, Yorba Linda, CA (US)

(73) Assignee: Nibco Incorporated, Elkhart, IN (US)

( * ) Notice: Subject to any disclaimer, the term of this patent is extended or adjusted under 35 U.S.C. 154(b) by 0 days.

(21) Appl. No.: 11/058,960

(22) Filed: Feb. 15, 2005

(65) Prior Publication Data
US 2005/0133680 A1 Jun. 23, 2005

Related U.S. Application Data

(62) Division of application No. 10/260,473, filed on Sep. 26, 2002, now Pat. No. 6,896,226.

(60) Provisional application No. 60/404,338, filed on Aug. 16, 2002.

(51) Int. Cl.
F16L 3/00 (2006.01)
F16L 3/08 (2006.01)

(52) U.S. Cl. .................. 248/62; 248/74.4; 248/317

(58) Field of Classification Search .............. 248/62, 248/63, 65, 68, 73, 74.1, 74.2, 74.4, 231.51, 248/231.61, 222.12, 222.52, 291.1, 316.1, 248/316.5, 317, 316.6; 211/60.1; 403/362
See application file for complete search history.

(56) References Cited

U.S. PATENT DOCUMENTS

| 545,775 | A | | 9/1895 | Clark |
| 665,274 | A | | 1/1901 | Seaman |
| 768,122 | A | | 8/1904 | Hamilton et al. |
| 1,026,396 | A | | 5/1912 | Hutton |
| 1,073,679 | A | | 9/1913 | Haussman |
| 1,082,993 | A | | 12/1913 | Beattie |
| 1,132,999 | A | | 3/1915 | Beers |
| 1,241,126 | A | * | 9/1917 | Kidd .................. 248/74.4 |
| 1,289,995 | A | | 12/1918 | Wrage |
| 1,832,996 | A | | 11/1931 | Percival et al. |
| 2,069,163 | A | * | 1/1937 | Hibner, Jr. ............ 248/74.4 |
| 2,477,855 | A | | 8/1949 | Beach |
| 2,907,812 | A | | 10/1959 | Sorflaten et al. |
| 2,918,520 | A | | 12/1959 | Stevens |

(Continued)

FOREIGN PATENT DOCUMENTS

DE 1274708 8/1968

Primary Examiner—Carl D. Friedman
Assistant Examiner—Tan Le
(74) Attorney, Agent, or Firm—Knobbe, Martens, Olson & Bear, LLP

(57) ABSTRACT

It is one advantage of the invention to provide an interlocking swivel connector for attachment to an existing system supporting a suspended load below a ceiling, beam or floor without the need to disassemble or disconnect any components of the system. The connector is easy to install and inexpensive to manufacture. The connector is removably or permanently attachable to a sway brace clamp or attachment to form a connector-clamp assembly. The assembly is capable of reliably supporting heavy loads against adverse sway and seismic disturbances. It is another advantage of the invention to provide a sway cable brace clamp or fitting for securely attaching to a bracing cable and for supporting a suspended load below a ceiling, beam or floor. The cable clamp is easy to install and inexpensive to manufacture. The cable clamp is capable of reliably supporting heavy loads against adverse sway and seismic disturbances.

24 Claims, 39 Drawing Sheets

U.S. PATENT DOCUMENTS

| | | |
|---|---|---|
| 3,047,263 A | 7/1962 | Mittenzwei |
| 3,177,542 A | 4/1965 | James |
| 3,497,249 A | 2/1970 | Bois |
| 3,792,829 A | 2/1974 | Fickett |
| 3,841,196 A | 10/1974 | Tinnerman |
| 4,014,504 A | 3/1977 | Sachs |
| 4,029,276 A | 6/1977 | Zielie |
| 4,036,546 A | 7/1977 | Thompson et al. |
| 4,065,218 A | 12/1977 | Biggane |
| 4,078,752 A | 3/1978 | Kindorf |
| 4,132,146 A | 1/1979 | Uhlig |
| 4,213,589 A | 7/1980 | Pierron et al. |
| 4,455,716 A | 6/1984 | Leonardo |
| 4,475,843 A | 10/1984 | Wyler |
| 4,501,400 A | 2/1985 | Leonardo |
| 4,524,936 A | 6/1985 | Hurtubise |
| 4,624,374 A * | 11/1986 | Murtaugh .................. 211/60.1 |
| 4,696,459 A | 9/1987 | Woltron et al. |
| 4,735,386 A | 4/1988 | Richards |
| 4,746,239 A | 5/1988 | Marquardt |
| 4,783,029 A | 11/1988 | Geppert et al. |
| 4,799,444 A | 1/1989 | Lisowski |
| 4,860,980 A | 8/1989 | Michot |
| 4,895,338 A | 1/1990 | Froutzis |
| 5,024,404 A * | 6/1991 | Ballard ........................ 248/62 |
| 5,024,405 A | 6/1991 | McGuire |
| 5,145,132 A | 9/1992 | Kirschner |
| 5,188,317 A | 2/1993 | Roth |
| 5,307,752 A | 5/1994 | Perrault et al. |
| 5,412,843 A | 5/1995 | Krongauz et al. |
| 5,413,063 A | 5/1995 | King |
| D365,512 S | 12/1995 | Mason |
| 5,683,115 A | 11/1997 | Hill |
| 5,699,993 A | 12/1997 | Hill et al. |
| 6,050,035 A | 4/2000 | Thompson et al. |
| 6,247,274 B1 | 6/2001 | Thompson et al. |
| 6,273,372 B1 | 8/2001 | Heath |
| 6,415,560 B1 | 7/2002 | Rinderer |
| 6,421,965 B2 | 7/2002 | Thompson et al. |
| 6,517,030 B2 | 2/2003 | Heath |
| RE38,075 E | 4/2003 | Thompson et al. |
| 6,708,930 B2 | 3/2004 | Heath |
| 6,726,159 B2 * | 4/2004 | Brake ........................ 248/154 |
| 6,896,226 B2 * | 5/2005 | Heath ......................... 248/62 |
| 6,953,174 B2 * | 10/2005 | Heath ......................... 248/62 |
| 7,097,141 B2 | 8/2006 | Heath |
| 2005/0189452 A1 * | 9/2005 | Heath ......................... 248/62 |

* cited by examiner

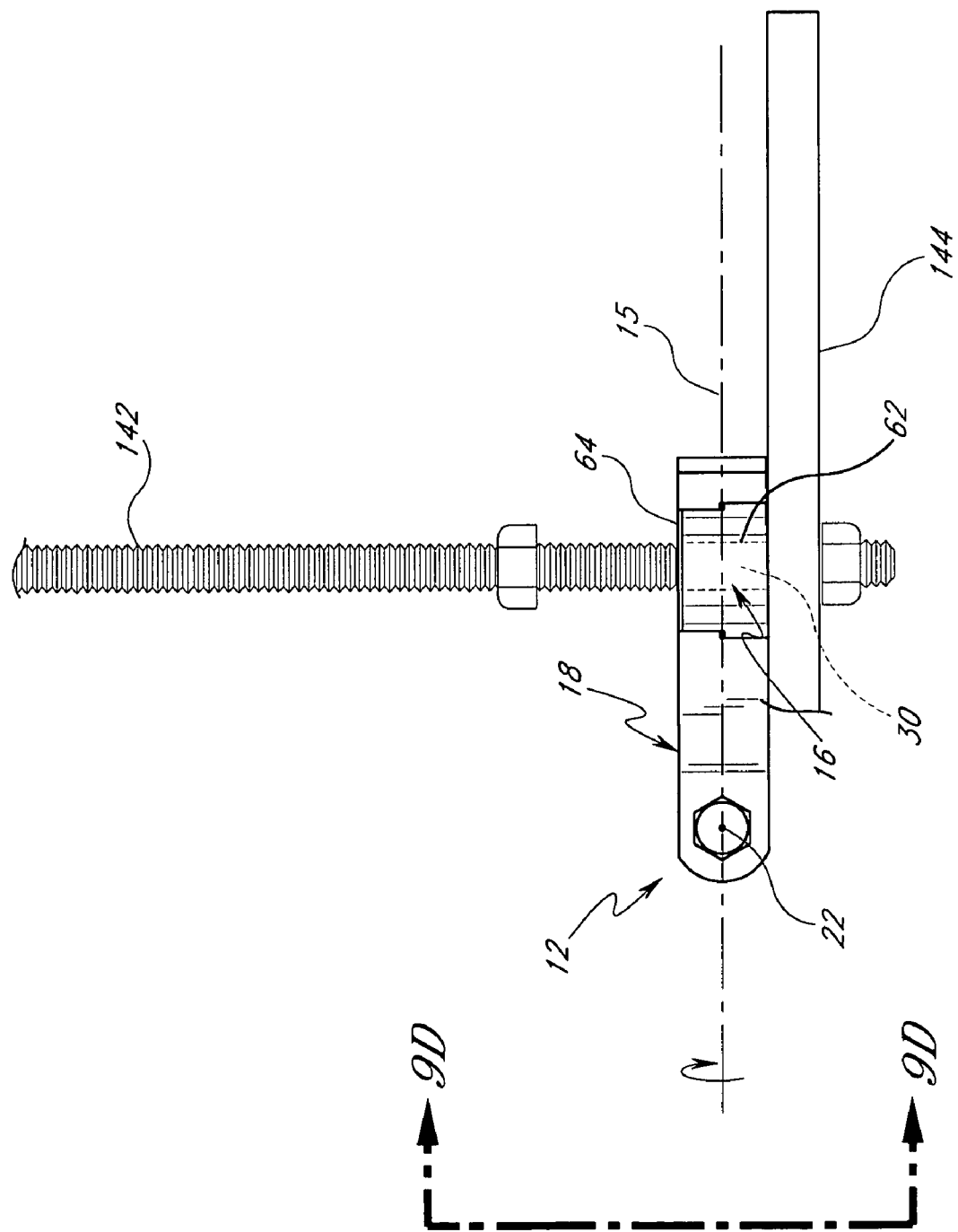

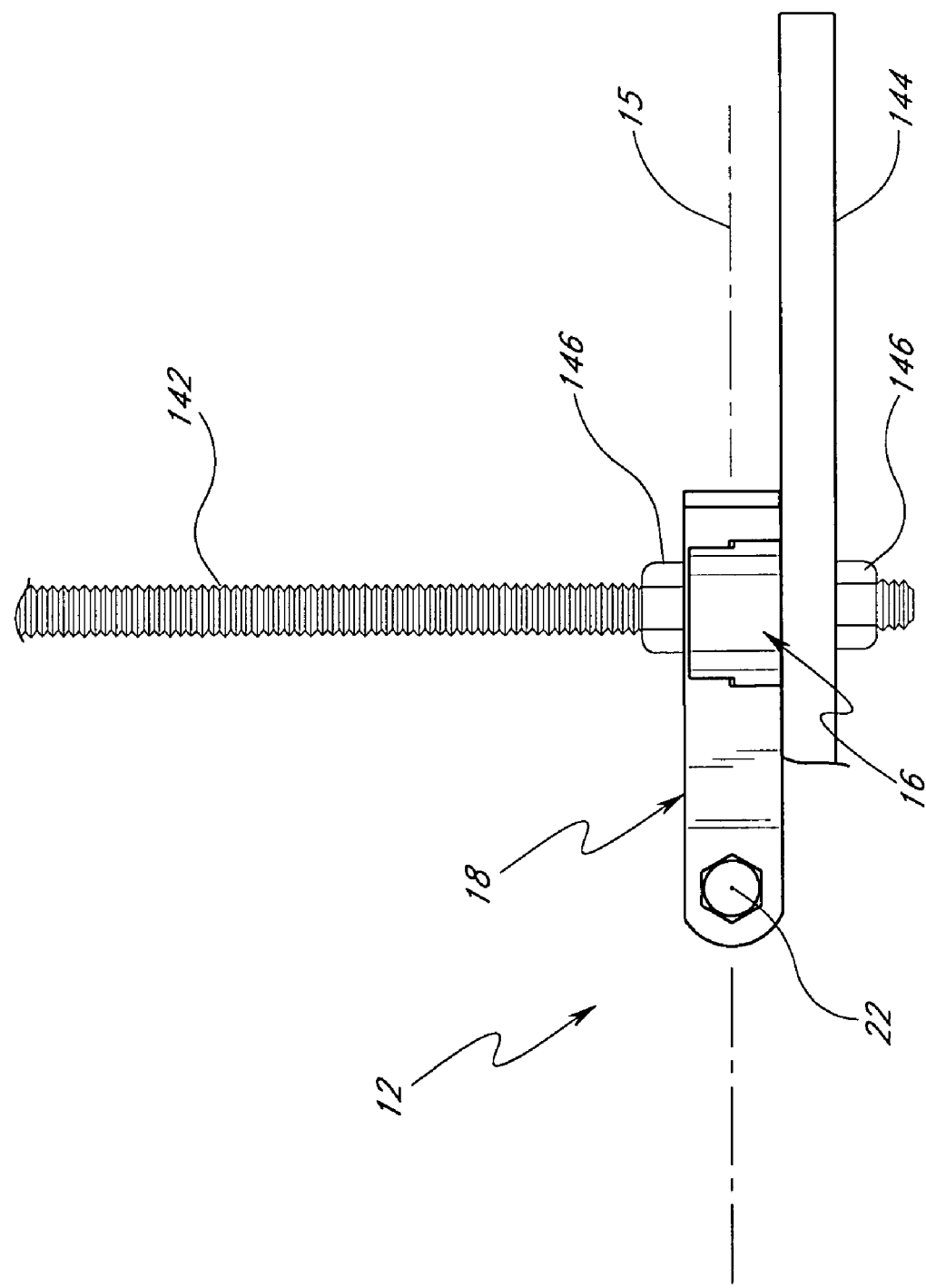

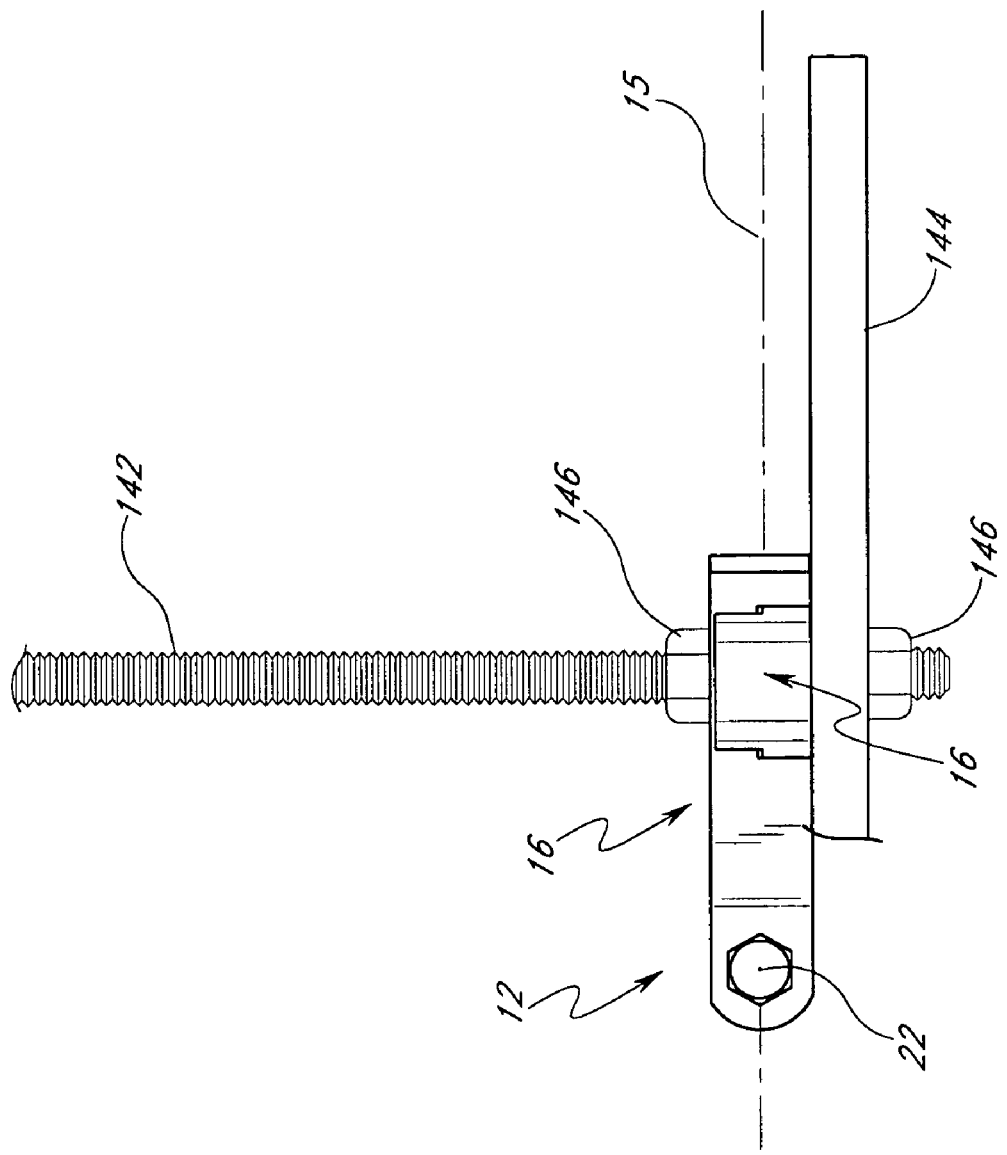

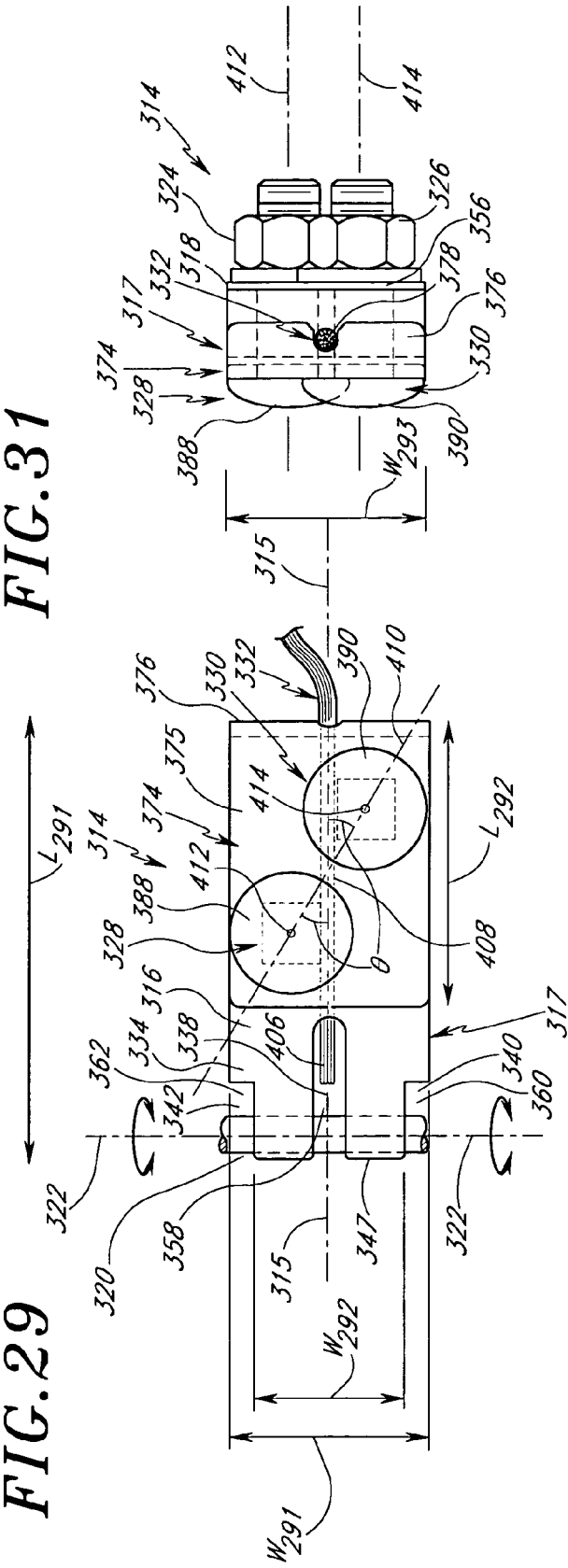
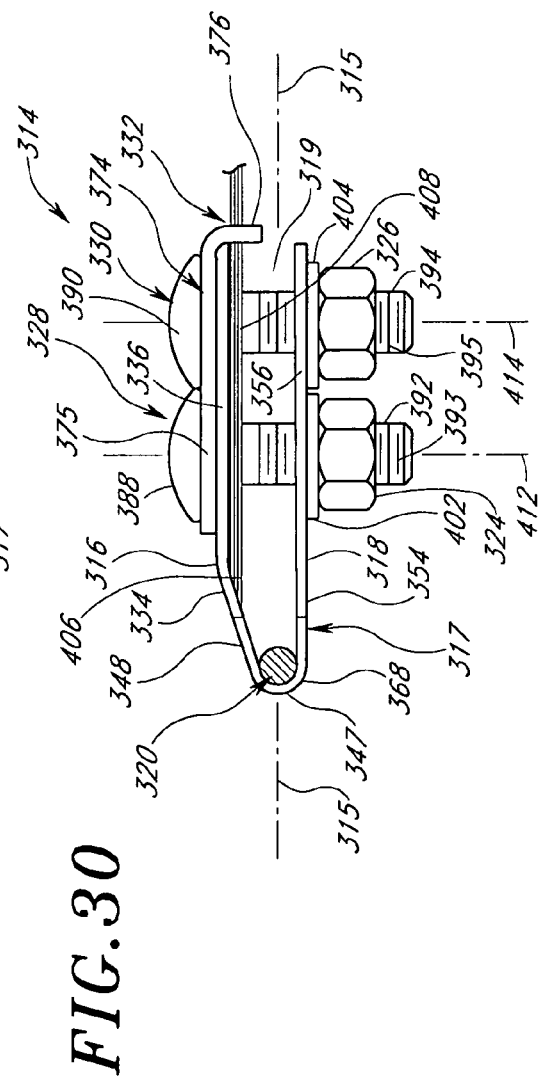
FIG.29  FIG.30  FIG.31

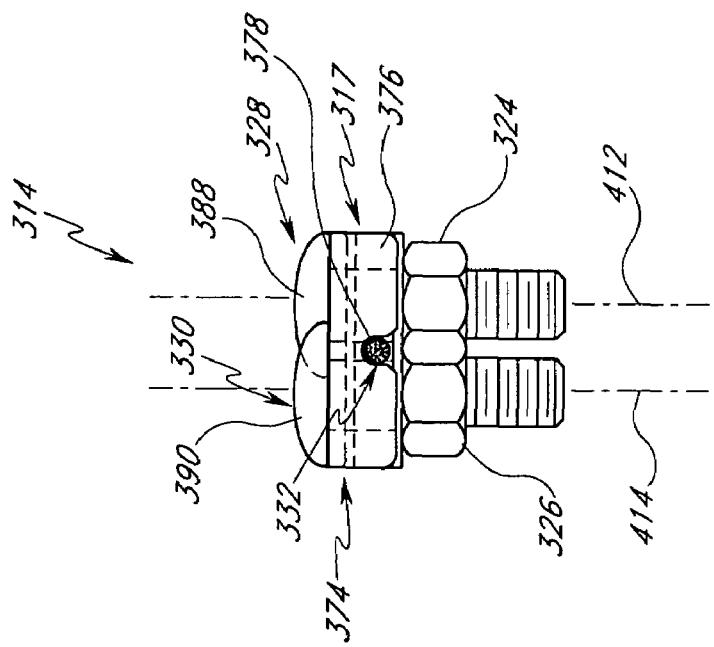
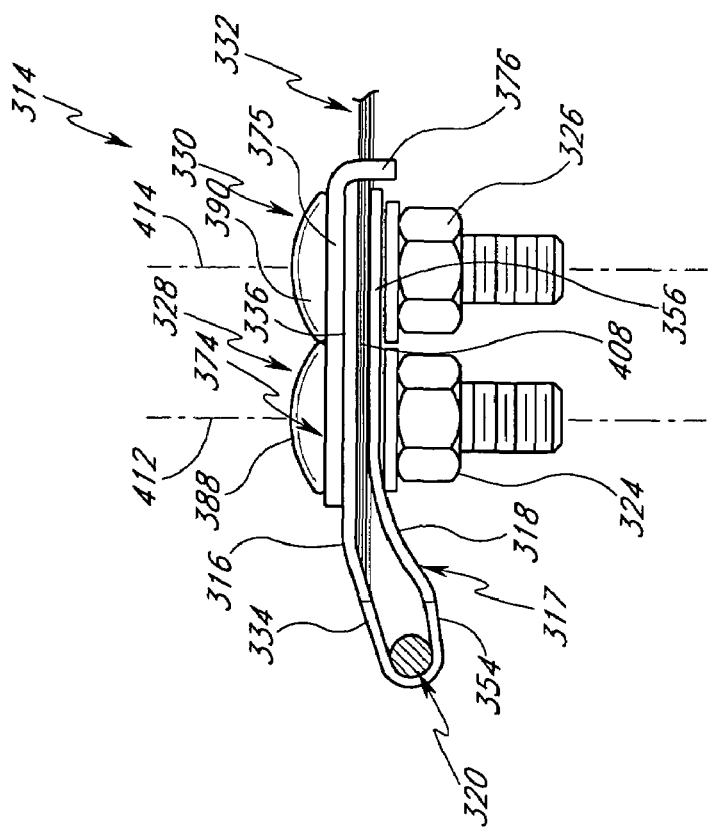

SWAY BRACE CLAMP AND CONNECTOR ASSEMBLY

RELATED APPLICATIONS

This application is a divisional of U.S. Pat. application Ser. No. 10/260,473, filed Sept. 26, 2002, now U.S. Pat. No. 6,896226 B2, issued May 24, 2005, which claims the benefit of U.S. Provisional Application Ser. No. 60/404,338, filed Aug. 16, 2002, the entirety of each one of which is hereby incorporated by reference herein.

BACKGROUND OF THE INVENTION

1. Field of the Invention

The invention relates generally to devices for bracing pipes and other loads suspended below ceilings, floors, beams and the like, against sway and seismic disturbances, and in particular to a bracing clamp and connector assembly that permits fast attachment to hanger rods and the like without the need for disassembly and reliably sustains heavy loads.

2. Description of the Related Art

There are many products and assemblies thereof utilized by building, plumbing and electrical contractors for bracing and supporting pipes, ducts, sprinkler systems, fans, air-conditioners, electrical cables, communication lines and other loads from ceilings, beams and floors. These products include clamps, braces, cables, hooks, straps, hangers, plates, brackets, among other items.

In many instances, a clamp is used to connect one end of a brace, such as a bracing pipe or bracing cable, to a suspended load while the other end is connected to an overlying supporting surface such as a ceiling, beam or floor. Typically, the clamp is connected to a rod extending below the supporting surface and attached to it. The other end of the rod is connected to a hanger or other element supporting the suspended load.

In some cases, the rod must be disconnected from the hanger which is thereby removed from the load before the clamp can be connected to the rod. The various items are then reconnected or reassembled. Disadvantageously, this adds to the time and labor involved in the installation, and hence to the cost of the installation. Moreover, and undesirably, many conventional connectors used to attach the clamp to the rod can be expensive, difficult to install and not capable of reliably sustaining heavy loads.

In some installations, a cable brace is used to support a suspended load. Typically, a cable brace attachment is used to connect one end of the bracing cable to the load. Such attachments may also be used to connect the opposing end of the bracing cable to an overlying supporting surface such as a ceiling, beam or floor. Disadvantageously, the cable brace attachments commonly used in the industry are difficult to install and expensive. Additionally, and undesirably, conventional cable brace attachments may not be suited for reliably sustaining heavy loads.

SUMMARY OF THE INVENTION

It is one advantage of the invention to provide an interlocking swivel connector for attachment to an existing system supporting a suspended load below a ceiling, beam or floor without the need to disassemble or disconnect any components of the system. The connector is easy to install and inexpensive to manufacture. The connector is removably or permanently attachable to a sway brace clamp or attachment to form a connector-clamp assembly. The assembly is capable of reliably supporting heavy loads against adverse sway and seismic disturbances.

It is another advantage of the invention to provide a sway cable brace clamp or fitting for securely attaching to a bracing cable and for supporting a suspended load below a ceiling, beam or floor. The cable clamp is easy to install and inexpensive to manufacture. The cable clamp is capable of reliably supporting heavy loads against adverse sway and seismic disturbances.

In accordance with one embodiment, a connector is provided for retrofit attachment to a threaded rod extending from a support structure for supporting a suspended load against sway and seismic disturbances. The connector generally comprises a longitudinal axis and a pivot pin defining a rotation axis generally perpendicular to the longitudinal axis, a first arm pivotable about the rotation axis and a second arm pivotable about the rotation axis. The first arm generally comprises a proximal section, a medial section and a distal section. The first arm proximal section is pivotably attached to the pivot pin. The first arm medial section is angled relative to the proximal section of the first arm and has a slot extending generally upwards from a lower edge thereof. The first arm distal section is angled relative to the medial section of the first arm and has a slot extending generally upwards from a lower edge thereof. The first arm distal section and the medial section of the first arm are connected at a junction to form a curved wall between the slots of the first arm. The second arm generally comprises a proximal section, a medial section and a distal section. The second arm proximal section is pivotably attached to the pivot pin. The second arm medial section is angled relative to the proximal section of the second arm and has a slot extending generally downwards from an upper edge thereof. The second arm distal section is angled relative to the medial section of the second arm and has a slot extending generally downwards from an upper edge thereof. The second arm distal section and the medial section of the second arm are connected at a junction to form a curved wall between the slots of the second arm. Advantageously, the arms are pivotable to interlock and mate with one another such that the slot of the medial section of the first arm is aligned with the slot of the medial section of the second arm and the slot of the distal section of the first arm is aligned with the slot of the distal section of the second arm to form a passage bounded by the curved walls and flanked by the slots for capturing the rod therebetween.

In accordance with another embodiment, a seismic connector is provided for retrofit attachment to a support element of an installation. The connector generally comprises a pivotable first arm and a pivotable second arm. The first arm generally comprises a first curved section flanked by a first slot and a second slot of the first arm. The second arm generally comprises a second curved section flanked by a first slot and a second slot of the second arm. Advantageously, interlocking of the slots of the first arm with the second arm to receive selected portions of the second arm within the slots of the first arm and interlocking of the slots of the second arm with the first arm to receive selected portions of the first arm within the slots of the second arm forms an opening generally circumscribed by the first and second curved sections for receiving the support element without requiring disassembly of the installation.

In accordance with yet another embodiment, a connector is provided for retrofit attachment to a support. The connector generally comprises a first arm and a second arm. The first arm has a proximal end and a distal end and a first curved wall therebetween. The first arm includes a first slot having a base face and positioned between the first curved wall and the proximal end of the first arm. The second arm has a proximal end and a distal end and a second curved wall therebetween. The second arm includes a first slot having a base face and positioned between the second curved wall and the proximal end of the second arm. Advantageously, the arms are interlockable such that the base faces of the slots abut against one another to form a passage generally bounded by the curved walls for receiving the support.

In accordance with one embodiment, a sway brace assembly is provided. The assembly generally comprises a connector for retrofit attachment to a rod extending from a support surface and an attachment device coupled to the connector for attaching the connector to a brace. The connector generally comprises a first arm and a second arm. The first arm has a proximal end, a distal end, a first angled section therebetween and a first slot positioned between the first angled section and the proximal end of the first arm. The second arm has a proximal end, a distal end, a second angled section therebetween and a first slot positioned between the second angled section and the proximal end of the second arm. Advantageously, at least one of the arms is pivotable about a rotation axis of the connector so that when the arms mate at least a portion of each of the arms is received in a corresponding one of the slots, the slots are aligned with one another and the angled sections form a passage for receiving the rod therebetween.

In accordance with one aspect, a method is provided of retrofittingly attaching a seismic connector to a rod of an already existing support installation without requiring disassembly of the installation. The installation generally comprises the rod extending from a support surface and attached to a hanger supporting a suspended load. The method includes the step of positioning a first arm of the connector proximate to the rod so that a first curved wall of the first arm generally circumscribes a portion of the rod. The first curved wall is flanked by a pair of slots on the first arm. The connector is rotated in a first direction about a generally longitudinal axis of the connector. A second arm of the connector is pivoted towards the first arm. The second arm has a second curved wall flanked by a pair of slots on the second arm. The connector is rotated in a second direction generally opposite to the first direction about the longitudinal axis so that the arms mate and corresponding slots of the arms are aligned to form a passage comprising the curved walls which receives the rod.

In accordance with one embodiment, a sway brace cable clamp is provided for supporting a suspended load against sway and seismic disturbances. The cable clamp generally comprises a longitudinal axis and a pivot pin defining a rotation axis generally perpendicular to the longitudinal axis, a main body portion pivotable about the rotation axis, a reinforcement plate, a first bolt and a second bolt spaced from one another and a first nut and a second nut spaced from one another. The main body portion generally comprises a generally flat flexible first arm and a generally flat flexible second arm spaced from the first arm to form a gap therebetween for receiving a cable. The first arm has a proximal portion with a proximal end and a distal portion with a first hole and a second hole spaced from one another. The second arm has a proximal portion with a proximal end and a distal portion with a first hole and a second hole spaced from one another. The reinforcement plate is in mechanical communication with the first arm and has a first hole and a second hole spaced from one another. The plate further comprises an overhang portion extending towards the second arm and beyond the distal portion of the first arm. The overhang portion has a generally central slot for aligning the cable. The first holes are generally aligned with one another and the second holes are generally aligned with one another. The first bolt extends through the first holes and has a head abutting against the reinforcement plate. The second bolt extends through the second holes and has a head abutting against the reinforcement plate. The first nut is threadably engaged with the first bolt and is in mechanical communication with the second arm. The second nut is threadably engaged with the second bolt and is in mechanical communication with the second arm. Advantageously, tightening of the nuts causes said arms to be displaced towards one another and close the gap between the arms to securely clamp one end of the cable between the arms and within the clamp.

In accordance with another embodiment, a sway brace cable clamp is provided. The cable clamp generally comprises a generally flat first arm, a generally flat second arm, a bolt and a generally longitudinal axis. The first arm has a proximal end and comprises a rigid material. The second arm has a proximal end and comprises a flexible material. The arms are spaced from one another and connected at the proximal ends to form a gap therebetween for receiving a cable. The bolt extends through the arms for clamping an end portion of the cable between the arms by displacing the second arm towards the first arm. The longitudinal axis extends substantially through the proximal ends and is substantially parallel or coaxial to the end portion of the cable when the cable is clamped between the arms.

In accordance with yet another embodiment, a sway brace cable clamp is provided. The cable clamp generally comprises a first arm, a second arm spaced from the first arm and being movable towards the first arm, and a fastening device for urging the second arm towards the first arm to securingly capture a cable between the arms and the fastening device.

In accordance with one embodiment, a sway brace assembly is provided. The assembly generally comprises a cable clamp and an attachment device connected to the clamp for attaching the clamp to a support. The cable clamp generally comprises an upper arm, a lower arm, a first fastening element and a second fastening element spaced from the first fastening element. The upper arm comprises a generally flat plate. The lower arm comprises a generally flat plate and is spaced from the upper arm to form a gap therebetween for receiving a bracing cable. The fastening elements extend between the arms. At least one of the arms is flexible and movable towards the other by actuation of the fastening elements to close the gap and securely clamp the cable between the arms.

In accordance with one aspect, a method is provided of securing a bracing cable within a clamp. The method includes the step of inserting the cable into a gap formed between a pair of spaced and generally flat arms of the cable. The cable is positioned between a pair of bolts of the clamp which extend between the arms. A pair of nuts of the clamp are tightened with each nut being threadably engaged with a respective one of the bolts to create relative motion between the arms and close the gap to clamp the cable between the arms and the bolts.

For purposes of summarizing the invention, certain aspects, advantages and novel features of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which:

FIGS. 9A–9E are simplified views illustrating a series of steps to attach the assembly of FIG. 1 to a rod or bolt in accordance with one embodiment of the invention;

FIGS. 10A–10E are simplified views illustrating a series of steps to attach the assembly of FIG. 1 to a rod or bolt in accordance with another embodiment of the invention;

FIG. 29 is a top view of the cable sway brace clamp of FIG. 27;

FIG. 30 is a side view of the cable sway brace clamp of FIG. 27;

FIG. 31 is an end view of the cable sway brace clamp of FIG. 27;

FIG. 32 is a side view of the cable sway brace clamp of FIG. 27 illustrating the clamp in a closed position secured to a cable;

FIG. 33 is an end view of the cable sway brace clamp of FIG. 32 illustrating the clamp in a closed position secured to the cable;

DETAILED DESCRIPTION OF THE PREFERRED EMBODIMENTS

The preferred embodiments of the invention described herein relate generally to devices for bracing pipes and other loads suspended from or below ceilings, floors, beams, walls and the like, against sway and seismic disturbances and, more particularly, to a bracing clamp and connector assembly that permits fast attachment to hanger rods and the like without the need for disassembly and which can reliably sustains heavy loads.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

In accordance with one embodiment, an interlocking swivel connector is provided for attachment to an existing system supporting a suspended load below a ceiling, beam, floor or the like without the need to disassemble or disconnect any components of the system, thereby allowing for efficient retrofitting The connector is easy to install and inexpensive to manufacture. The connector is removably or permanently attachable to a sway brace clamp or attachment to form a connector-clamp assembly. The assembly is capable of reliably supporting heavy loads against adverse sway and seismic disturbances.

In accordance with one embodiment, a sway cable brace clamp or fitting is provided for securely attaching to a bracing cable and for supporting a suspended load below a ceiling, beam, floor or the like. The cable clamp is easy to install and inexpensive to manufacture. The cable clamp is capable of reliably supporting heavy loads against adverse sway and seismic disturbances.

Interlocking Swivel Connector and Clamp Assembly

Figure 5:
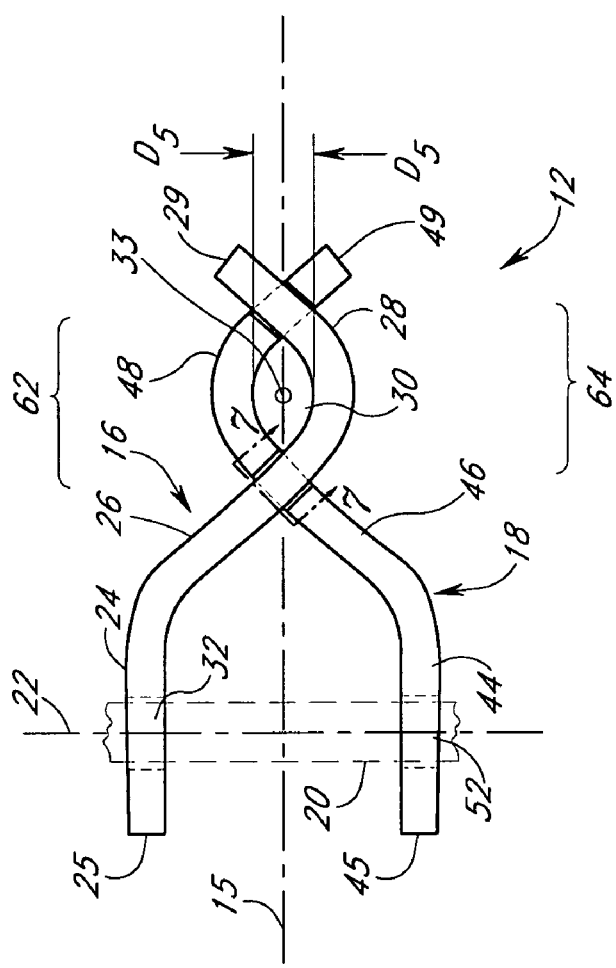
FIG. 5 is a top view of the interlocking swivel connector of FIG. 1.
Figure 6:
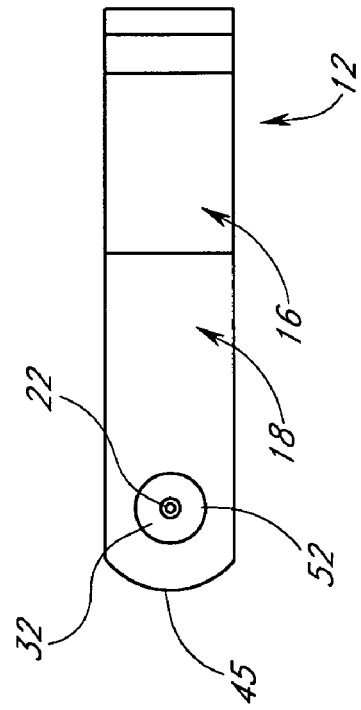
FIG. 6 is a side view of the interlocking swivel connector of FIG. 1.
Figure 7:
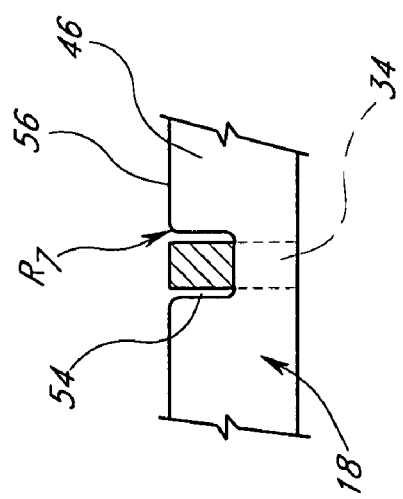
FIG. 7 is a sectional view along line 7—7 of FIG. 5.

FIGS. 1–4 show different views of one embodiment of a sway brace assembly or system 10 generally comprising an interlocking swivel connector, bracket or attachment device 12 and a sway brace clamp, attachment or fitting 14. FIGS. 5–7 show different views of the interlocking swivel connector 12.

As discussed in greater detail later herein, the seismic earthquake brace connector 12 is attachable to a rod or bolt of an already installed system supporting a suspended load, such as a pipe and the like, without disassembly of the existing system. The clamp 14 is securely attachable to a brace, such as a bracing pipe and the like, to protect the suspended load against adverse sway and seismic disturbances. The assembly 10 and/or the connector 12 and/or the clamp 14 have a generally longitudinal axis 15.

Though, in the illustrated embodiment of FIGS. 1–4, the connector 12 is attached to the clamp 14, it should be appreciated that the connector 12 may be efficaciously used in conjunction with a wide variety of other suitable clamps, fittings, attachments and the like, some of which are disclosed later herein.

In the illustrated embodiment of FIGS. 1–7, the connector 12 comprises a pair of swivelably interlocking arms or interlock elements 16, 18 arranged in a substantially scissors-like relation or configuration. Preferably, the arms 16, 18 are generally S- or Z-shaped. The connector 12 and arms 16, 18 are pivotable or swivelable about a fastener or pin 20 the longitudinal axis of which generally defines a rotation, pivot or swivel axis 22. The pin 20 mechanically connects or couples the connector 12 and the clamp 14.

In the illustrated embodiment of FIGS. 1–7, advantageously, this hinged connection or coupling between the connector 12 and clamp 14 allows the orientation and/or angulation between the connector 12 and clamp 14 to be adjusted or selected, as needed or desired. Preferably, both the connector 12 and clamp 14 are rotatable about the rotation axis 22 though in modified embodiments only one may be, as needed or desired.

Similarly, for other embodiments disclosed or suggested herein which utilize such a or similar or equivalent hinged connection, the orientation and/or angulation between the two hingedly attached components (e.g. connector and clamp or other attachment devices) can advantageously be adjusted or selected, as needed or desired. Preferably, both components are rotatable about the rotation axis though in modified embodiments only one may be, as needed or desired.

In the illustrated embodiment of FIGS. 1–7, the upper interlock arm 16 is generally in the form of an angled or curvilinear wall or plate and generally comprises a proximal section or portion 24, a medial section or portion 26 and a distal section or portion 28. The proximal section 24, the medial section 26 and the distal section 28 are angled with respect to one another by predetermined angles to provide a geometry such that intersection or engagement of the arms 16, 18 creates a rod- or bolt-receiving hole 30.

Figure 1:
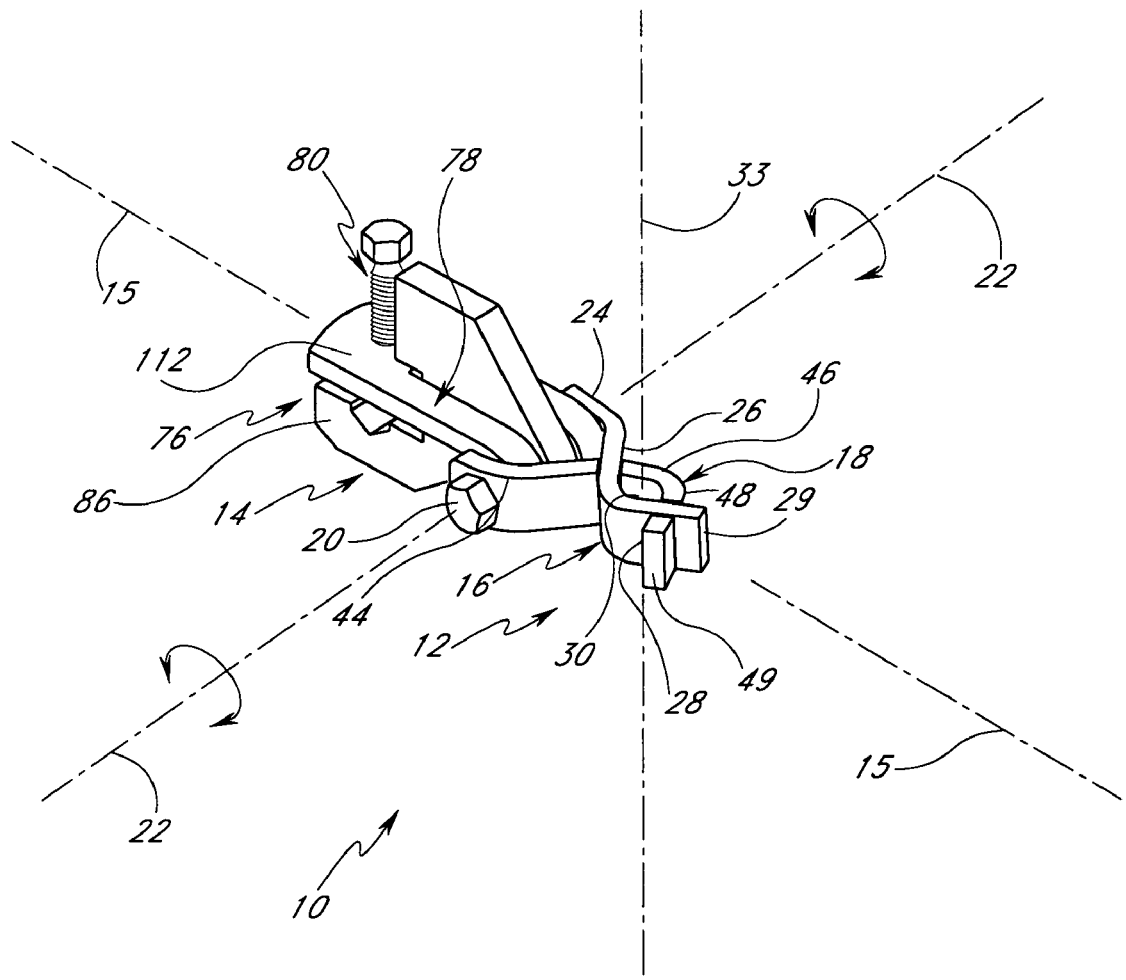
FIG. 1 is a perspective view of an interlocking swivel connector and sway brace clamp assembly having features and advantages in accordance with one embodiment of the invention.

In the illustrated embodiment of FIGS. 1–7, and as best seen in FIG. 1, the rod- or bolt-receiving hole 30 has a generally longitudinal axis 33 that is oriented substantially perpendicular to the rotation axis 22 of the arms 16, 18. In other words, the projections of the hole longitudinal axis 33 and rotation axis 22, on a common plane that is not perpendicular to either of the axes 22, 33, intersect perpendicularly or at 90°.

Figure 2:
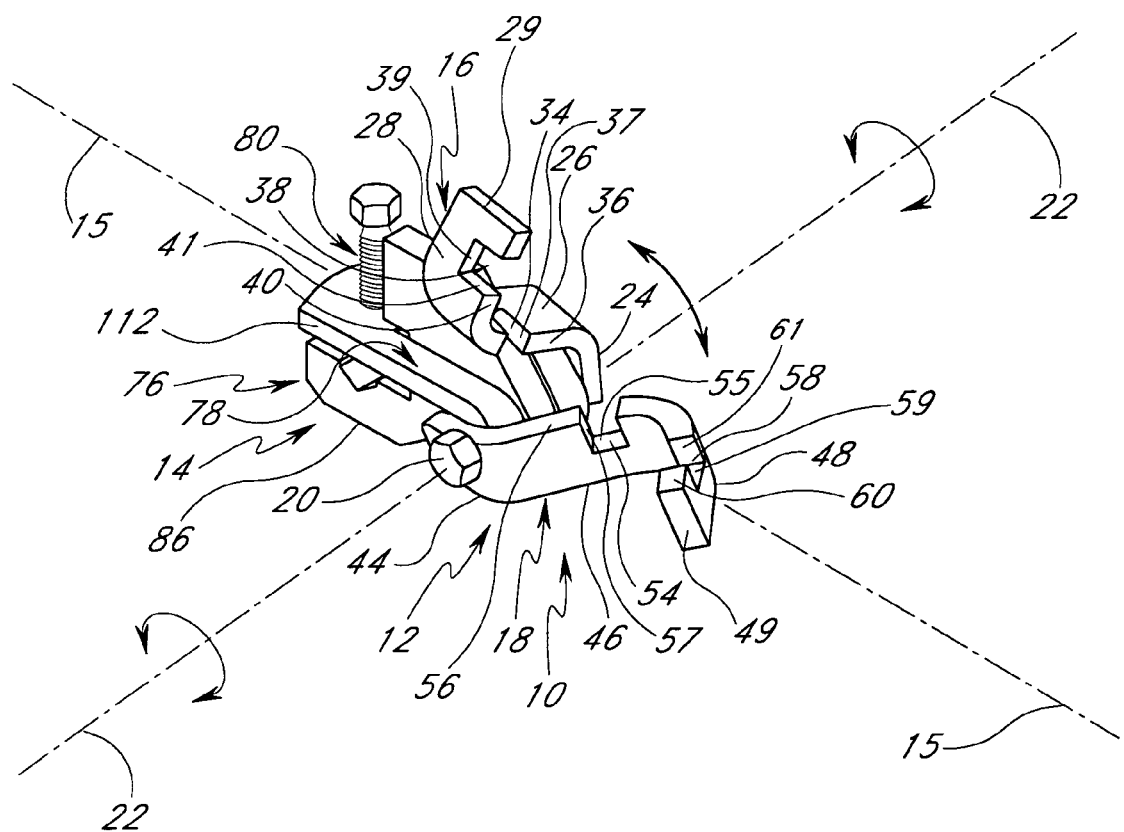
FIG. 2 is a perspective view of the assembly of FIG. 1 showing the interlocking swivel connector with its interlocking elements disengaged from one another.
Figure 3:
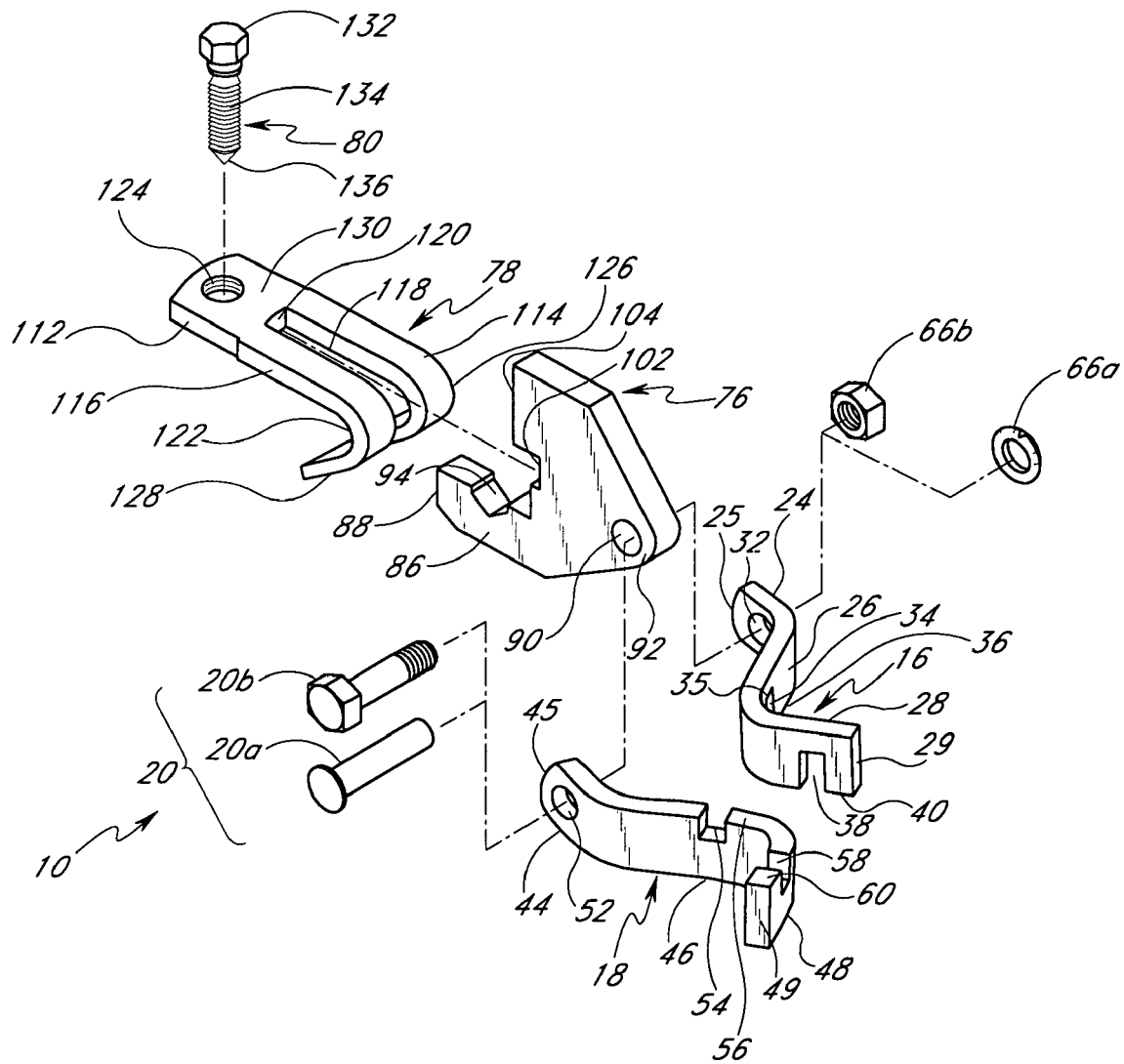
FIG. 3 is an exploded perspective view of the assembly of FIG. 1.

In the illustrated embodiment of FIGS. 1–7, the proximal section 24 is generally rectangular in shape with a generally curved proximal end 25 (see, for example, FIG. 3). In other embodiments, the proximal section 24 may be configured in modified manners with efficacy, as required or desired, giving due consideration to the goal of achieving one or more of the benefits and advantages as disclosed, taught or suggested herein. For example, the proximal section 24 may be configured in other suitable polygonal or non-polygonal shapes.

In the illustrated embodiment of FIGS. 1–7, and as best seen in FIGS. 3, 5 and 6, the proximal section 24 has a generally circular through hole or cavity 32 for receiving the pin 20. In other embodiments, the proximal section 24 and/or opening 32 may be configured in modified manners with efficacy, as required or desired, giving due consideration to the goal of achieving one or more of the benefits and advantages as disclosed, taught or suggested herein. For example, the opening 32 may be rectangular or square in shape, or configured in the form of other suitable polygonal or non-polygonal shapes.

In the illustrated embodiment of FIGS. 1–7, the medial section 26 is generally rectangular in shape. In other embodiments, the medial section 26 may be configured in modified manners with efficacy, as required or desired, giving due consideration to the goal of achieving one or more of the benefits and advantages as disclosed, taught or suggested herein. For example, the medial section 26 may be configured in other suitable polygonal or non-polygonal shapes.

In the illustrated embodiment of FIGS. 1–7, the medial section 26 includes a slot 34 for interlocking or mating with a corresponding portion of the lower connector arm 18. The slot 34 extends inwards from a lower edge 36 of the medial section 26 and is preferably generally rectangular in shape or U-shaped. In the illustrated embodiment, and as best depicted by FIGS. 2 and 3, the slot 34 preferably includes an upper or base face, surface or wall 35 and a pair of flanking opposed side faces or walls 37. In other embodiments, the slot 34 may be configured in modified manners with efficacy, as required or desired, giving due consideration to the goal of achieving one or more of the benefits and advantages as disclosed, taught or suggested herein. For example, the slot 34 may be V-shaped or configured in other suitable polygonal or non-polygonal shapes.

In the illustrated embodiment of FIGS. 1–7, the junction between the proximal section 24 and medial section 26 forms a generally smooth curve. In another embodiment, the junction between the proximal section 24 and medial section 26 forms a generally sharp corner. In other embodiments, the junction between the proximal section 24 and medial section 26 may be configured in other modified manners with efficacy, as required or desired, giving due consideration to the goal of achieving one or more of the benefits and advantages as disclosed, taught or suggested herein. For example, the junction between the proximal section 24 and medial section 26 may be partially smooth and partially sharp.

In the illustrated embodiment of FIGS. 1–7, the distal section 28 is generally rectangular in shape and has a distal end 29. In other embodiments, the distal section 28 may be configured in modified manners with efficacy, as required or desired, giving due consideration to the goal of achieving one or more of the benefits and advantages as disclosed, taught or suggested herein. For example, the distal section 28 may be configured in other suitable polygonal or non-polygonal shapes.

In the illustrated embodiment of FIGS. 1–7, the distal section 28 includes a slot 38 for interlocking or mating with a corresponding portion of the lower connector arm 18. The slot 38 extends inwards from a lower edge 40 of the distal section 28 and is preferably generally rectangular in shape or U-shaped. In the illustrated embodiment, and as best depicted by FIG. 2, the slot 38 preferably includes an upper or base face, surface or wall 39 and a pair of flanking opposed side faces or walls 41. In other embodiments, the slot 38 may be configured in modified manners with efficacy, as required or desired, giving due consideration to the goal of achieving one or more of the benefits and advantages as disclosed, taught or suggested herein. For example, the slot 38 may be V-shaped or configured in other suitable polygonal or non-polygonal shapes.

In the illustrated embodiment of FIGS. 1–7, the junction between the medial section 26 and distal section 28 forms a generally smooth curve. In another embodiment, the junction between the medial section 26 and distal section 28 forms a generally sharp corner. In other embodiments, the junction between the medial section 26 and distal section 28 may be configured in modified manners with efficacy, as required or desired, giving due consideration to the goal of achieving one or more of the benefits and advantages as disclosed, taught or suggested herein. For example, the junction between the medial section 26 and distal section 28 may be partially smooth and partially sharp.

In the illustrated embodiment of FIGS. 1–7, the lower interlock arm 18 is generally in the form of an angled or curvilinear wall or plate and generally comprises a proximal section or portion 44, a medial section or portion 46 and a distal section or portion 48. The proximal section 44, the medial section 46 and the distal section 48 are angled with respect to one another by predetermined angles to provide a geometry such that intersection or engagement of the arms 16, 18 creates the rod- or bolt-receiving hole 30.

In the illustrated embodiment of FIGS. 1–7, the proximal section 44 is generally rectangular in shape with a generally curved proximal end 45 (see, for example, FIG. 3). In other embodiments, the proximal section 44 may be configured in modified manners with efficacy, as required or desired, giving due consideration to the goal of achieving one or more of the benefits and advantages as disclosed, taught or suggested herein. For example, the proximal section 44 may be configured in other suitable polygonal or non-polygonal shapes.

In the illustrated embodiment of FIGS. 1–7, and as best seen in FIGS. 3, 5 and 6, the proximal section 44 has a generally circular through hole or cavity 52 for receiving the pin 20. The hole 52 is generally aligned with the pin-receiving hole 32 of the upper connector arm 16. In other embodiments, the proximal section 44 and/or opening 52 may be configured in modified manners with efficacy, as required or desired, giving due consideration to the goal of achieving one or more of the benefits and advantages as disclosed, taught or suggested herein. For example, the opening 52 may be rectangular or square in shape, or configured in the form of other suitable polygonal or non-polygonal shapes.

In the illustrated embodiment of FIGS. 1–7, the medial section 46 is generally rectangular in shape. In other embodiments, the medial section 46 may be configured in modified manners with efficacy, as required or desired, giving due consideration to the goal of achieving one or more of the benefits and advantages as disclosed, taught or suggested herein. For example, the medial section 46 may be configured in other suitable polygonal or non-polygonal shapes.

In the illustrated embodiment of FIGS. 1–7, the medial section 46 includes a slot 54 for interlocking or mating with a corresponding portion of the upper connector arm 16. The slot 54 extends inwards from an upper edge 56 of the medial section 46 and is generally rectangular in shape or U-shaped. In the illustrated embodiment, and as best depicted by FIG. 2, the slot 54 preferably includes a lower or base surface, face or wall 55 and a pair of flanking opposed side faces or walls 57. In other embodiments, the slot 54 may be configured in modified manners with efficacy, as required or desired, giving due consideration to the goal of achieving one or more of the benefits and advantages as disclosed, taught or suggested herein. For example, the slot 54 may be V-shaped or configured in other suitable polygonal or non-polygonal shapes.

In the illustrated embodiment of FIGS. 1–7, the junction between the proximal section 44 and medial section 46 forms a generally smooth curve. In another embodiment, the junction between the proximal section 44 and medial section 46 forms a generally sharp corner. In other embodiments, the junction between the proximal section 44 and medial section 46 may be configured in modified manners with efficacy, as required or desired, giving due consideration to the goal of achieving one or more of the benefits and advantages as disclosed, taught or suggested herein. For example, the junction between the proximal section 44 and medial section 46 may be partially smooth and partially sharp.

In the illustrated embodiment of FIGS. 1–7, the distal section 48 is generally rectangular in shape and has a distal end 49. In other embodiments, the distal section 48 may be configured in modified manners with efficacy, as required or desired, giving due consideration to the goal of achieving one or more of the benefits and advantages as disclosed, taught or suggested herein. For example, the distal section 48 may be configured in other suitable polygonal or non-polygonal shapes.

In the illustrated embodiment of FIGS. 1–7, the distal section 48 includes a slot 58 for interlocking or mating with a corresponding portion of the upper connector arm 16. The slot 58 extends inwards from an upper edge 60 of the distal section 48 and is generally rectangular in shape or U-shaped. In the illustrated embodiment, and as best depicted by FIG. 2, the slot 58 preferably includes a lower or base surface, face or wall 59 and a pair of flanking opposed side faces or walls 61. In other embodiments, the slot 58 may be configured in modified manners with efficacy, as required or desired, giving due consideration to the goal of achieving one or more of the benefits and advantages as disclosed, taught or suggested herein. For example, the slot 58 may be V-shaped or configured in other suitable polygonal or non-polygonal shapes.

In the illustrated embodiment of FIGS. 1–7, the junction between the medial section 46 and distal section 48 forms a generally smooth curve. In another embodiment, the junction between the medial section 46 and distal section 48 forms a generally sharp corner. In other embodiments, the junction between the medial section 46 and distal section 48 may be configured in modified manners with efficacy, as required or desired, giving due consideration to the goal of achieving one or more of the benefits and advantages as disclosed, taught or suggested herein. For example, the junction between the medial section 46 and distal section 48 may be partially smooth and partially sharp.

In the illustrated embodiment of FIGS. 1–7, and as best seen in FIGS. 1 and 5, the rod- or bolt-capturing hole or passage 30 is generally cylindrical in shape and has a generally circular or ellipsoidal cross-section. The hole or opening 30 is sized to receive a rod or bolt of a predetermined diameter. In other embodiments, the hole 30 may be configured in modified manners with efficacy, as required or desired, giving due consideration to the goals of capturing a supporting rod, bolt or the like and/or of achieving one or more of the benefits and advantages as disclosed, taught or suggested herein. For example, the hole 30 may be configured in other suitable polygonal or non-polygonal shapes and/or cross-sections.

In the illustrated embodiment of FIGS. 1–7, and as best seen in FIG. 5, a generally curved or C-, U- or V-shaped wall, portion or section 62 of the upper connector arm 16 and a generally curved or C-, U- or V-shaped wall, portion or section 64 of the lower connector arm 18 form the hole or cavity 30 when the arms 16, 18 are interlocked. Preferably, in the interlocked position (see, for example, FIGS. 1 and 5), the hole 30 is positioned between and adjacent to the interlocking or mating slots 34, 38, 54, 58.

In the illustrated embodiment of FIGS. 1–7, and as best seen in FIGS. 1 and 5, the connector arms 16 and 18, when interlocked, intersect or engage one another at two locations each. In the interlocked position, the upper arm slot 34 and the lower arm slot 54 are substantially aligned with one another and the upper arm slot 38 and the lower arm slot 58 are substantially aligned with one another. The upper arm slot 34 receives or mates with a portion of the lower arm 18 that is substantially adjacent to and/or below the lower arm slot 54 and the opposed slot faces 35 and 55 (FIGS. 2 and 3) abut against or contact one another. The lower arm slot 54 receives or mates with a portion of the upper arm 16 that is substantially adjacent to and/or above the upper arm slot 34 and the opposed slot faces 35 and 55 (FIGS. 2 and 3) abut against or contact one another. The upper arm slot 38 receives or mates with a portion of the lower arm 18 that is substantially adjacent to and/or below the lower arm slot 58 and the opposed slot faces 39 and 59 (FIG. 2) abut against or contact one another. The lower arm slot 58 receives or mates with a portion of the upper arm 16 that is substantially adjacent to and/or above the upper arm slot 38 and the opposed slot faces 39 and 59 (FIG. 2) abut against or contact one another.

In the illustrated embodiment of FIGS. 1–7, and as best depicted by FIG. 5, with the arms 16, 18 in the closed position, the upper arm proximal section 24 and the lower arm proximal section 44 are spaced from one another and generally parallel to one another. The longitudinal axis 15 is generally parallel to the proximal sections 24, 44, passes between the proximal sections 24, 44 and is generally equidistantly spaced between the proximal sections 24, 44.

In the illustrated embodiment of FIGS. 1–7, and as best depicted by FIG. 5, when the arms 16, 18 in the closed position, the upper arm medial section 26 and the lower arm medial section 46 intersect one another and the longitudinal axis 15. Preferably, when the arms 16, 18 are interlocked, the upper arm medial section 26 and the lower arm medial section 46 intersect one another about perpendicularly, that is, the intersection angle between the sections 26 and 46 is about 90°. Preferably, the upper arm medial section 26 and the lower arm medial section 46 intersect the longitudinal axis 15 at an angle of about 45°.

In the illustrated embodiment of FIGS. 1–7, and as best depicted by FIG. 5, when the arms 16, 18 in the closed position, the upper arm distal section 28 and the lower arm distal section 48 intersect one another and the longitudinal axis 15. Preferably, when the arms 16, 18 are interlocked, the upper arm distal section 28 and the lower arm distal section 48 intersect one another about perpendicularly, that is, the intersection angle between the sections 28 and 48 is about 90°. Preferably, the upper arm distal section 28 and the lower arm distal section 48 intersect the longitudinal axis 15 at an angle of about 45°.

In the illustrated embodiment of FIGS. 1–7, and as best depicted by FIG. 5, when the arms 16, 18 in the closed position, the passage 30 is generally aligned with the longitudinal axis 15. Preferably, the longitudinal axis 15 passes through the center of the passage 30.

In the illustrated embodiment of FIGS. 1–7, the arm 16 and the arm 18 are substantially structurally identical and interchangeable. Advantageously, this can facilitate fabrication of the connector 12, for example, in die-cutting and die-casting processes, a single die can be used to manufacture either of the arms 16, 18. This desirably reduces manufacturing costs. In other embodiments, the arms 16 and/or 18 may be configured in modified manners with efficacy, as required or desired, giving due consideration to the goal of achieving one or more of the benefits and advantages as disclosed, taught or suggested herein.

As best illustrated in FIG. 3, in accordance with one embodiment, the connector 12, and hence the arms 16, 18, and the clamp 14 are permanently or quasi-permanently mechanically connected to one another by a rivet 20*a* and a clinched rivet head 66*a*. Also as best illustrated in FIG. 3, in accordance with another embodiment, the connector 12, and hence the arms 16, 18, and the clamp 14 are removably or releasably mechanically connected to one another by a bolt or screw 20*b* and a nut 66*b*. In a modified embodiment, the nut 66*b* is used in combination with a clinched rivet head or the like to connect to the bolt 20*b* and hence provide a permanent or pseudo-permanent mechanical connection between the connector 12 and the clamp 14. In other embodiments, the connector 12 and the clamp 14 may be efficaciously connected buy other permanent or temporary attachment fasteners, as required or desired, giving due consideration to the goals of providing a secure attachment and/or of achieving one or more of the benefits and advantages as disclosed, taught or suggested herein.

In a modified embodiment, one of the arms 16 or 18 is substantially irrotational or fixed relative to the pin 20 and/or the clamp 14. Thus, only one of the arms 16 or 18 is swivelably manipulated to capture a support rod, bolt or the like within the hole 30. Such a configuration achieves at least some of the benefits and advantages as disclosed, taught or suggested herein.

In another modified embodiment, the connector arms 16, 18 each only comprise a respective single slot 34, 54 and intersect or overlap at only one location to form a rod- or bolt-receiving passage. That is, the distal ends of the arms 16, 18 are truncated or terminate at or before the respective second slots 38, 58. In such an embodiment, with the arms in the closed position, the distal ends of the arms abut or are in close proximity to one another. This configuration achieves at least some of the benefits and advantages as disclosed, taught or suggested herein.

Preferably, the connector arms 16, 18 are fabricated from a suitably strong material to meet the standards set by the Underwriters Laboratories (U.L.), Factory Mutual Engineering (F.M.), and other such quality control groups. In one embodiment, the connector arms 16, 18 comprise a mild steel. In another embodiment, the connector arms 16, 18 comprise a carbon steel. In yet another embodiment, the connector arms 16, 18 have an electro-galvanized finish. In other embodiments, the connector arms may efficaciously comprise other materials, as required or desired, giving due consideration to the goals of providing suitably strong connector arms 16, 18 and/or of achieving one or more of the benefits and advantages as disclosed, taught or suggested herein. For example, the connector arms 16, 18 can comprise other suitable metals, alloys, ceramics, plastics and the like.

In the exemplary embodiment, when the arms 16 and 18 are interlocked, the retrofit connector 12 has an overall length of about 8.9 cm (3.5 inches) and a major width of about 5.1 cm (2.0 inches). In other embodiments, the connector 12 may be dimensioned in modified manners with efficacy, as required or desired, giving due consideration to the particular application and/or to the goal of achieving one or more of the benefits and advantages as disclosed, taught or suggested herein.

In the exemplary embodiment, the upper arm proximal section 24 and the lower arm proximal section 44 are spaced by a length of about 3.8 cm (1.5 inches). In other embodiments, the sections 24 and 44 may be spaced in modified manners with efficacy, as required or desired, giving due consideration to the particular application and/or to the goal of achieving one or more of the benefits and advantages as disclosed, taught or suggested herein.

In one embodiment, the rod- or bolt-receiving hole 30 has a diameter or minor diameter or cross-sectional dimension $D_5$ (see FIG. 5) of about 1.35 cm (0.531 inches) and a length of about 1.9 cm (0.75 inches). In another embodiment, the diameter or minor diameter or cross-sectional dimension $D_5$ is in the range from about 0.95 cm (⅜ inches) or slightly greater than about 0.95 cm (⅜ inches) to about 1.9 cm (¾ inches) or slightly greater than about 1.9 cm (¾ inches). In yet another embodiment, the hole 30 can have dimensions such that it can receive and allow a retrofit connection to rods, bolts and the like having a diameter in the range from about 0.95 cm (⅜ inches) to about 1.9 cm (¾ inches). In other embodiments, the hole 30 can be dimensioned in modified manners, have a smaller or larger size and/or accommodate rods, bolts and the like having a smaller or larger diameter with efficacy, as required or desired, giving due consideration to the goals of providing a secure retrofit connection and/or of achieving one or more of the benefits and advantages as disclosed, taught or suggested herein.

In one embodiment, the rod- or bolt-receiving hole 30 has a length, depth or height of about 1.9 cm (¾ inches) though other suitable lengths may be efficaciously used. The length of the rod- or bolt-receiving hole 30 generally determines the length of the rod or bolt that is captured within the connector 12 or hole 30. Preferably, the passage 30 is dimensioned such that an optimum length of the rod or bolt is captured within the connector 12 or hole 30, thereby providing a secure and stable connection. In the illustrated embodiment, the length of the passage 30 is greater than the length or depth of any of the slots 34, 38, 54, 58.

In the exemplary embodiment, the angle between the upper arm proximal section 24 and the upper arm medial section 26 is about 135°. In the exemplary embodiment, the angle between the upper arm medial section 26 and the upper arm distal section 28 is about 90°. In other embodiments, the angulation between the upper arm sections 24, 26, 28 may be modified with efficacy, as required or desired, giving due consideration to the goals of providing a secure retrofit connection and/or of achieving one or more of the benefits and advantages as disclosed, taught or suggested herein.

In the exemplary embodiment, the angle between the lower arm proximal section 44 and the lower arm medial section 46 is about 135°. In the exemplary embodiment, the angle between the lower arm medial section 46 and the lower arm distal section 48 is about 90°. In other embodiments, the angulation between the lower arm sections 44, 46, 48 may be modified with efficacy, as required or desired, giving due consideration to the goals of providing a secure retrofit connection and/or of achieving one or more of the benefits and advantages as disclosed, taught or suggested herein.

In the exemplary embodiment, the upper arm 16 has a thickness of about 0.64 cm (¼ inches) and a height of 1.9 cm (¾ inches). Advantageously, this permits fabrication of the arm 16 from conventional bar stock, for example, by utilizing stamping and/or punching operations. In other embodiments, the arm 16 may be efficaciously configured with modified thicknesses, as required or desired, giving due consideration to the goals of providing a secure retrofit connection and/or of achieving one or more of the benefits and advantages as disclosed, taught or suggested herein.

In the exemplary embodiment, the lower arm 18 has a thickness of about 0.64 cm (¼ inches) and a height of 1.9 cm (¾ inches). Advantageously, this permits fabrication of the arm 18 from conventional bar stock, for example, by utilizing stamping and/or punching operations. In other embodiments, the arm 18 may be efficaciously configured with modified thicknesses, as required or desired, giving due consideration to the goals of providing a secure retrofit connection and/or of achieving one or more of the benefits and advantages as disclosed, taught or suggested herein.

In the exemplary embodiment, the upper arm slot 34 has a width of about 0.64 cm (0.25 inches), a length of about 0.95 cm (0.375 inches) and a depth of about 0.95 cm (0.375 inches). In the exemplary embodiment, the upper arm slot 38 has a width of about 0.64 cm (0.25 inches), a length of about 0.95 cm (0.375 inches) and a depth of about 0.95 cm (0.375 inches). In other embodiments, the slots 34, 38 may be dimensioned in modified manners with efficacy, as required or desired, giving due consideration to the goals of providing a secure retrofit connection and/or of achieving one or more of the benefits and advantages as disclosed, taught or suggested herein.

In the exemplary embodiment, the lower arm slot 54 has a width of about 0.64 cm (0.25 inches), a length of about 0.95 cm (0.375 inches) and a depth of about 0.95 cm (0.375 inches). In the exemplary embodiment, the lower arm slot 58 has a width of about 0.64 cm (0.25 inches), a length of about 0.95 cm (0.375 inches) and a depth of about 0.95 cm (0.375 inches). In other embodiments, the slots 54, 58 may be dimensioned in modified manners with efficacy, as required or desired, giving due consideration to the goals of providing a secure retrofit connection and/or of achieving one or more of the benefits and advantages as disclosed, taught or suggested herein.

In the exemplary embodiment, the radii of curvature (for example, $R_7$ in FIG. 7) where the slots 34, 38 and slots 54, 58 open at edges of the respective arms 16 and 18 is about 0.32 cm (0.125 inches). In other embodiments, these radii of curvature may be dimensioned in modified manners with efficacy, as required or desired, giving due consideration to the goals of providing a secure retrofit connection and/or of achieving one or more of the benefits and advantages as disclosed, taught or suggested herein.

In the exemplary embodiment, the pin-receiving hole 32 at the upper arm proximal section 24 has a diameter of about 1.0 cm (0.39 inches). In the exemplary embodiment, the upper arm proximal end 25 has a radius of curvature of about 1.1 cm (0.437 inches). In other embodiments, the pin-receiving hole 32 and/or the proximal end 25 may be dimensioned in modified manners with efficacy, as required or desired, giving due consideration to the goals of providing a secure retrofit connection and/or of achieving one or more of the benefits and advantages as disclosed, taught or suggested herein.

In the exemplary embodiment, the pin-receiving hole 52 at the lower arm proximal section 44 has a diameter of about 1.0 cm (0.39 inches). In the exemplary embodiment, the lower arm proximal end 45 has a radius of curvature of about 1.1 cm (0.437 inches). In other embodiments, the pin-receiving hole 52 and/or the proximal end 45 may be dimensioned in modified manners with efficacy, as required or desired, giving due consideration to the goals of providing a secure retrofit connection and/or of achieving one or more of the benefits and advantages as disclosed, taught or suggested herein.

The scissor connector 12 of the preferred embodiments can be manufactured or fabricated by a wide variety of methods and/or technologies. These include, without limitation, stamping/punching, casting, molding, forging, machining, among others.

Figure 8:
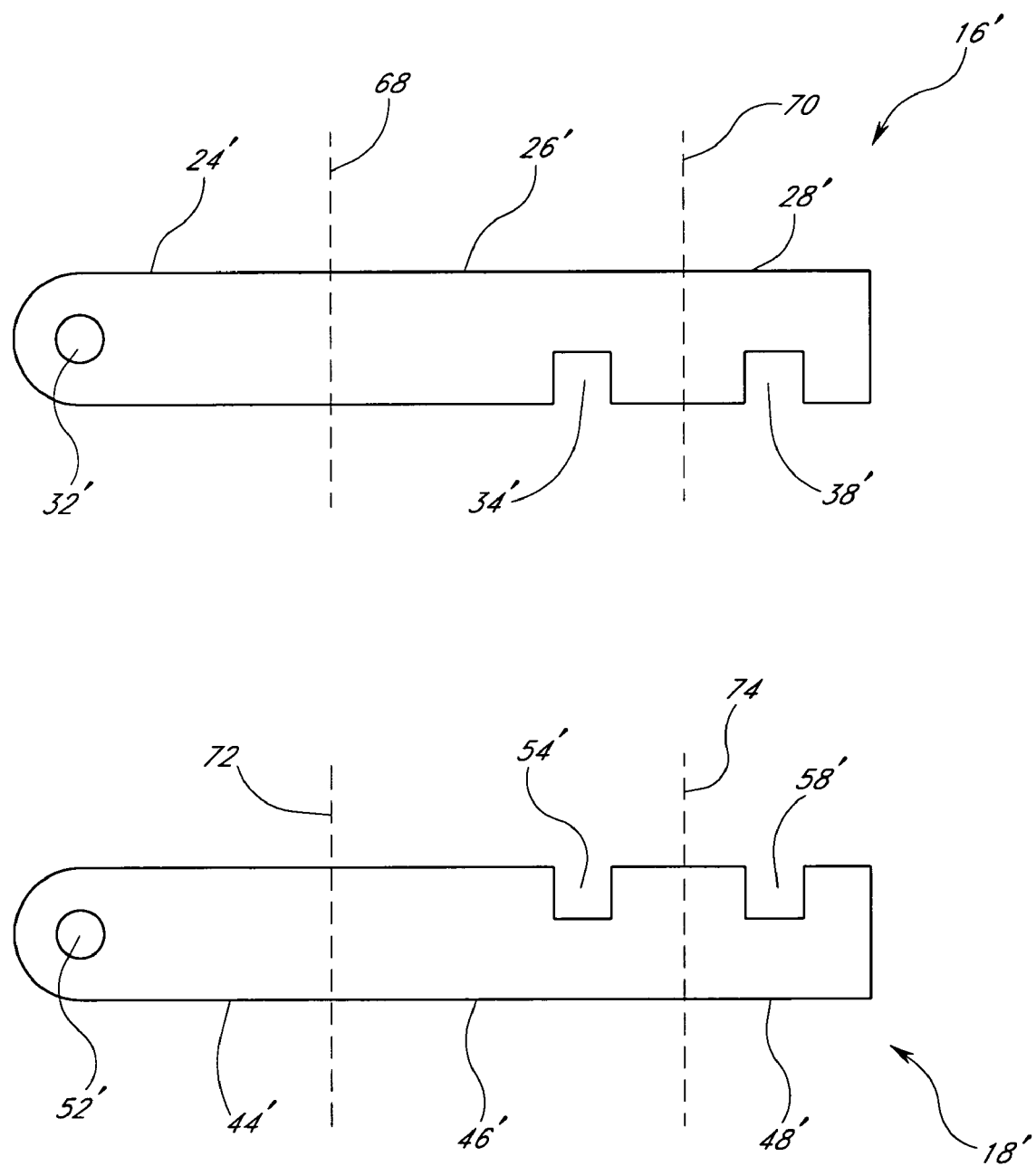
FIG. 8 is an illustration of steps during manufacture of the interlocking swivel connector in accordance with one embodiment of the invention.

In one preferred embodiment, and referring in particular to FIG. 8, the arms 16, 18 of the seismic connector 12 (see, for example, FIG. 1) are manufactured by stamping generally flat strips of a material. Preferably, the material comprises a metal, such as mild steel or carbon steel. A first strip is stamped into a generally rectangular plate 16'. The stamping includes the step of punching a hole 32' and two slots 34', 38'. The plate 16' is bent (to predetermined angles) around or about lines or axes 68 and 70 which (as shown in FIG. 8) generally define a proximal section 24', a medial section 26' and a distal section 28', to form the seismic connector arm 16 (see, for example, FIG. 3) with corresponding angulated proximal, medial and distal sections 24, 26 and 28.

Still referring in particular to FIG. 8, a second strip is stamped into a generally rectangular plate 18'. The stamping includes the step of punching a hole 52' and two slots 54', 58'. The plate 18' is bent (to predetermined angles) around or about lines or axes 72 and 74, which (as shown in FIG. 8) generally define a proximal section 44', a medial section 46' and a distal section 48', to form the seismic connector arm 18 (see, for example, FIG. 3) with corresponding angulated proximal, medial and distal sections 44, 46 and 48. The connector pin 20 is used to connect the arms 16, 18 to a clamp or fitting, such as the clamp 14 to form the connector-clamp assembly 10, as shown, for example, in FIG. 1.

This manufacturing process or method, for the embodiments wherein the seismic connector arms 16, 18 are substantially structurally identical, can use the same cutting-die for fabricating both arms 16, 18. Advantageously, this saves on cost.

Moreover, such a manufacturing process is especially suited for automated assembly lines, wherein stamping, punching and bending operations can be performed at high speeds and pick-and-place robotic arms or systems can efficiently manipulate the various components. The simplicity and speed of this manufacturing method results in an end product that is economical to manufacture, and thus is desirably inexpensive.

In another embodiment, the connector arms 16, 18 (see, for example, FIG. 3) are manufactured by casting or molding. For the embodiments wherein the seismic connector arms 16, 18 are substantially structurally identical, the same casting-die or mold can be used for fabricating both arms 16, 18. Advantageously, this saves on cost.

The utility and versatility of the retrofit connector 12 and other embodiments as taught or suggested herein will be readily apparent to those skilled in the art. As discussed in further detail below, the interlocking swivel connector 12 is attachable to an existing system supporting a suspended load below a ceiling, beam, floor or the like without the need to disassemble or disconnect any components of the system, thereby allowing for efficient retrofitting Advantageously, the connector 12 is easy to install and inexpensive to manufacture. The connector is removably or permanently attachable to the sway brace clamp or attachment 14 to form a connector-clamp assembly 10. The assembly 10 is advantageously capable of reliably supporting heavy loads against adverse sway and seismic disturbances. Desirably, the connector 12 is easily installable and also easily removable. For example, it may be used in a new installation as well and subsequently be removed or replaced, as needed or desired.

As discussed in more detail below, the seismic retrofit connector 12 can be utilized in conjunction with a wide variety of fittings and clamps. In one preferred embodiment, and referring in particular to FIGS. 1–4, the sway brace assembly 10 comprises the connector 12 mechanically connected to the clamp 14. Certain embodiments of the sway brace clamp or fitting 14 are described in U.S. application Ser. No. 09/301,299, filed Apr. 28, 1999, now U.S. Pat. No.

6,273,372 B1, issued Aug. 14, 2001, the entire contents of which are hereby incorporated by reference herein.

Figure 4:
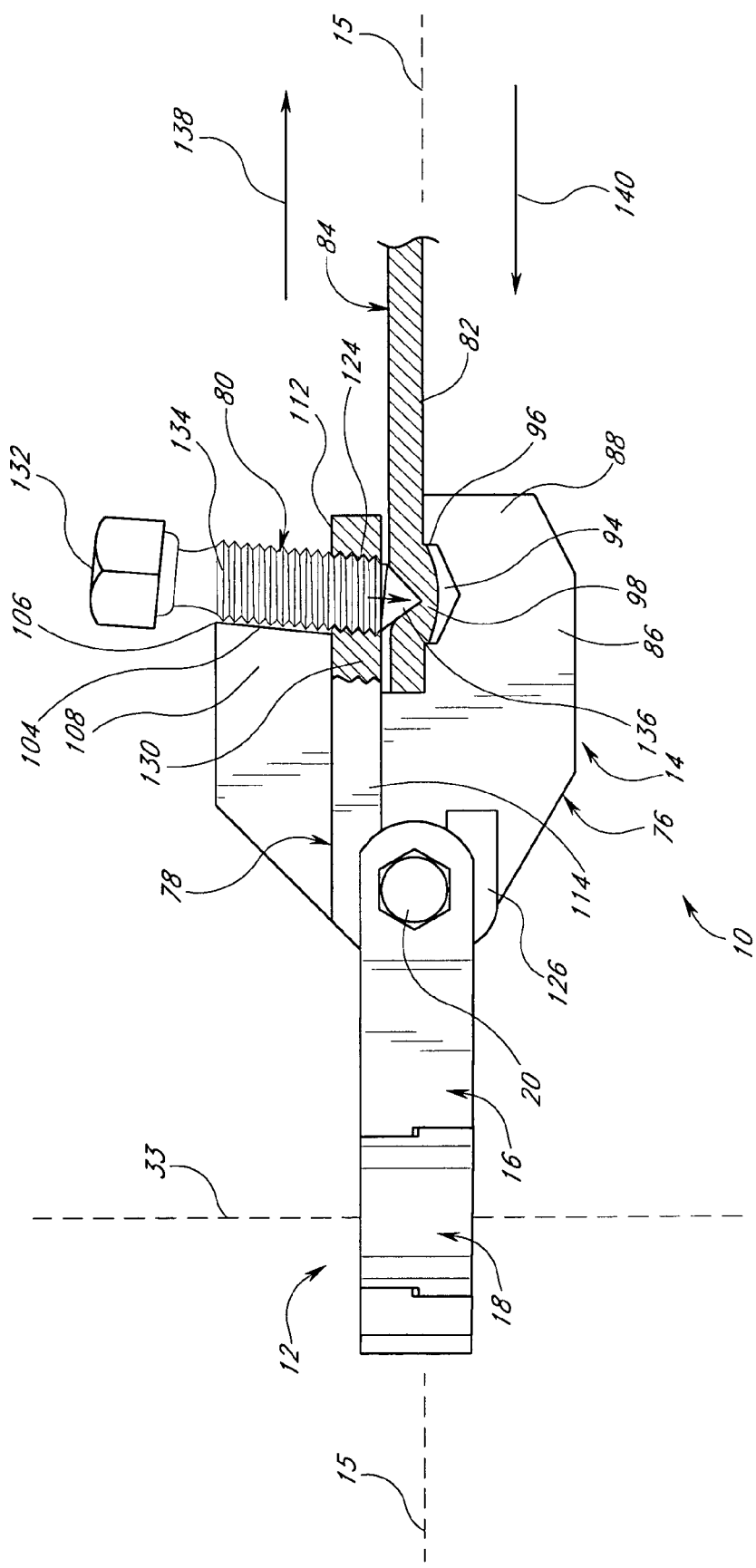
FIG. 4 is a partially sectional side view of the assembly of FIG. 1 showing the sway brace clamp engaged with a brace.

In the illustrated embodiment of FIGS. 1–4, the sway brace fitting or clamp 14 generally comprises a clamp center plate 76, a clamp collar plate 78 and a set screw 80. The connector pin 20 mechanically connects the clamp 14 and connector 12. The clamp 14 is rotatable, swivelable or pivotable about the axis 22. As illustrated in the drawing of FIG. 4, the clamp 14 can securely and deformingly grip a brace wall 82 of a brace 84.

As discussed above, and as best illustrated in FIG. 3, in accordance with one embodiment, the clamp 14 and the connector 12 are permanently or quasi-permanently mechanically connected to one another by a rivet 20a and a clinched rivet head 66a. Also as best illustrated in FIG. 3, in accordance with another embodiment, the clamp 14 and the connector 12 are removably or releasably mechanically connected to one another by a bolt or screw 20b and a nut 66b. In a modified embodiment, the nut 66b is used in combination with a clinched rivet head or the like to connect to the bolt 20b and hence provide a permanent or pseudo-permanent mechanical connection between the clamp 14 and connector 12. In other embodiments, the clamp 14 and connector 12 may be efficaciously connected buy other permanent or temporary attachment fasteners, as required or desired, giving due consideration to the goals of providing a secure attachment and/or of achieving one or more of the benefits and advantages as disclosed, taught or suggested herein.

In the illustrated embodiment of FIGS. 1–4, and as best seen in FIGS. 3 and 4, the clamp center plate 76 has a first jaw 86 at one end 88 and a pin-receiving hole 90 at an opposite end 92. An inner edge of the jaw 86 has a recess 94 for receiving deformed material 98 (see FIG. 4) from the brace 84. The center plate 76 further includes a slot 102 for receiving the collar plate 78 and an edge 104 which is located generally above the middle and/or rear of the first jaw 86.

In the illustrated embodiment of FIGS. 1–4, the recess 94 has a sharp corner 96 (see FIG. 4) for resisting withdrawal of the brace 84, as discussed further below. In the illustrated embodiment, the recess 94 is generally V-shaped. In another embodiment, the recess 94 is generally C-shaped. In yet another embodiment, the recess 94 is generally U-shaped. In other embodiments, the recess 94 may be efficaciously configured in modified manners, as required or desired, giving due consideration to the goals of providing a clamp or fitting for securely engaging a brace and/or of achieving one or more of the benefits and advantages as disclosed, taught or suggested herein.

In the illustrated embodiment of FIGS. 1–4, and as best seen in FIG. 4, the edge 104 has a top corner 106 that protrudes towards the end 88 so that the face of the edge 104 is protrudingly angled towards the end 88 and is hence slightly offset or askew from the perpendicular with respect to the brace wall 82. In the illustrated embodiment, the center plate 76 includes a support 108 that is situated adjacent to and above the slot 102 and extends partially over the first jaw 86.

In the illustrated embodiment of FIGS. 1–4, and as best seen in FIGS. 3 and 4, the clamp collar plate 78 comprises a second jaw 112 and a pair of legs 114, 116. The legs 114 and 116 are spaced by a slot 118 having a closed end 120 and an open end 122. The second jaw 112 has a threaded opening 124 spaced from but close to the closed end 120 of the slot 118.

Preferably, the threaded opening 124 (FIGS. 3 and 4) is angled so that its longitudinal axis is substantially parallel to the edge 104 and hence slightly offset or askew from the perpendicular with respect to the jaw 112 and/or the brace wall 82. In other embodiments, the opening 124 may be efficaciously arranged in modified manners, as required or desired, giving due consideration to the goals of providing a clamp or fitting for securely engaging a brace and/or of achieving one or more of the benefits and advantages as disclosed, taught or suggested herein.

In the illustrated embodiment of FIGS. 1–4, and as best seen in FIGS. 3 and 4, the collar plate legs 114 and 116 have substantially U-shaped portions 126 and 128, respectively, proximate to the open end 122 of the slot 118. The U-shaped portions 126 and 128 of the collar plate legs 114 and 116, respectively, partially substantially circumscribe respective ends of the pin-receiving hole 90. The pin 20 mechanically connects the center plate 76 and the collar plate 78 by traversing the U-shaped portions 126 and 128 and the hole 90. In other embodiments, the collar plate legs 114, 116 may be efficaciously shaped in modified manners, as required or desired, giving due consideration to the goals of providing a clamp or fitting for securely engaging a brace and/or of achieving one or more of the benefits and advantages as disclosed, taught or suggested herein.

In the illustrated embodiment of FIGS. 1–4, the slot 102 of the center plate 76 and the slot 118 of the collar plate 78 are engaged with one another to space and align the first jaw 86 and the second jaw 112 for receiving the brace wall 82. This also positions the threaded opening 124 in substantial alignment with the recess 94. Additionally, a portion 130 of the second jaw 112 is adjacent to the closed end 120 of the collar plate slot 118 and is below and adjacent to the support 108 of the center plate 76.

In the illustrated embodiment of FIGS. 1–4, the center plate jaw 86 and the collar plate jaw 112 lie in planes that are substantially perpendicular. Preferably, the center plate jaw 86 substantially bisects the collar plate jaw 112. In other embodiments, the jaws 86 and 112 may be efficaciously arranged in modified manners, as required or desired, giving due consideration to the goals of providing a clamp or fitting for securely engaging a brace and/or of achieving one or more of the benefits and advantages as disclosed, taught or suggested herein.

In the illustrated embodiment of FIGS. 1–4, the collar plate 78 has a thickness which ensures a substantially comfortable fit into the slot 102 of the center plate 76, and the slot 118 of the collar plate 78 is so dimensioned that it can comfortably accommodate the thickness of the center plate 76. In other embodiments, the center plate 76 and the collar plate 78 may be dimensioned in modified manners with efficacy, as required or desired, giving due consideration to the goals of providing a sturdy clamp or fitting 14 and/or of achieving one or more of the benefits and advantages as disclosed, taught or suggested herein.

Preferably, the center plate 76 and the collar plate 78 are fabricated from hot-rolled low-carbon steel to meet the standards set by the Underwriters Laboratories (U.L.), Factory Mutual Engineering (F.M.), and other such quality control groups. Additionally, the center plate 76 and the collar plate 78 may have a plain or electro-galvanized finish. In other embodiments, the center plate 76 and the collar plate 78 may efficaciously comprise other materials, as required or desired, giving due consideration to the goals of providing a suitably strong clamp or fitting 14 and/or of achieving one or more of the benefits and advantages as disclosed, taught or suggested herein. For example, the center plate 76 and the collar plate 78 can comprise other suitable metals, alloys, ceramics, plastics and the like.

In the illustrated embodiment of FIGS. 1–4, the set screw 80 comprises a head 132, a threaded portion 134 and an end or point 136 for firmly engaging or lodging in to the brace wall 82. The set screw 80 is threadably movably mounted in the threaded opening 124 of the collar plate 78. The set screw 80 and/or its end or point 136 is substantially aligned with the recess 94.

Preferably, the set screw 80 is angled so that its longitudinal axis is slightly offset or askew from the perpendicular with respect to the jaw 112 and/or the brace wall 82. In the illustrated embodiment of FIGS. 1–4, the set screw 80 is positioned substantially parallely adjacent to the angled edge 104 of the center plate 76. In other embodiments, the set screw 80 may be efficaciously arranged in modified manners, as required or desired, giving due consideration to the goals of providing a clamp or fitting for securely engaging a brace and/or of achieving one or more of the benefits and advantages as disclosed, taught or suggested herein.

Preferably, the screw or bolt head 132 comprises a break off head. Advantageously, this permits or assures verification of proper installation as the head 132 breaks at a predetermined torque. In other embodiments, the head 132 may be efficaciously configured in modified manners, as required or desired, giving due consideration to the goals of providing a clamp or fitting for securely engaging a brace and/or of achieving one or more of the benefits and advantages as disclosed, taught or suggested herein. For example, the head 132 may be a permanent head which does not break off.

Preferably, the set screw end 136 comprises a cone point (as shown, for example, in FIG. 4) to securely and deformingly engage the brace wall 82. In another embodiment, the set screw end 136 comprises a generally flat or slightly curved end to securely and deformingly engage the brace wall 82. In other embodiments, the end 136 may be efficaciously configured in modified manners, as required or desired, giving due consideration to the goals of providing a clamp or fitting for securely engaging a brace and/or of achieving one or more of the benefits and advantages as disclosed, taught or suggested herein.

In one embodiment, the recess 94 of the clamp center plate 76 has a size substantially the same as that of the diameter of the threaded portion 134 of the set screw or bolt 80. In another embodiment, the recess 94 of the clamp center plate 76 has a size larger or slightly larger than that of the diameter of the threaded portion 134 of the set screw or bolt 80. In other embodiments, the recess 94 may be efficaciously sized in modified manners, as required or desired, giving due consideration to the goals of providing a clamp or fitting for securely engaging a brace and/or of achieving one or more of the benefits and advantages as disclosed, taught or suggested herein.

Preferably, the set screw 80 is fabricated from a hardened carbon steel. In other embodiments, the set screw 80 may efficaciously comprise other materials, as required or desired, giving due consideration to the goals of providing a suitably strong screw 80 and/or of achieving one or more of the benefits and advantages as disclosed, taught or suggested herein. For example, the screw 80 can comprise other suitable metals, alloys, ceramics, plastics and the like.

In the exemplary embodiment, the center plate 76 is about 0.965 cm (0.375 inches) thick and has a major end-to-end length of about 7.6 cm (3 inches) and a major height of about 5.7 cm (2.25 inches). In other embodiments, the clamp center plate 76 may be dimensioned in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the collar plate 78 is about 0.79 cm (0.312) inches thick, and has a major end-to-end length of about 7.6 cm (3 inches), a width of about 3.8 cm (1.5 inches) and a major height of about 2.6 cm (1.03 inches). In other embodiments, the clamp collar plate 78 may be dimensioned in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the distance between the opposing faces of the center plate slot 102 is about 0.81 cm (0.318 inches) which ensures a substantially comfortable fit with the approximately 0.79 cm (0.312 inches) thick collar plate 78. In other embodiments, the slot 102 may be configured in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the width of the collar plate slot 118 is about 0.98 cm (0.385 inches), thus permitting a substantially comfortable mating between the approximately 0.965 cm (0.375 inches) thick center plate 76 and the collar plate 78. In other embodiments, the slot 118 may be configured in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the spacing between the first jaw 86 and the second jaw 112 is about 0.64 cm (0.25 inches). Advantageously, this jaw spacing permits insertion and capture of braces with varying wall thicknesses, and adds to the versatility of the clamp 14. In one embodiment, braces having a wall thickness between about 25% to about 75% of the jaw spacing are used. In other embodiments, jaws 86, 112 may be configured in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the major depth of the recess 94 of the center plate 76 is about 0.55 cm (0.218 inches) which is generally more than sufficient to accommodate the deformed material 96. In other embodiments, the recess 94 may be dimensioned in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the edge 104 of the center plate 76 is angled at an offset of about 5° from the perpendicular with respect to the brace wall 82. In other embodiments, the edge 104 may be angled in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the threaded opening 124 of the collar plate 112 is angled at an offset of about 5° from the perpendicular with respect to the jaw 112 and/or the brace wall 82. Hence, the set screw 80 is angled at an offset of about 5° from the perpendicular with respect to the jaw 112 and/or the brace wall 82. In other embodiments, the threaded opening 124 may be angled in modified manners and/or the set screw 80 mounted in modified manners with efficacy, as required or desired, giving due consideration to the goals of providing a clamp or fitting for securely engaging a brace and/or of achieving one or more of the benefits and advantages as disclosed, taught or suggested herein.

In the exemplary embodiment, the threaded portion 134 of the set screw 80 is about 3.2 cm (1.25 inches) long and comprises standard ½-inch threads. In other embodiments, the set screw 80 may be configured in modified manners with efficacy, as required or desired, giving due consideration to the goals of providing a clamp or fitting for securely engaging a brace and/or of achieving one or more of the benefits and advantages as disclosed, taught or suggested herein.

In accordance with one embodiment, and referring in particular to FIG. 4, when in use, the brace wall 82 is inserted between the first jaw 86 and the second jaw 112 of the sway brace fitting or clamp 14. A torque wrench or other suitable tool is used to tighten the set screw 80 against the brace wall 82 until the screw head 132 breaks off. This forcible engagement of the brace wall 82 with the set screw end or point 136 causes deformation of the brace wall 82 and results in the recess 94 receiving brace wall deformed material 98. This securely clamps the brace 84 against the center plate first jaw 86.

In the illustrated embodiment FIGS. 1–4, and as best seen in FIG. 4, advantageously, the sharp corner 96 of the clamp recess 94 engages the deformed material 98 of the brace wall 82 to resist withdrawal of the brace 84 from between the jaws 86 and 112. The incorporation of the recess sharp corner 96 provides supplementary means for ensuring that the brace 84 remains firmly lodged in place.

In the illustrated embodiment of FIGS. 1–4 of the clamp 14, the angled threaded hole 124 and the subsequent angling of the set screw 80 result in the set screw 80 being inclined towards the mouth of the first jaw 86 and second jaw 112. Advantageously, this ensures that when a tensile load in the general direction 138 (see FIG. 4) is applied to the brace 84 the set screw 80 is forced more tightly into the brace wall 82, thereby effectively enhancing the gripping power of the sway brace fitting or clamp 14. Additionally, when a compressive load in the general direction 140 (see FIG. 4) is applied to the brace 84 the center plate angled edge 104 which is positioned proximate to the set screw 80 obstructs possible adverse movement of the set screw 80 and, hence, prevents possible bending and/or buckling of the second jaw 112, thereby permitting the sway brace fitting or clamp 14 to be reliably used at higher loading.

In the illustrated embodiment of FIGS. 1–4, the simple manner in which the clamp center plate 76 and the clamp collar plate 78 fit with one another contributes to a number of desirable feature of the sway brace fitting or clamp 14. At least one of these features is partially due to the center plate support 108. A substantial portion of the load applied perpendicular to the plane of the second jaw 112 of the collar plate 78 is supported by the center plate support 108. Advantageously, this load is favorably oriented parallel to the plane of the support 108, and thereby the center plate 76, which effectively improves the strength of the sway brace clamp 14 and allows it to withstand higher loads. Additionally, the support 108 provides a strong physical barrier which resists bending of the second jaw 112 of the collar plate 78.

Therefore, and referring to the illustrated embodiment of FIGS. 1–4 of the clamp 14, the incorporation of the sharp corner 96 in the recess 94 of the center plate first jaw 86, the angled threaded opening 124 in the collar plate second jaw 112, the edge 104 of the center plate 76, and the support 108 of the center plate 76 each contribute not only to enhancing the load-carrying capacity of the sway brace clamp 14, but also provide a built-in safety redundancy which adds extra degrees of security and reliability in use of the sway brace clamp or fitting 14.

The clamp 14 of the preferred embodiments can be attached to any one of a number of braces. These include without limitation different sizes of bracing pipes, angle irons, channels, I-beams, plates, structural steel and the like, a wall of each of which can be gripped by the sway brace clamp 14. This exemplifies the versatility of the sway brace clamp 14 wherein it is adaptable to various types and/or sizes of braces. In contrast, many conventional sway brace clamps or fittings are typically restricted to a single type of brace and would need additional attachment components for accommodating different types of braces, thereby adding to the cost and complexity of the system and its installation.

In one preferred embodiment, the sway brace clamp 14 (FIGS. 1–4) is manufactured by stamping, punching and bending operations as described in U.S. application Ser. No. 09/301,299, filed Apr. 28, 1999, now U.S. Pat. No. 6,273,372 B1, issued Aug. 14, 2001, the entire contents of which are hereby incorporated by reference herein. In other embodiments, the clamp 14 may be efficaciously manufactured by casting, molding, forging, machining, among others, as required or desired, giving due consideration to the goals of providing a clamp or fitting for securely engaging a brace and/or of achieving one or more of the benefits and advantages as disclosed, taught or suggested herein.

The utility and versatility of the sway brace clamp 14 will be readily apparent to those skilled in the art. The sway brace clamp or fitting can not only withstand substantial loads, but is also adaptable to a variety of braces, is simply and expeditiously installable, is economical to manufacture and, hence, desirably inexpensive.

In accordance with one embodiment, FIGS. 9A–9E illustrate a series of steps used to retrofittingly attach the connector 12 of the sway brace assembly 10 to a support rod or bolt 142 without disassembly of the pre-existing installation. One end of the rod 142 is typically connected to a hanger or the like for supporting a load and the other end extends from a structure such as a ceiling, floor, beam and the like. The load can comprise pipes, ducts, sprinkler systems, fans, air-conditioners, heaters, electrical cables, communication lines, among others.

Figure 9A:
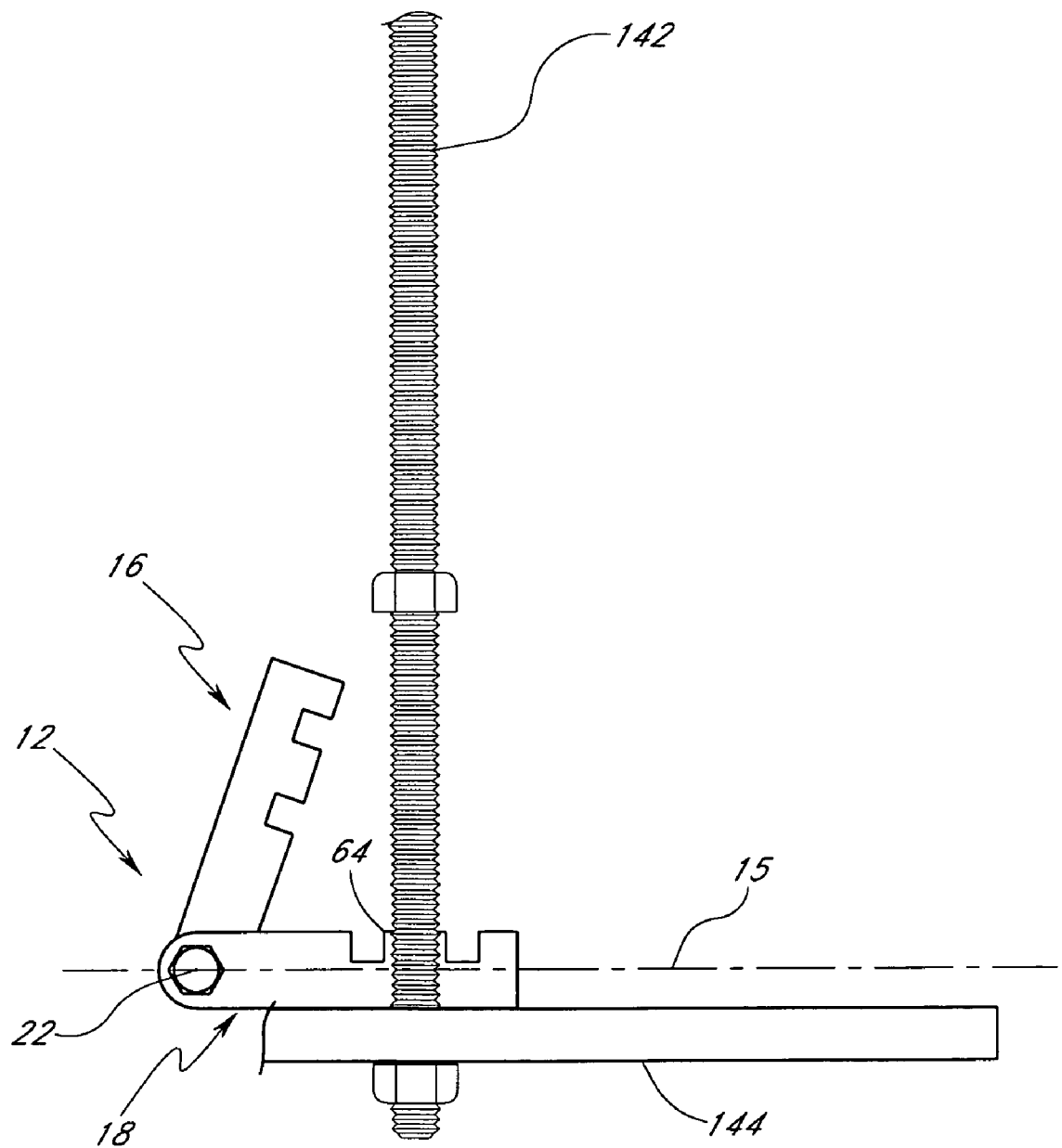

Referring in particular to FIG. 9A, with the connector arms 16 and 18 in an open position, the connector arm 18 engages the rod 142 and partially circumscribes it. More specifically, the portion 64 of the arm 18 engages the rod 142 and partially circumscribes it. The arm 16 is in a generally raised position. In the illustrated embodiment of FIG. 9A, typically, the arm 18 is seated on a hanger 144 or the like connected to the suspended load. Of course, the arm 18 may be positioned higher up on the rod 142 and subsequently lowered later.

Figure 9B:
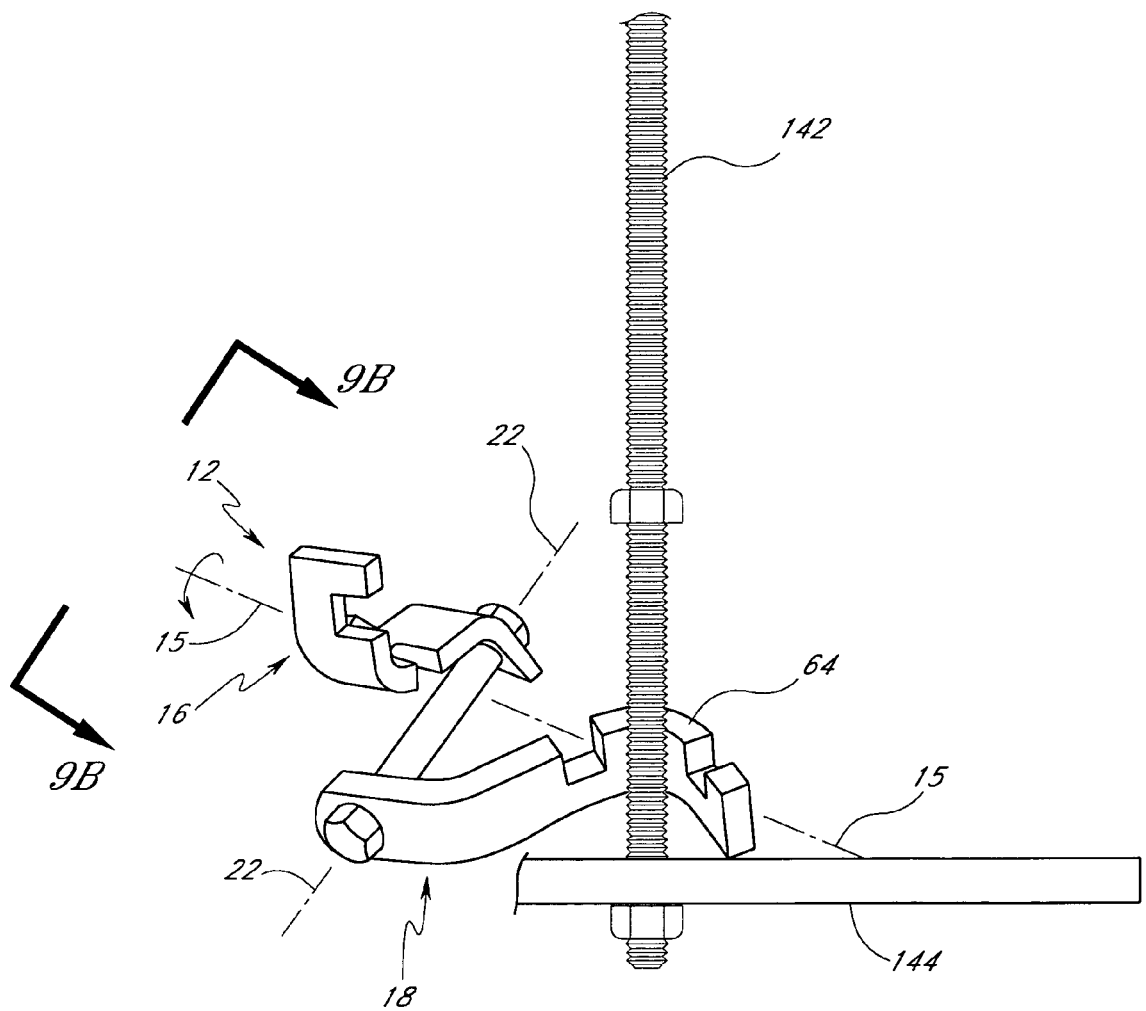

Referring in particular to FIG. 9B, the connector 12 (and hence assembly 10) is angled, pivoted or rotated generally about the longitudinal axis. In the illustrated embodiment of FIG. 9B, when viewing along line 9B—9B, the rotation is generally in a clockwise direction.

Figure 9C:
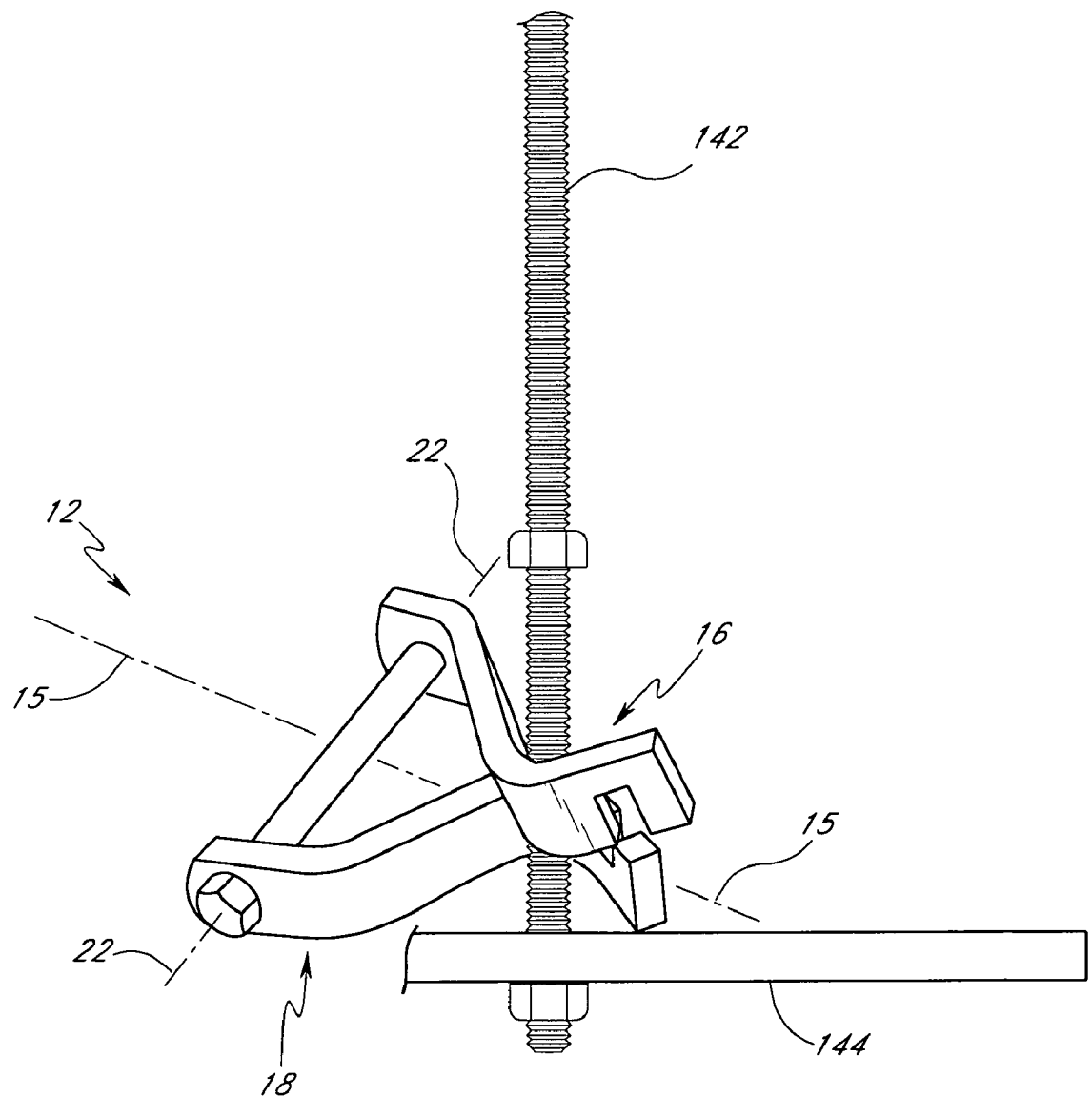

Referring in particular to FIG. 9C, the raised arm 16 is then lowered. That is, the arm 16 pivots or swivels about the rotation axis 22 towards the arm 18. At this stage, typically, the arms 16 and 18 are not interlocked but are close to or in mechanical contact with one another.

Referring in particular to FIG. 9D, the connector 12 (and hence the assembly 10) is again angled, pivoted or rotated generally about the longitudinal axis 15. In the illustrated embodiment of FIG. 9D, when viewed along line 9D—9D, the rotation is generally in a counter-clockwise direction. This rotation straightens the connector 12 (and assembly 10) so that the arms 16 and 18 interlock and capture the rod 142 within the rod- or bolt-receiving cavity 30 formed thereby. More specifically, in this step, the curved/angled wall portion 62 of the arm 16 engages the rod 142 and partially circumscribes it along with the curved/angled wall portion 64 of the arm 18, both of which in combination form the hole 30.

Referring in particular to FIG. 9E, one or more pre-existing nuts 146 or the like are tightened to securely fasten the arms 16, 18, and hence the connector 12 (and assembly 10) to the rod or bolt 142. This generally completes the retrofit installation of the connector 12 to the rod 142. As illustrated further below, the clamp 14 (shown, for example, in FIGS. 1–4) is then secured to a suitable brace which in turn is connected to an overlying structure, to complete the full installation. In the illustrated embodiment of FIG. 9E, the pivot axis 22 of the connector 12 (and assembly 10) is oriented generally perpendicular to the rod or bolt 142 and/or to the longitudinal axis of the rod or bolt 142.

In accordance with another embodiment, FIGS. 10A–10E illustrate a series of steps used to retrofittingly attach the connector 12 of the sway brace assembly 10 to a support rod or bolt 142 without disassembly of the pre-existing installation. As indicated above and discussed further below, one end of the rod 142 is typically connected to a hanger or the like for supporting a load and the other end extends from below a structure such as a ceiling, floor, beam and the like. The load can comprise pipes, ducts, sprinkler systems, fans, air-conditioners, heaters, electrical cables, communication lines, among others.

Figure 10A:
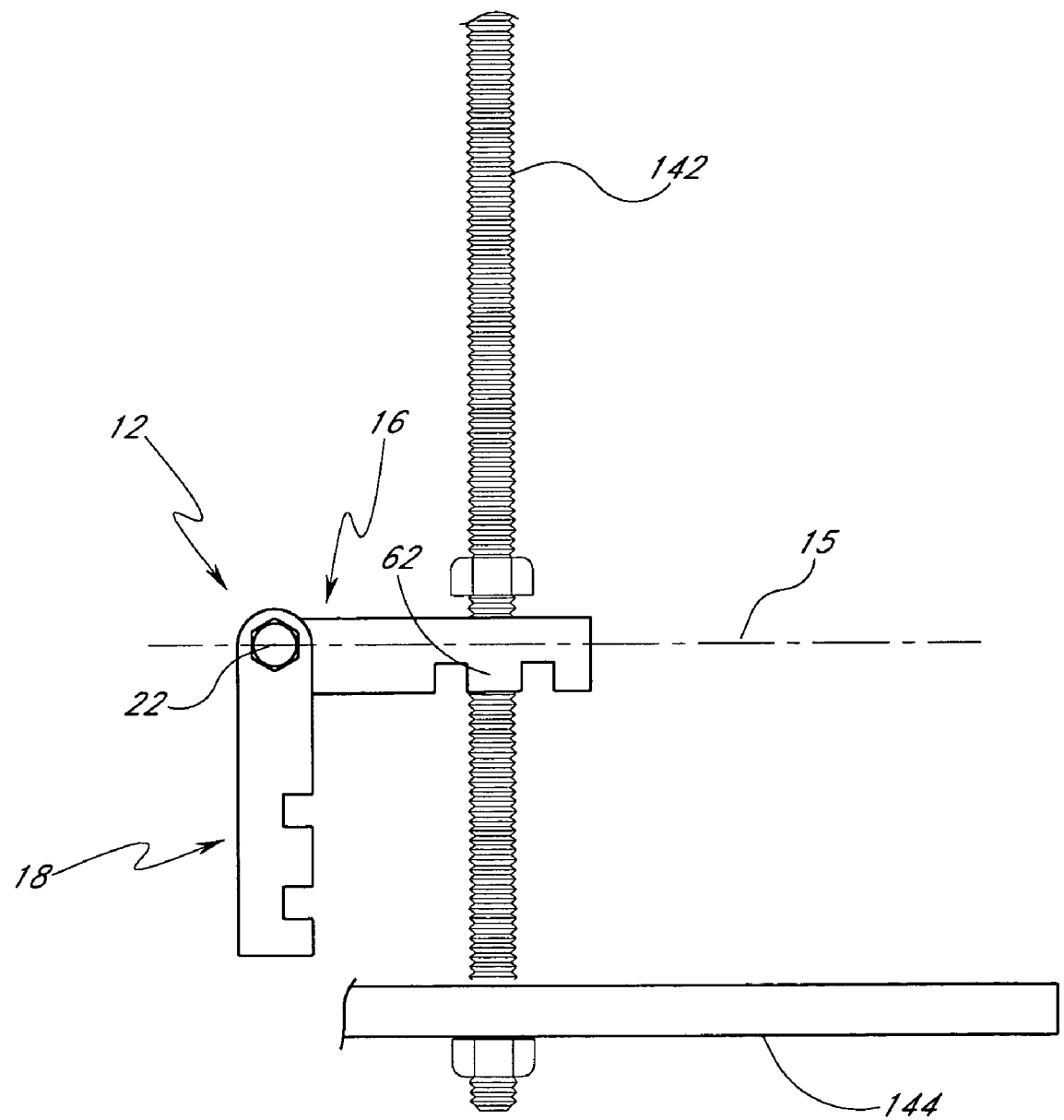

Referring in particular to FIG. 10A, with the connector arms 16 and 18 in an open position, the connector arm 16 engages the rod 142 and partially circumscribes it. More specifically, the portion 62 of the arm 16 engages the rod 142 and partially circumscribes it. The arm 18 is in a generally lowered position. In the illustrated embodiment of FIG. 10A, the arm 16 is spaced from the hanger 144 to provide clearance for the lowered arm 18.

Figure 10B:
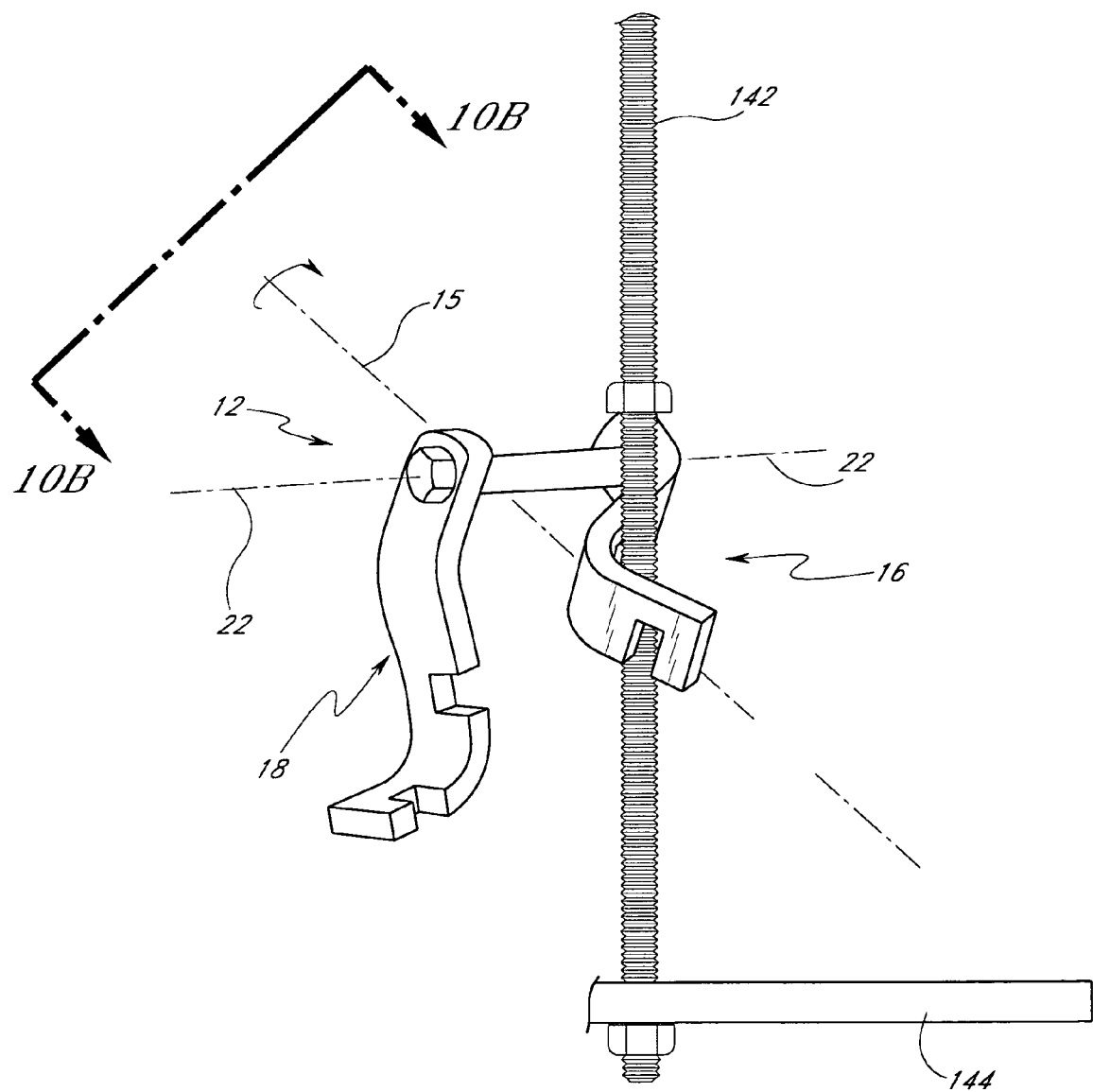

Referring in particular to FIG. 10B, the connector 10 (and hence the assembly 10) is angled, pivoted or rotated generally about the longitudinal axis 15. In the illustrated embodiment of FIG. 10B, when viewed along line 10B—10B, the rotation is generally in a counter-clockwise direction.

Figure 10C:
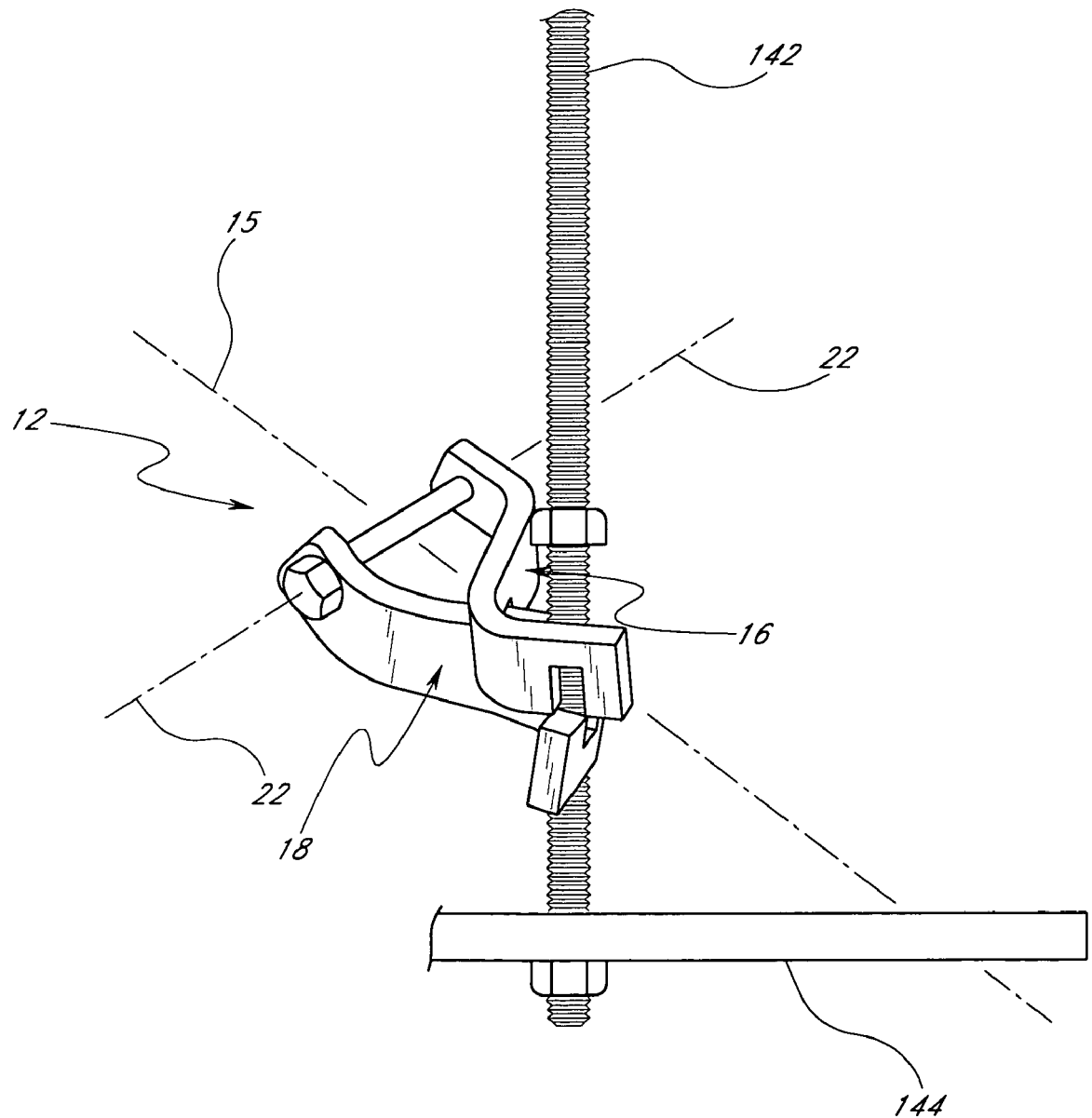

Referring in particular to FIG. 10C, the lower arm 18 is then raised. That is, the arm 18 pivots or swivels about the rotation axis 22 towards the arm 16. At this stage, typically, the arms 16 and 18 are not interlocked but are close to or in mechanical contact with one another.

Figure 10D:
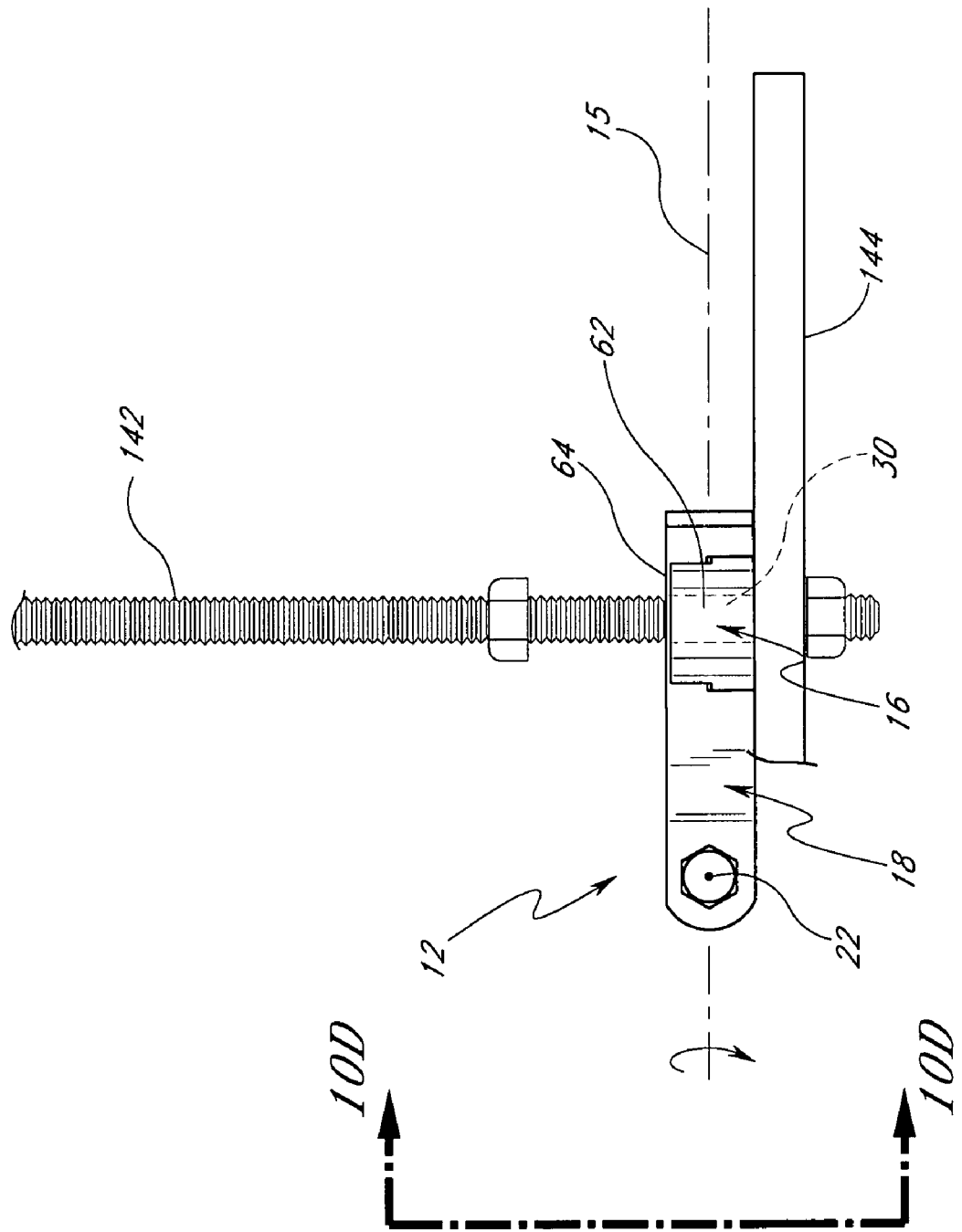

Referring in particular to FIG. 10D, the connector 12 (and hence the assembly 10) is again angled, pivoted or rotated generally about the longitudinal axis 15. In the illustrated embodiment of FIG. 10D, when viewed along line 10D—10D, the rotation is generally in a clockwise direction. This rotation straightens the connector 12 (and the assembly 10) so that the arms 16 and 18 interlock and capture the rod 142 within the rod- or bolt-receiving cavity 30 formed thereby. More specifically, in this step, the curved/angled wall portion 64 of the arm 18 engages the rod 142 and partially circumscribes it along with the curved/angled wall portion 62 of the arm 16, both of which in combination form the hole 30.

Referring in particular to FIG. 10E, one or more pre-existing nuts 146 or the like are tightened to securely fasten the arms 16, 18, and hence the connector 12 and (assembly 10) to the rod or bolt 142. This generally completes the retrofit installation of the connector 12 to the rod 142. As illustrated further below, the clamp 14 (shown, for example, in FIGS. 1–4) is then secured to a suitable brace which in turn is connected to an overlying structure, to complete the full installation. In the illustrated embodiment of FIG. 10E, the pivot axis 22 of the connector 12 (and assembly 10) is oriented generally perpendicular to the rod or bolt 142 and/or to the longitudinal axis of the rod or bolt 142.

Figure 37:
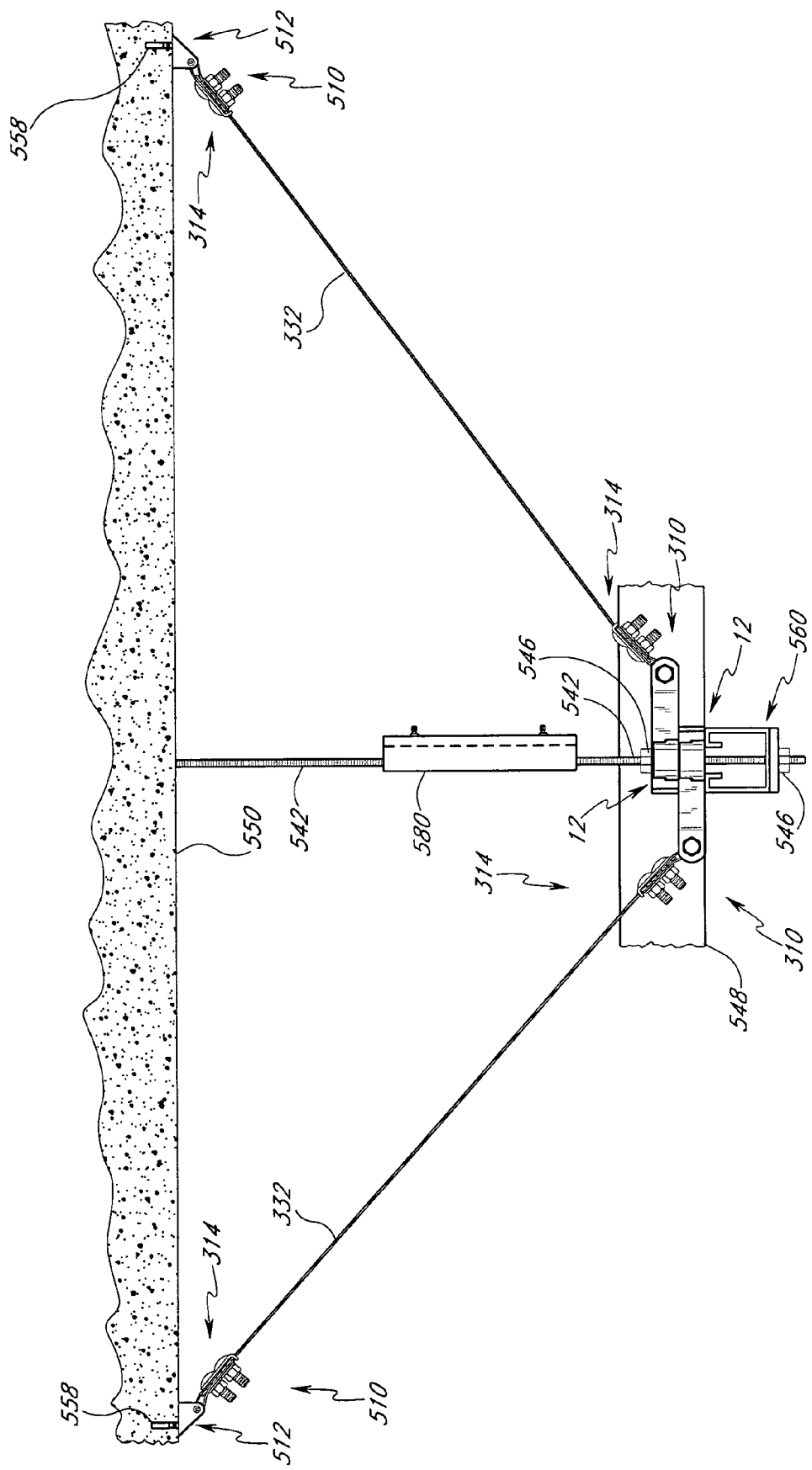
FIG. 37 is a simplified view showing the assemblies of FIGS. 27 and 34 in use supporting a plurality of pipes suspended below a structure in accordance with one embodiment of the invention.
Figure 38:
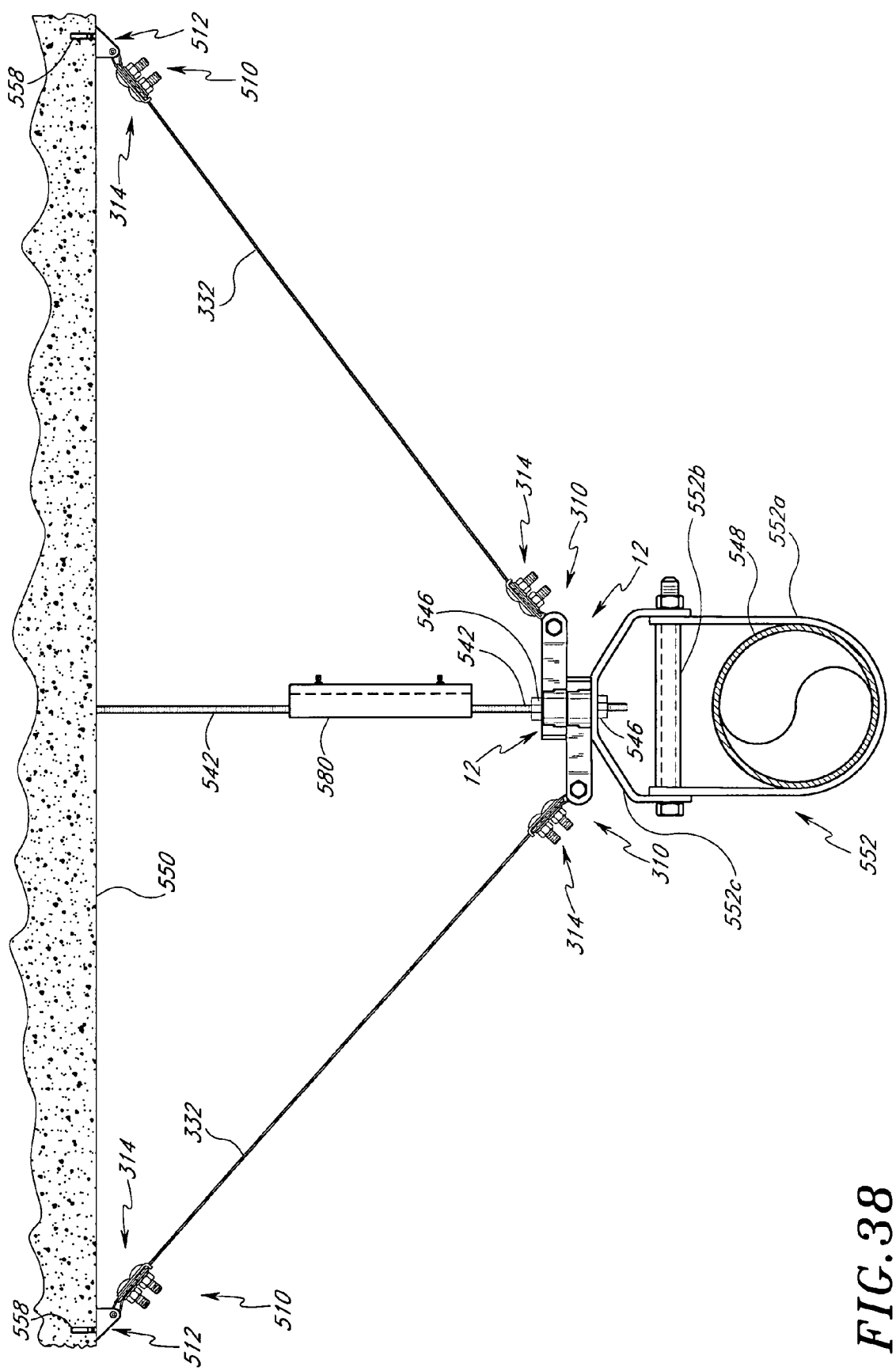
FIG. 38 is a simplified view showing the assemblies of FIGS. 27 and 34 in use supporting a pipe suspended below a structure in accordance with one embodiment of the invention.

It will be appreciated that more than one connector 12 may be utilized in a stacked configuration with the rod- or bolt-receiving passages 30 generally aligned to receive the rod, as needed or desired. (FIGS. 37 and 38 illustrate the use of a stack of two connectors 12 though more may be efficaciously utilized, as needed or desired.)

Figure 11:
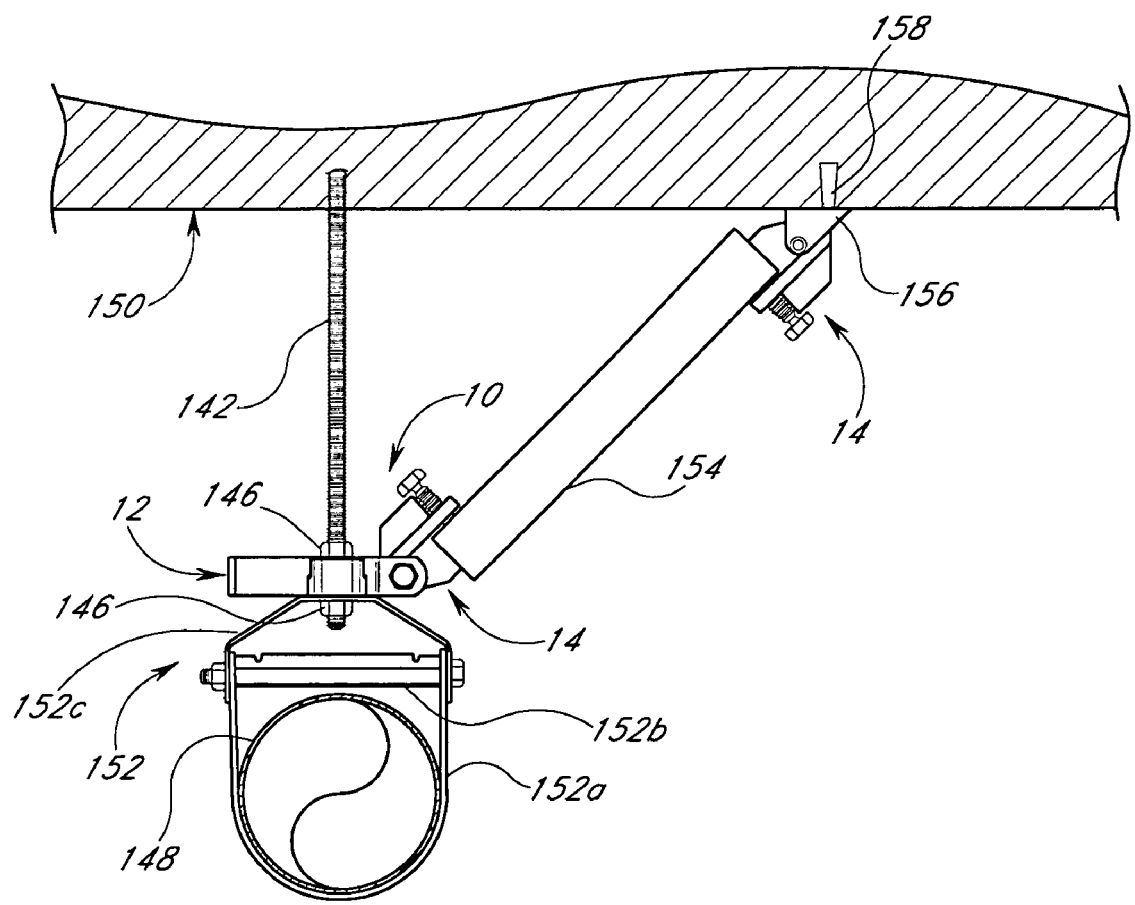
FIG. 11 is a simplified view showing the assembly of FIG. 1 in use supporting a pipe suspended below a structure in accordance with one embodiment of the invention.

FIG. 11 is a simplified view in accordance with one embodiment, showing the seismic connector-clamp assembly 10 in use supporting a load or pipe 148 suspended below a structure 150. A threaded support rod 142 extends from the structure and is engaged with or connected to a clevis hanger 152, as known in the art, supporting the pipe 148. The hanger 152 generally comprises a lower portion 152*a* in which the pipe 148 is received and is connected by a cross-bolt spacer 152*b* to an upper portion 152*c* of the hanger 152 in which an end of the rod 142 is received. The connector 12 receives the rod 142 within the cavity 30 (see, for example, FIG. 1) formed by the interlocking arms 16, 18 and is secured to the hanger 152 by a pair of pre-existing nuts 146 on the rod 142.

Referring to the illustrated embodiment of FIG. 11, the clamp 14 is connected to one end of a pipe brace 154. Of course, other types of braces may be efficaciously utilized, as needed or desired. The other end of the brace 154 is connected to the structure 150 by another clamp 14 attached to a yoke member 156. The yoke 156 is secured to the structure 150 by an anchor, bolt or screw 158 or the like. In other embodiments, the upper end of the brace 154 may be connected to the structure 150 using other suitable attachment devices with efficacy, as required or desired, giving due consideration to the goals of reliably supporting a load against adverse sway and seismic disturbances and/or of achieving one or more of the benefits and advantages as disclosed, taught or suggested herein.

Figure 12:
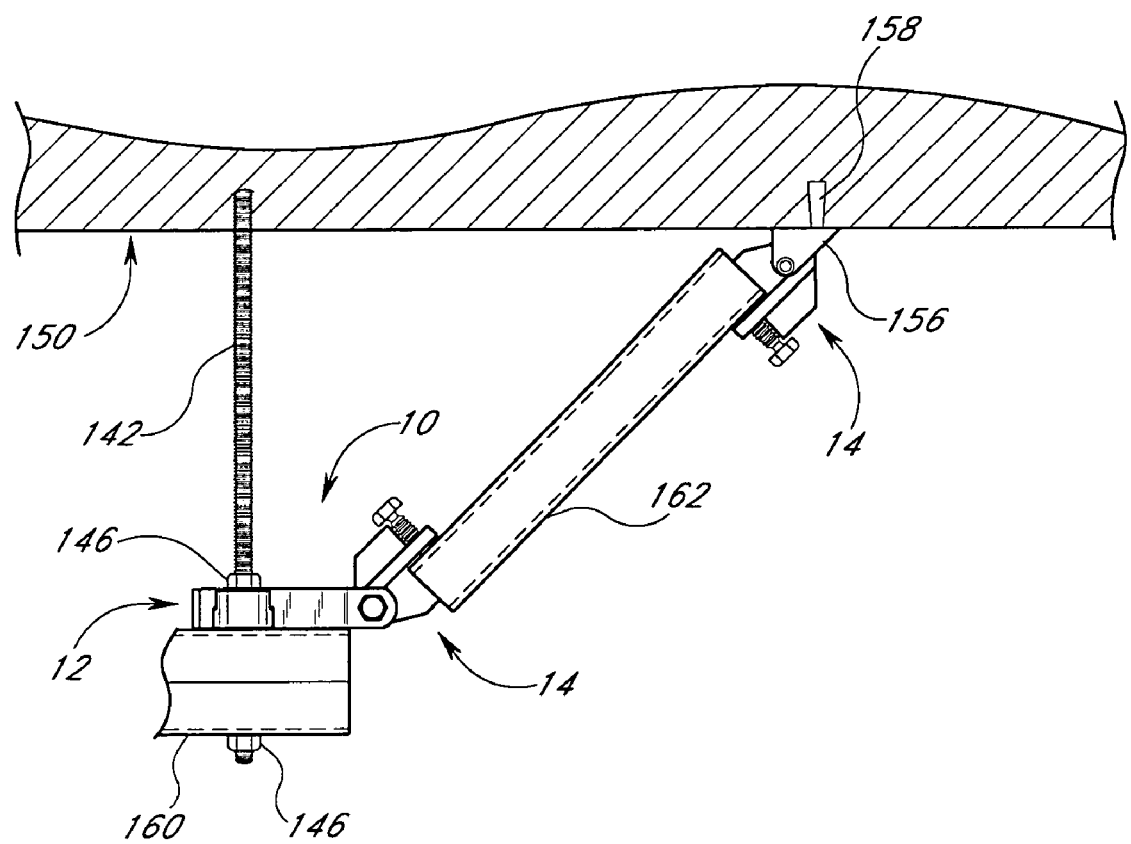
FIG. 12 is a simplified view showing the assembly of FIG. 1 in use supporting a trapeze hanger suspended below a structure in accordance with one embodiment of the invention.

FIG. 12 is a simplified view in accordance with another embodiment, showing the installation of the seismic connector-clamp assembly 10 below a structure 150. A threaded support rod 142 extends from the structure and is engaged with or connected to a trapeze type hanger 160, as known in the art, for supporting a load such as one or more pipes (not shown) seated on and/or secured to the hanger 160. The connector 12 receives the rod 142 within the cavity 30 (see, for example, FIG. 1) formed by the interlocking arms 16, 18 and is secured to the hanger 160 by a pair of pre-existing nuts 146 on the rod 142.

Referring to the illustrated embodiment of FIG. 12, the clamp 14 is connected to one end of a channel brace 162. Of course, other types of braces may be efficaciously utilized, as needed or desired. The other end of the brace 162 is connected to the structure 150 by another clamp 14 attached to a yoke member 156. The yoke 156 is secured to the structure 150 by an anchor, bolt or screw 158 or the like. In other embodiments, the upper end of the brace 162 may be connected to the structure 150 using other suitable attachment devices with efficacy, as required or desired, giving due consideration to the goals of reliably supporting a load against adverse sway and seismic disturbances and/or of achieving one or more of the benefits and advantages as disclosed, taught or suggested herein.

Though the embodiments of FIGS. 11 and 12 show the load suspended below a generally horizontal surface with the yoke 156 attached thereto, those of ordinary skill in the art will appreciate that the yoke 156 or other attachment device, used in conjunction with any of the preferred embodiments, may be efficaciously attached to other surfaces, as needed or desired. For example, the yoke 156 may be attached to a generally vertical beam or wall or to an inclined surface.

The skilled artisan will also appreciate that in the situation that a retrofit connection is not needed or desired, the yoke 556 may be substituted for the retrofit connector 12 in FIGS. 11 and 12. Also, the retrofit connector 12 and other retrofit connectors of the preferred embodiments may be utilized in conjunction with a new, that is, not pre-existing, installation with efficacy, as needed or desired. This facilitates, for example, in adjustment, removal, and/or replacement of the retrofit connector and/or of the installation.

Also, as the skilled artisan will appreciate, that though the embodiments of FIGS. 11 and 12 refer to supporting one or more pipes, other loads may be efficaciously supported in conjunction with any of the preferred embodiments, as needed or desired. These include, without limitation, ducts, sprinkler systems, fans, air-conditioners, heaters, electrical cables, communication lines, and the like, among others.

Figure 13:
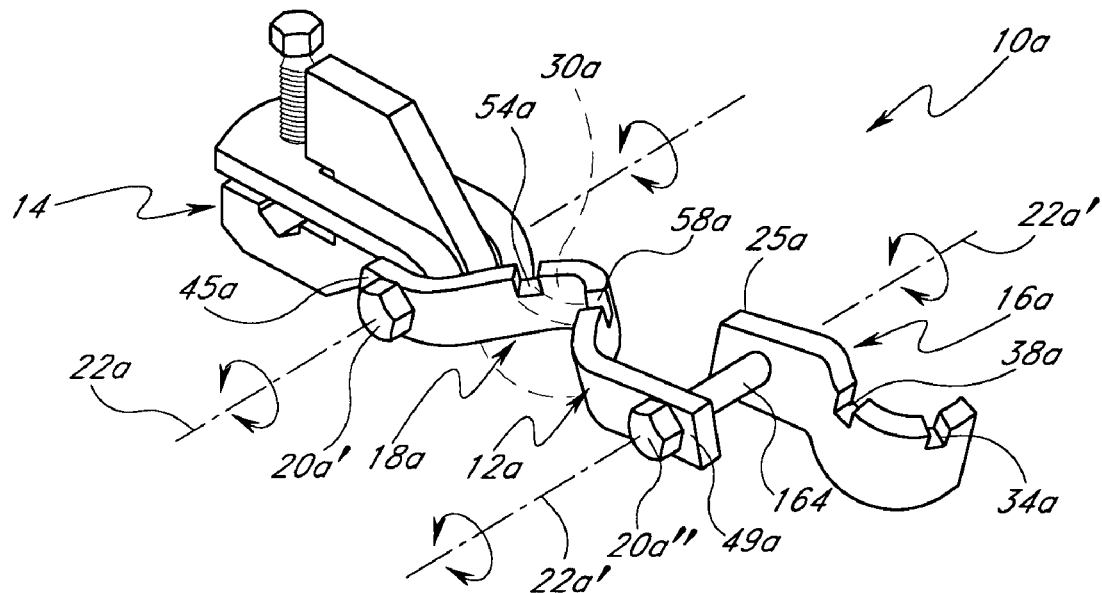
FIG. 13 is a perspective view of a double-hinged interlocking swivel connector and sway brace clamp assembly having features and advantages in accordance with one embodiment of the invention.

FIG. 13 shows a seismic brace assembly 10a, in accordance with one embodiment, comprising a modified double-hinged swivel interlocking connector 12a and the brace clamp 14. The connector 12a provides a retrofit connection to a support rod or bolt of a pre-existing installation. Though, in the embodiment of FIG. 13, the connector 12a is shown attached to the clamp 14, it should be appreciated that the connector 12a may be efficaciously used in conjunction with a wide variety of other suitable clamps, fittings, attachments and the like, some of which are disclosed later herein.

In the illustrated embodiment of FIG. 13, the double-hinged connector 12a comprises a pair of swivelably interlocking arms or interlock elements 16a, 18a. A proximal end or portion (or alternatively a distal end or portion) 45a of the arm 18a is connected to the clamp 14 by a pin, bolt or rivet 20a' and is pivotable about a rotation axis 22a generally defined by the longitudinal axis of the pin 20a'. A distal end or portion (or alternatively a proximal end or portion) 49a of the arm 18a is connected to a pin, bolt or rivet 20a". The arm 18a has a pair of spaced slots 54a, 58a to receive and interlock with the arm 16a and form a support rod- or bolt-receiving cavity 30a (shown in phantom).

In the illustrated embodiment of FIG. 13, the arm 18a is also swivelable or rotatable about an axis 22a' generally defined by the longitudinal axis of the pin 20a". In a modified embodiment, the arm 18a is fixed in position (not rotatable) relative to the axis 22a'.

In the illustrated embodiment of FIG. 13, the arm 16a has a proximal end 25a pivotably connected to the pin, bolt or rivet 20a" and pivotable, rotatable or swivelable about the axis 22a'. The proximal end 25a is, in one embodiment, spaced from the distal end 49a of the other arm 18a by a spacer 164 or the like. The arm 16a has a pair of spaced slots 34a, 38a which overlap with respective slots 54a, 58a to receive and interlock with the arm 18a and form the support rod- or bolt-receiving cavity 30a (shown in phantom). As discussed before, pre-existing nuts or the like are used to secure the connector 12a to the support rod or bolt to complete the installation.

In one embodiment, the pin 20a' comprises a rivet or the like and the arm 18a is permanently or quasi-permanently connected to the pin 20a' and/or clamp 14. In another embodiment, the pin 20a' comprises a bolt or the like and the arm 18a is removably or releasably connected to the pin 20a and/or clamp 14.

In one embodiment, the pin 20a" comprises a rivet or the like and the arm 18a is permanently or quasi-permanently connected to the pin 20a". In another embodiment, the pin 20a" comprises a bolt or the like and the arm 18a is removably or releasably connected to the pin 20a".

In one embodiment, the pin 20a" comprises a rivet or the like and the arm 16a is permanently or quasi-permanently connected to the pin 20a". In another embodiment, the pin 20a" comprises a bolt or the like and the arm 16a is removably or releasably connected to the pin 20a".

In a modified embodiment, and as discussed above in connection with the embodiments of FIGS. 1–7, the connector arms 16a, 18a each only comprise a respective single slot 38a, 58a and intersect or overlap at only one location to form a rod- or bolt-receiving passage. This configuration achieves at least some of the benefits and advantages as disclosed, taught or suggested herein.

Figure 14:
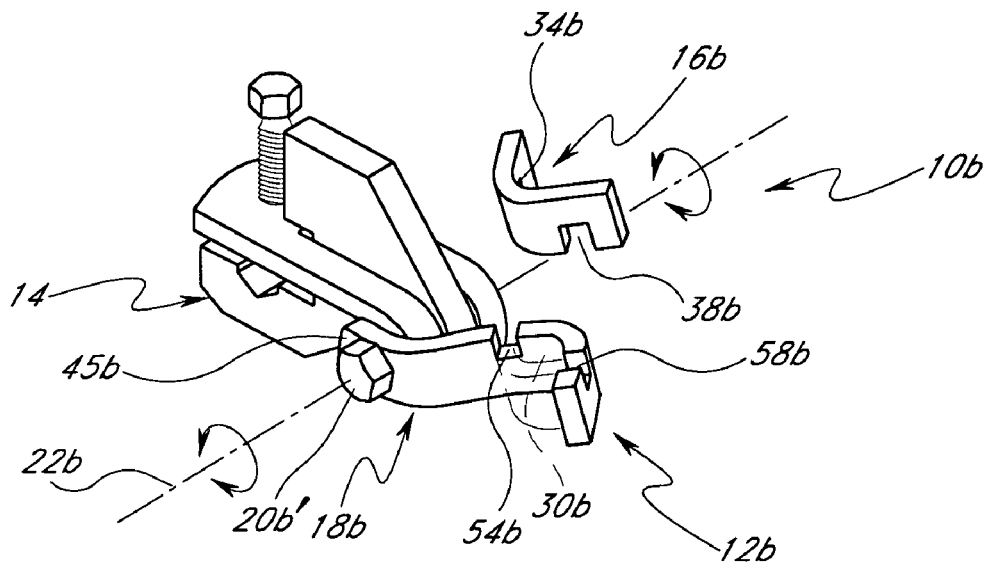
FIG. 14 is a perspective view of a two-piece interlocking connector and sway brace clamp assembly having features and advantages in accordance with one embodiment of the invention.

FIG. 14 shows a seismic brace assembly 10b, in accordance with one embodiment, comprising a modified two-piece interlocking connector 12b and the brace clamp 14. The connector 12b provides a retrofit connection to a support rod or bolt of a pre-existing installation. Though, in the embodiment of FIG. 14, the connector 12b is shown with the clamp 14, it should be appreciated that the connector 12b may be efficaciously used in conjunction with a wide variety of other suitable clamps, fittings, attachments and the like, some of which are disclosed later herein.

In the illustrated embodiment of FIG. 14, the connector 12b comprises a pair of interlocking arms or interlock elements 16b, 18b. A proximal end or portion 45b of the arm 18b is connected to the clamp 14 by a pin, bolt or rivet 20b' and is pivotable about a rotation axis 22b generally defined by the longitudinal axis of the pin 20b'. The arm 18b has a pair of spaced slots 54b, 58b to receive and interlock with the arm 16b and form a support rod- or bolt-receiving cavity 30b (shown in phantom).

In the illustrated embodiment of FIG. 14, the arm or bracket 16a is provided as a separate piece that interlocks with the arm 18b during installation of the connector 12b. The arm 16b has a pair of spaced slots 34b, 38b which overlap with respective slots 54b, 58b to receive and interlock with the arm 18b and form the support rod- or bolt-receiving cavity 30b (shown in phantom). As discussed before, pre-existing nuts or the like are used to secure the connector 12a to the support rod or bolt to complete the installation.

In one embodiment, the pin 20b' comprises a rivet or the like and the arm 18b is permanently or quasi-permanently connected to the pin 20b' and/or clamp 14. In another embodiment, the pin 20b' comprises a bolt or the like and the arm 18b is removably or releasably connected to the pin 20b' and/or clamp 14.

In a modified embodiment, and as discussed above in connection with the embodiments of FIGS. 1–7, the connector arms 16b, 18b each only comprise a respective single slot 34b, 54b or 38b, 58b and intersect or overlap at only one location to form a rod- or bolt-receiving passage. This configuration achieves at least some of the benefits and advantages as disclosed, taught or suggested herein.

Figure 15:
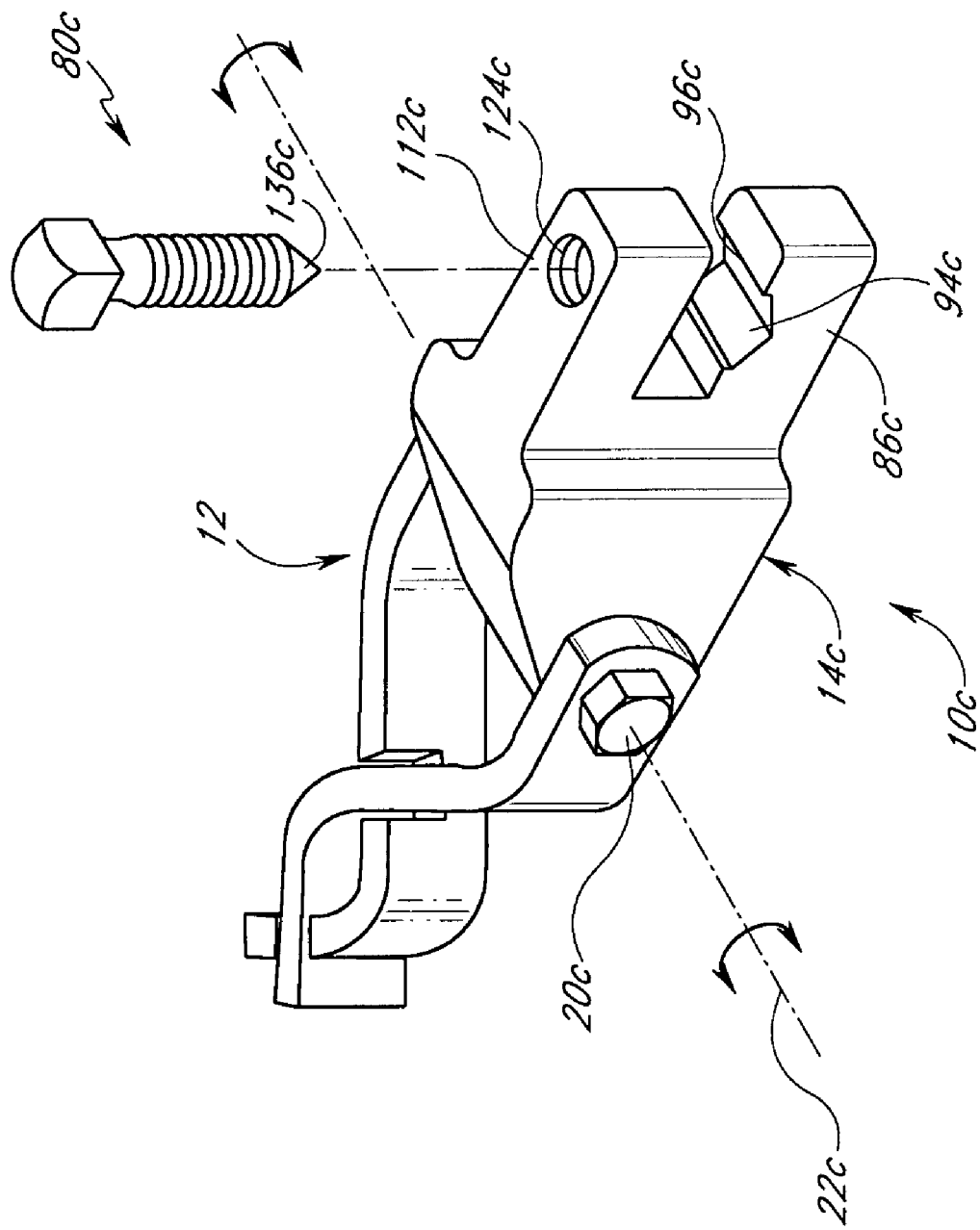
FIG. 15 is a perspective view of an interlocking swivel connector and sway brace clamp assembly having features and advantages in accordance with one embodiment of the invention.

FIG. 15 shows a seismic brace assembly 10c, in accordance with one embodiment, comprising the swivel interlock connector 12 and a sway brace clamp 14c which is preferably casted as a single piece. The assembly 10c by utilizing the connector 12 provides a retrofit connection to a support rod or bolt of a pre-existing installation. The clamp 14c is used to connect the assembly 10c to a brace, for example, a bracing pipe, a channel, an angle iron, an I-beam, a plate, structural steel and the like, a wall of each of which can be forcibly gripped by the sway brace clamp 14c.

The clamp 14c is a modified embodiment of the clamp 14 (see FIGS. 1–4) and essentially unifies the plates 76 and 78 of the clamp 14. In the illustrated embodiment of FIG. 15, the casted clamp 14c is substantially cannon-shaped, but is functionally substantially equivalent to the illustrated clamp 14 (see FIGS. 1–4).

In the illustrated embodiment of FIG. 15, the clamp 14c has a first jaw 86c with a recess 94c which in turn preferably includes a sharp corner 96c. The clamp 14c further includes a second jaw 112c with a threaded opening 124c, preferably angled, for receiving a set screw 80c, preferably having a cone point 136c. The set screw 136c deformingly engages a brace wall inserted between the clamp jaws 86c and 112c so that the clamp can securely grip a brace.

In the illustrated embodiment of FIG. 15, a connector pin, bolt or rivet 20c mechanically connects the clamp 14c and the connector 12. The longitudinal axis of the pin 20c generally defines a rotation or pivot axis 22c about which the clamp 14c and the connector 12 can rotate, pivot or swivel.

In one embodiment, the pin 20c comprises a rivet or the like and the connector 12 and clamp 14c are permanently or quasi-permanently connected to one another. In another embodiment, the pin 20c comprises a bolt or the like and the connector 12 and clamp 14c are removably or releasably connected to one another.

Figure 16:
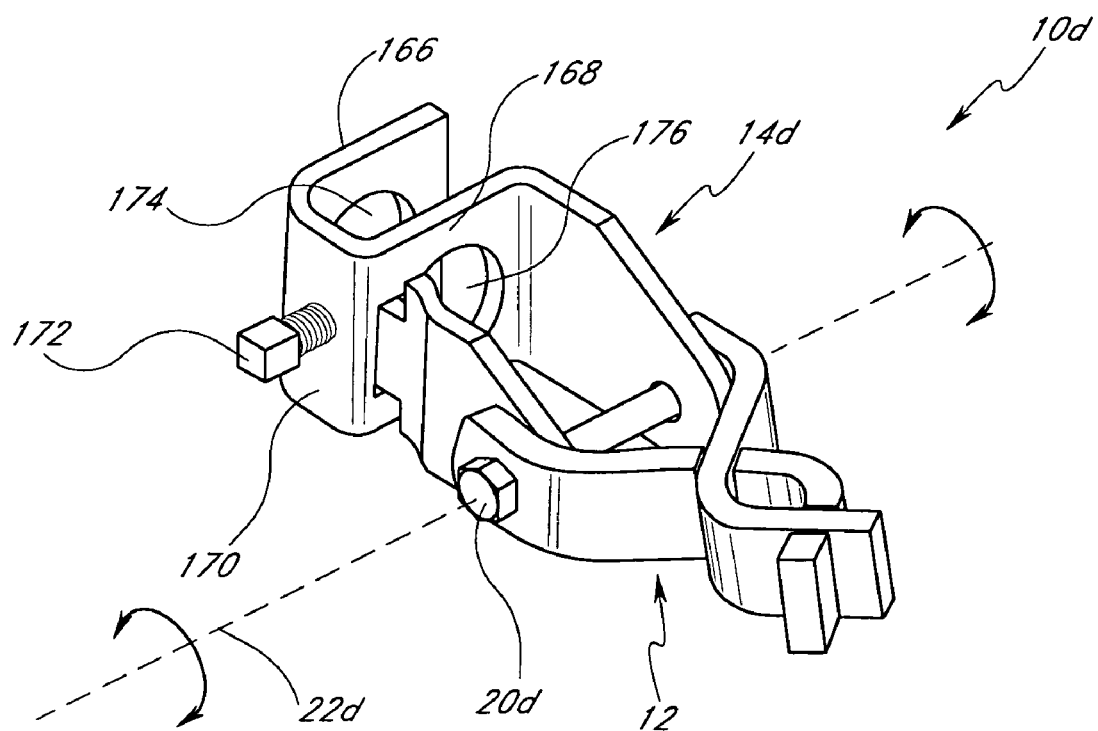
FIG. 16 is a perspective view of an interlocking swivel connector and sway brace attachment assembly having features and advantages in accordance with one embodiment of the invention.

FIG. 16 shows a seismic brace assembly 10d, in accordance with one embodiment, comprising the swivel interlock connector 12 and a sway brace attachment or fitting 14d. The assembly 10d by utilizing the connector 12 provides a retrofit connection to a support rod or bolt of a pre-existing installation. The fitting 14d is used to connect the assembly 10d to a brace, preferably, to a bracing pipe.

In the illustrated embodiment of FIG. 16, the fitting 14d generally comprises a pair of walls 166 and 168 spaced apart by an end wall 170 having a threaded opening for receiving a set screw or bolt 172. The first wall 166 has a through hole 174 generally aligned with a through hole 176 of the second wall 168 to form a passage therebetween and therethrough for receiving a brace, preferably, a bracing pipe. The set screw 172 preferably has a hardened cone point for forcibly and deformingly engaging a wall of the brace to securely connect the fitting 14d to the brace. Typically, the screw 172 is tightened until its head bottoms out. Advantageously, the open design provided by the illustrated fitting 14d allows for easy inspection of pipe engagement.

In the illustrated embodiment of FIG. 16, a connector pin, bolt or rivet 20d mechanically connects the fitting 14d and the connector 12. The longitudinal axis of the pin 20d generally defines a rotation or pivot axis 22d about which the fitting 14d and the connector 12 can rotate, pivot or swivel.

In one embodiment, the pin 20d comprises a rivet or the like and the connector 12 and fitting 14d are permanently or quasi-permanently connected to one another. In another embodiment, the pin 20d comprises a bolt or the like and the connector 12 and fitting 14d are removably or releasably connected to one another.

Figure 17:
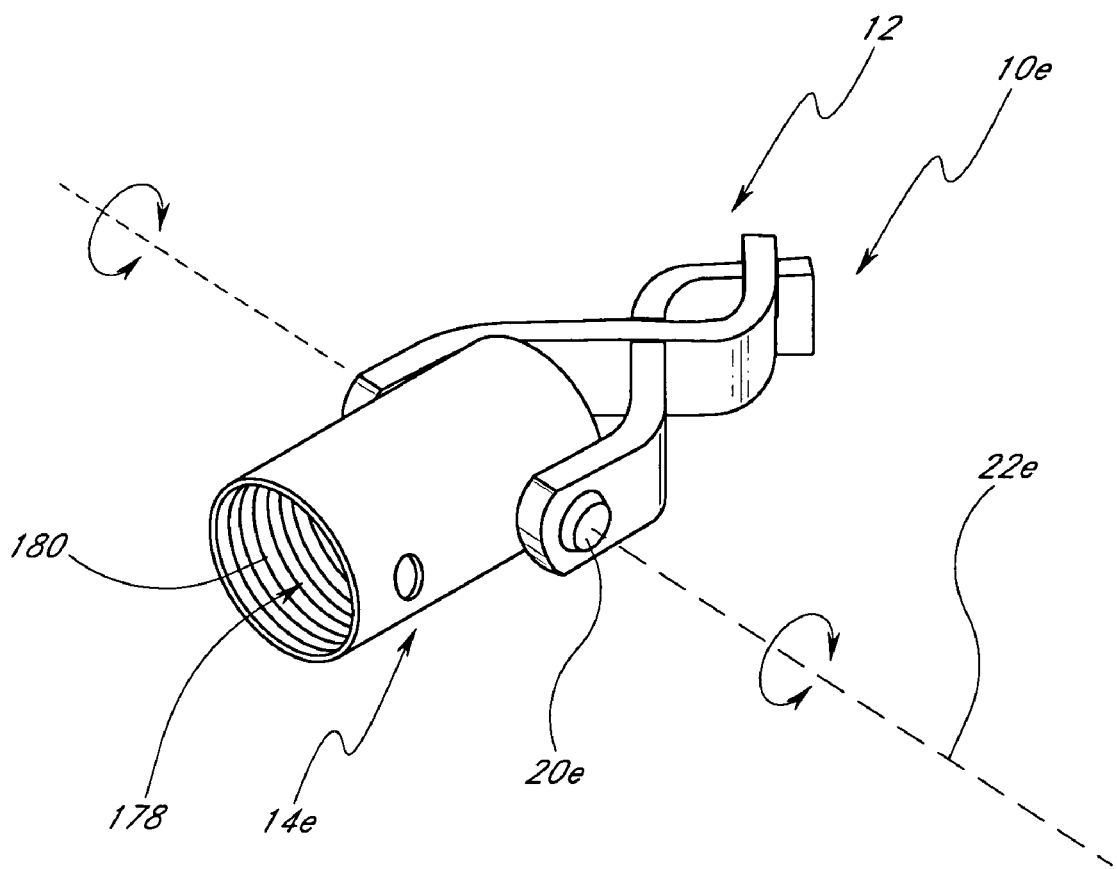
FIG. 17 is a perspective view of an interlocking swivel connector and sway brace attachment assembly having features and advantages in accordance with one embodiment of the invention.

FIG. 17 shows a seismic brace assembly 10e, in accordance with one embodiment, comprising the swivel interlock connector 12 and a sway brace attachment or fitting 14e. The assembly 10e by utilizing the connector 12 provides a retrofit connection to a support rod or bolt of a pre-existing installation. The fitting 14e is used to connect the assembly 10e to a brace, preferably, to a bracing pipe.

In the illustrated embodiment of FIG. 17, the fitting 14e is generally cylindrical in shape and comprises an inner opening 178 with female threads 180. The threaded opening 178 is adapted to engage a bracing pipe having male threads at one end so as to secure the fitting 10e to the bracing pipe.

In the illustrated embodiment of FIG. 17, a connector pin, bolt or rivet 20e mechanically connects the fitting 14e and the connector 12. The longitudinal axis of the pin 20e generally defines a rotation or pivot axis 22e about which the fitting 14e and the connector 12 can rotate, pivot or swivel.

In one embodiment, the pin 20e comprises a rivet or the like and the connector 12 and fitting 14e are permanently or quasi-permanently connected to one another. In another embodiment, the pin 20e comprises a bolt or the like and the connector 12 and fitting 14e are removably or releasably connected to one another.

Figure 18:
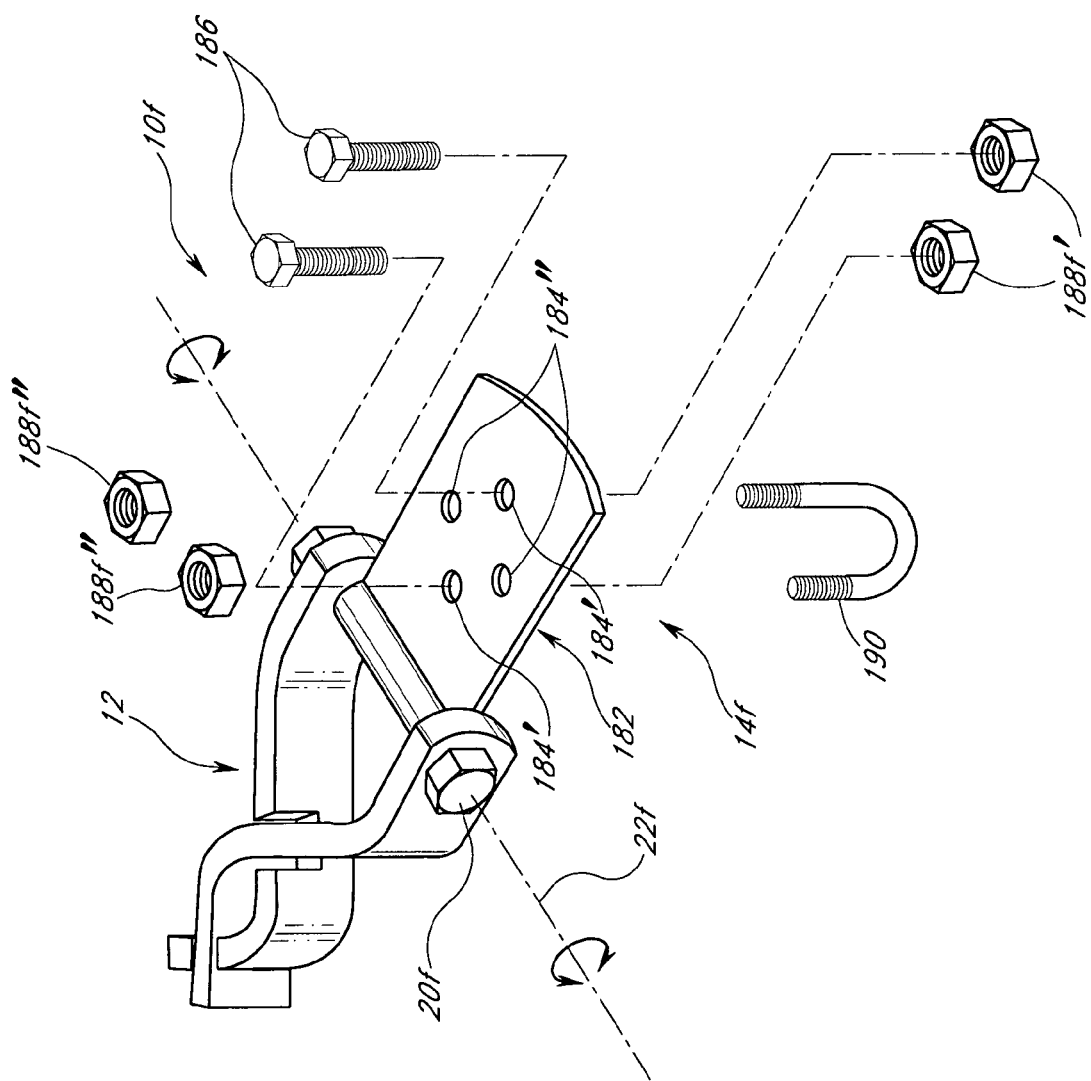
FIG. 18 is a perspective view of an interlocking swivel connector and sway brace attachment assembly having features and advantages in accordance with one embodiment of the invention.

FIG. 18 shows a seismic brace assembly 10f, in accordance with one embodiment, comprising the swivel interlock connector 12 and a sway brace attachment or fitting 14f. The assembly 10f by utilizing the connector 12 provides a retrofit connection to a support rod or bolt of a pre-existing installation. The fitting 14f is used to connect the assembly 10f to a brace such as a bracing pipe, channel or the like.

In the illustrated embodiment of FIG. 18, the fitting 14f generally comprises a plate 182 having through holes 184 for receiving one or more fasteners to connect the fitting 14f to a brace. In one embodiment, the fasteners comprise bolts or screws 186 which in combination with nuts 188f' secure the fitting 14f to the brace, such as a channel or the like, by engaging suitably configured spaced holes at one end of the brace and the holes 184'. In another embodiment, the fastener comprises a U-bolt 190 which in combination with nuts 188f' secures the fitting 14f to the brace, such as a pipe or the like, by receiving one end of the brace and engaging the holes 184".

In the illustrated embodiment of FIG. 18, a connector pin, bolt or rivet 20f mechanically connects the fitting 14f and the connector 12. The longitudinal axis of the pin 20f generally defines a rotation or pivot axis 22f about which the fitting 14f and the connector 12 can rotate, pivot or swivel.

In one embodiment, the pin 20f comprises a rivet or the like and the connector 12 and fitting 14f are permanently or quasi-permanently connected to one another. In another embodiment, the pin 20f comprises a bolt or the like and the connector 12 and fitting 14f are removably or releasably connected to one another.

Figure 19:
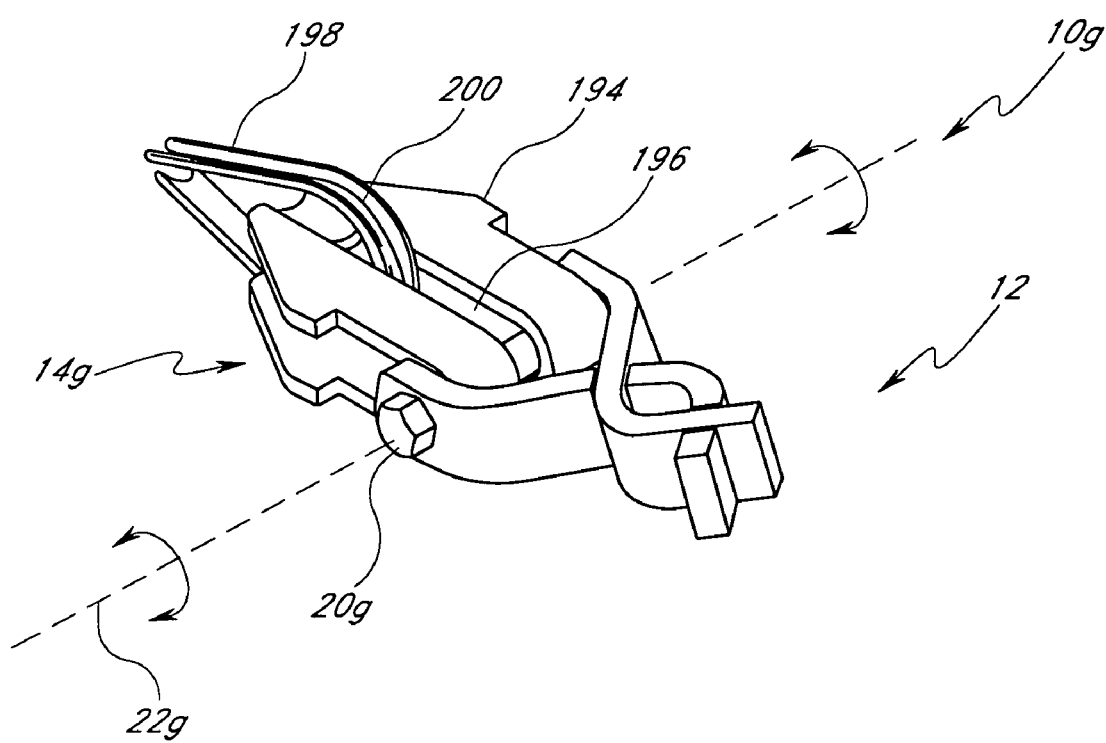
FIG. 19 is a perspective view of an interlocking swivel connector and cable sway brace attachment assembly having features and advantages in accordance with one embodiment of the invention.
Figure 20:
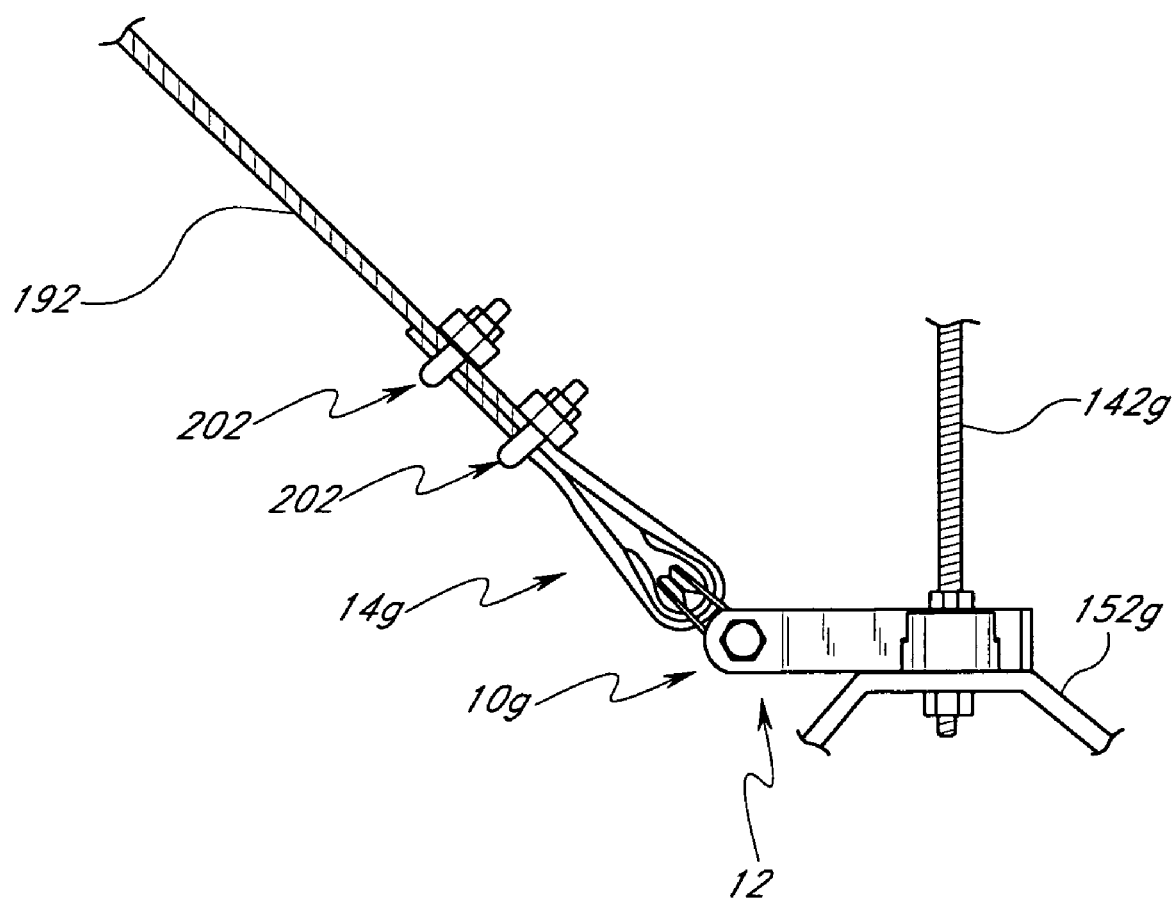
FIG. 20 is a simplified view showing the assembly of FIG. 19 in use connected to a support rod for supporting a load below a structure in accordance with one embodiment of the invention.

FIGS. 19 and 20 shows a seismic brace assembly 10g, in accordance with one embodiment, comprising the swivel interlock connector 12 and a cable brace attachment or fitting 14g. The assembly 10g by utilizing the connector 12 provides a retrofit connection to a support rod or bolt 142g (see FIG. 20) of a pre-existing installation. As shown in FIG. 20, the fitting 14g is used to connect the assembly 10g to a cable brace 192.

In the illustrated embodiment of FIG. 19, the cable sway brace attachment 14g generally comprises a generally U-shaped main body portion 194 that generally loops around a pin, bolt or rivet 20g whose longitudinal axis generally defines a rotation or pivot axis 22g about which the connector 12 and the attachment 14g can rotate, pivot or swivel. The main body portion 194 has a generally central slot 196 which is also generally U-shaped and loops about the bolt 20g.

In the illustrated embodiment of FIG. 19, the cable sway brace attachment or fitting 14g further comprises a cable guide rail or clip 198. As shown in FIG. 19, the guide rail 198 generally loops through the slot 196 of the main body portion 194. The guide rail includes a groove 200 for receiving and aligning the cable 192.

In one embodiment, the pin 20g comprises a rivet or the like and the connector 12 and attachment 14g are permanently or quasi-permanently connected to one another. In another embodiment, the pin 20g comprises a bolt or the like and the connector 12 and attachment 14g are removably or releasably connected to one another.

The use of the seismic brace assembly 10g is best seen in FIG. 20. The connector 12 is attached to the support rod 142g which in turn is connected to a hanger 152g or the like to support a load below a structure. The cable brace attachment 14g is secured to the cable 192. One end of the cable 192 loops over the guide rail 198 (see FIG. 19) and is secured in position by cable fasteners clamps 202, as are known in the art.

Another Retrofit Connector and Clamp Assembly

Figure 21:
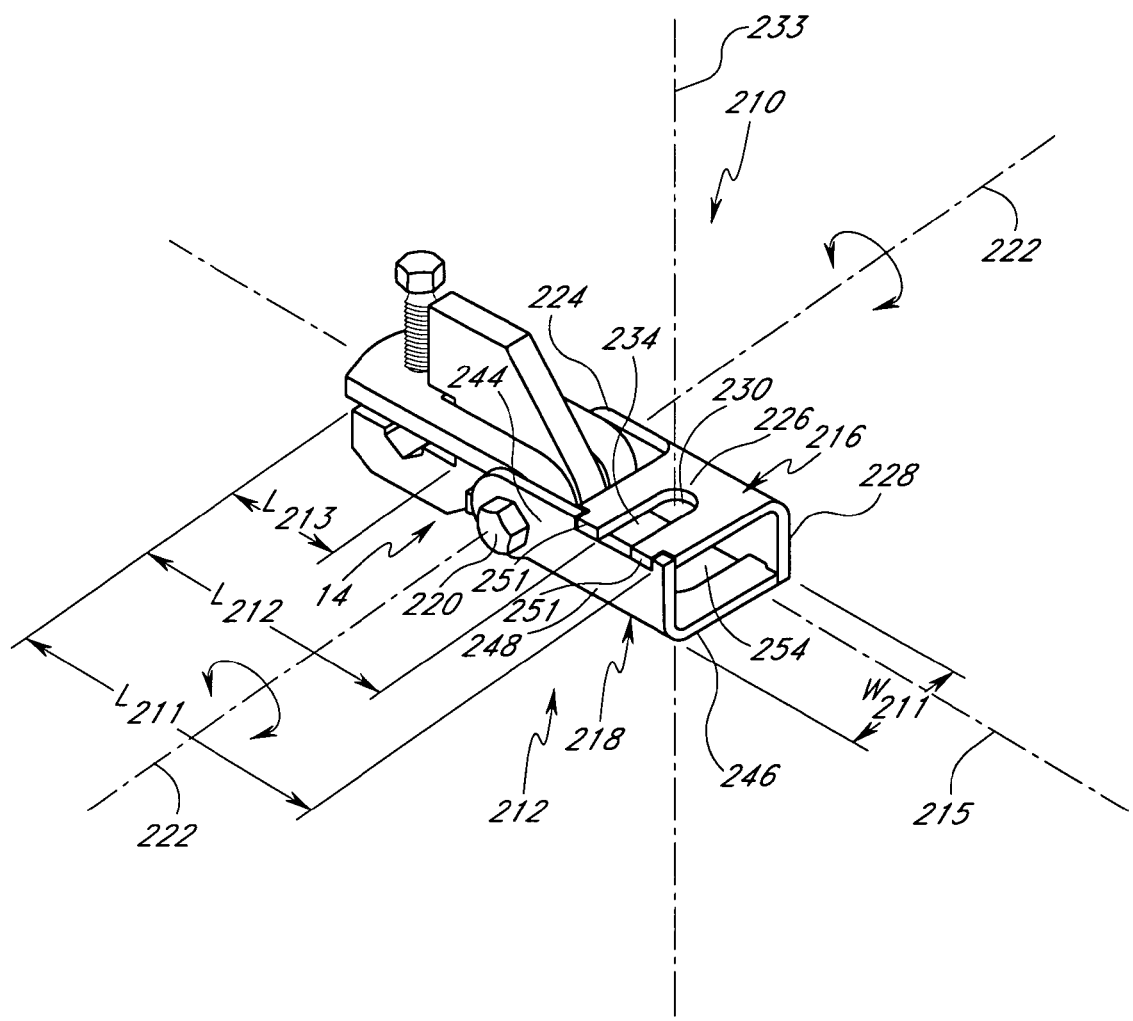
FIG. 21 is a perspective view of an interlocking swivel connector and sway brace clamp assembly having features and advantages in accordance with another embodiment of the invention.
Figure 22:
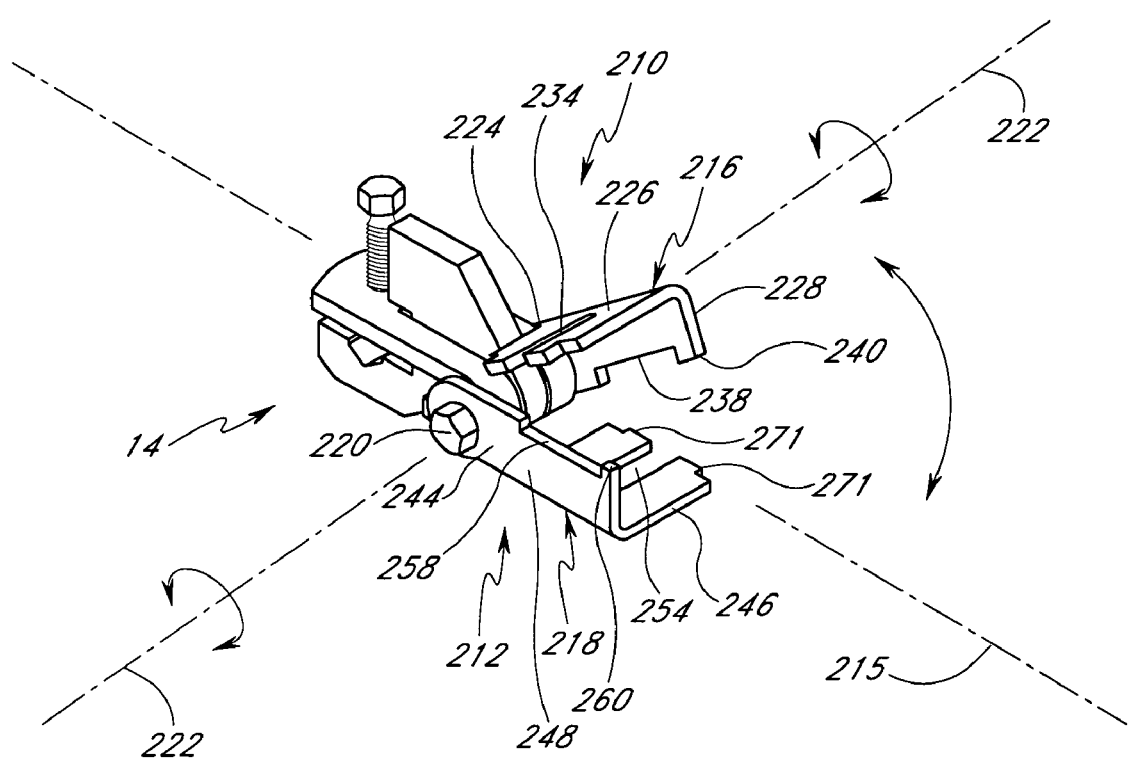
FIG. 22 is a perspective view of the assembly of FIG. 21 showing the interlocking swivel connector with its interlocking elements disengaged from one another.
Figure 23:
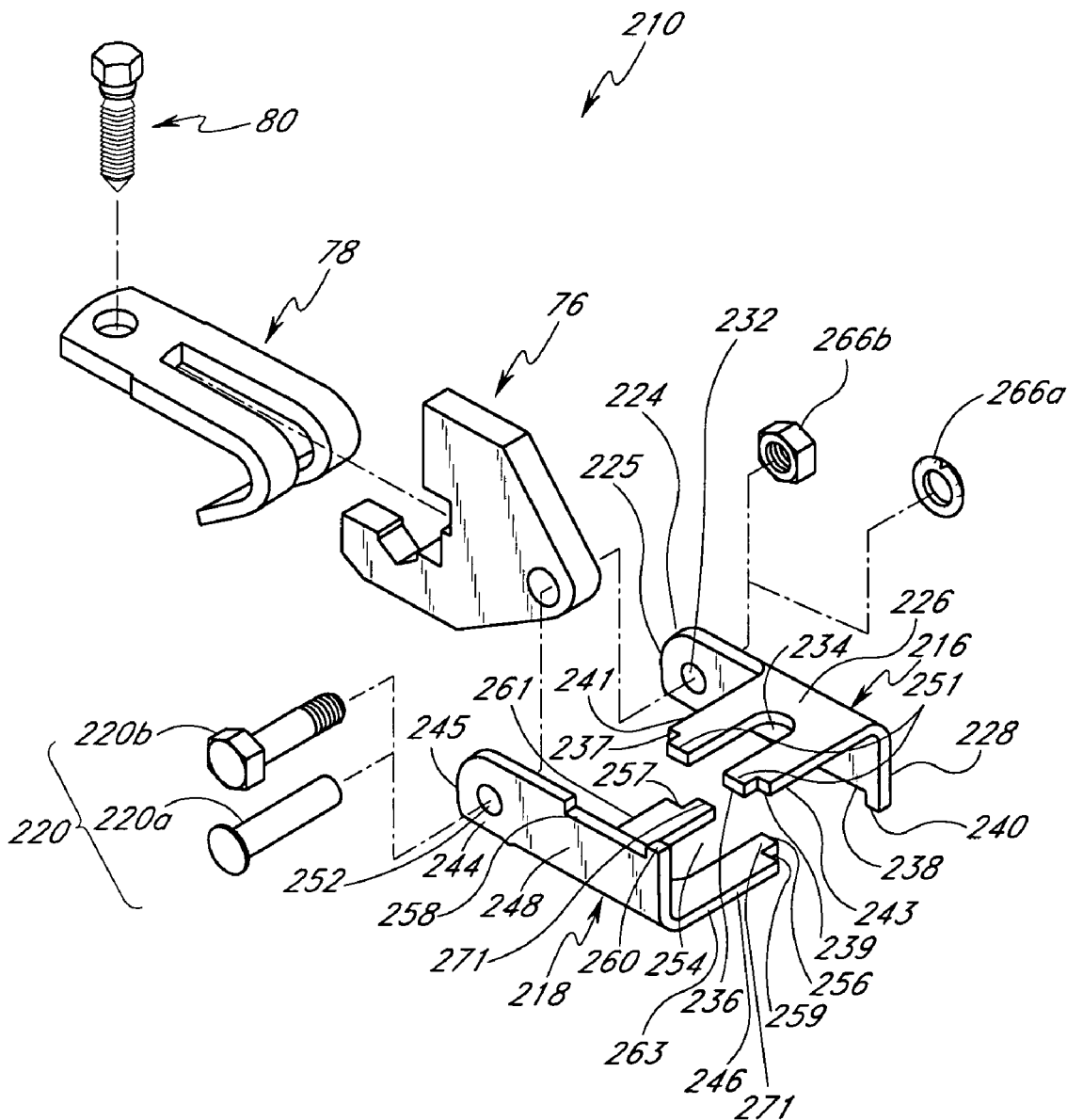
FIG. 23 is an exploded perspective view of the assembly of FIG. 21.
Figure 24:
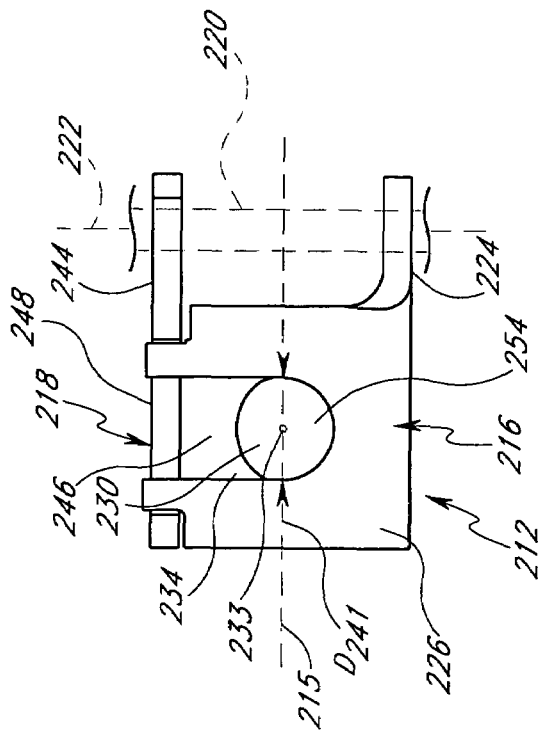
FIG. 24 is a top view of the interlocking swivel connector of FIG. 21.
Figure 25:
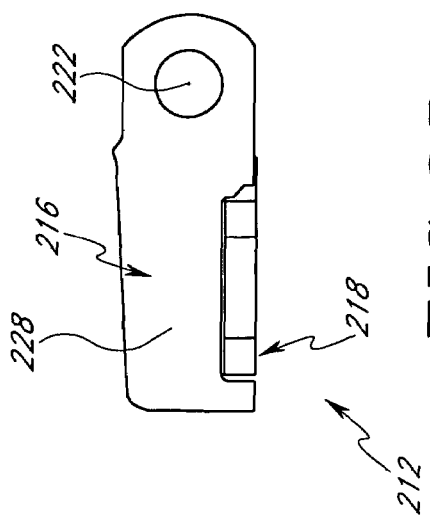
FIG. 25 is a side view of the interlocking swivel connector of FIG. 21.
Figure 26:
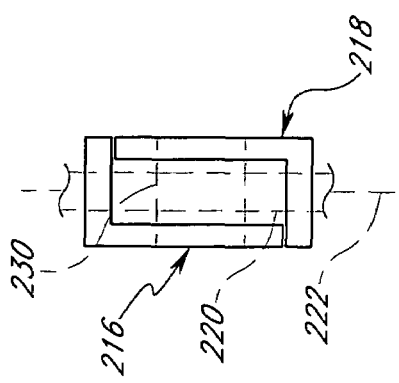
FIG. 26 is an end view of the interlocking swivel connector of FIG. 21.

FIGS. 21–23 show different views of one embodiment of a sway brace assembly or system 210 generally comprising an interlocking swivel connector, bracket or attachment device 212 and the sway brace clamp, attachment or fitting 14. FIGS. 24–26 show different views of the interlocking swivel connector 212.

As discussed above for the connector 12 (see, for example, FIGS. 1–7), the seismic earthquake brace connector 212 is retrofittingly attachable to a rod or bolt of an already installed system supporting a suspended load, such as a pipe and the like, without disassembly of the existing system. The clamp 14 is securely attachable to a brace, such as a bracing pipe and the like, to protect the suspended load against adverse sway and seismic disturbances. The assembly 210 and/or the connector 212 and/or the clamp 214 have a generally longitudinal axis 215.

Though, in the illustrated embodiment of FIGS. 21–23, the connector 212 is attached to the clamp 14, it should be appreciated that the connector 212 may be efficaciously used in conjunction with a wide variety of other suitable clamps, fittings, attachments and the like. These include without limitation the clamp 14c (FIG. 15), the fitting 14d (FIG. 16), the fitting 14e (FIG. 17), the fitting 14f (FIG. 18), the cable attachment 14g (FIG. 19), among others.

In the illustrated embodiment of FIGS. 21–26, the connector 212 comprises a pair of swivelably interlocking arms or interlock elements 216, 218. The connector 212 and arms 216, 218 are pivotable or swivelable about a fastener, pin, rivet or bolt 220 the longitudinal axis of which generally defines a rotation, pivot or swivel axis 222. The pin 220 mechanically connects or couples the connector 212 and the clamp 14.

In the illustrated embodiment of FIGS. 21–26, the upper interlock arm or bracket 216 and the lower interlock arm or bracket 218 are in the form of generally angled plates and comprise respective slots 234, 254. As best seen in FIGS. 21 and 24, intersection, overlap or engagement of the arms 216, 218 creates a rod- or bolt-receiving passage or hole 230 formed by at least partial overlapping of the slots 234, 254.

In the illustrated embodiment of FIGS. 21–26, and as best seen in FIGS. 21 and 24, the rod- or bolt-receiving passage 230 has a generally longitudinal axis 233 that is oriented substantially perpendicular to the rotation axis 222 of the arms 216, 218. In other words, the projections of the passage longitudinal axis 233 and rotation axis 222, on a common plane that is not perpendicular to either of the axes 222, 233, intersect perpendicularly or at 90°.

In the illustrated embodiment of FIGS. 21–26, the arm 216 generally comprises a proximal section 224, a main body portion 226 and a side wall 228. The arm 218 generally comprises a proximal section 244, a main body portion 246 and a side wall 248.

In the illustrated embodiment of FIGS. 21–26, the upper arm proximal section 224 is generally rectangular in shape with a generally curved proximal end 225 (see, for example, FIG. 23). In other embodiments, the proximal section 224 may be configured in modified manners with efficacy, as required or desired, giving due consideration to the goal of achieving one or more of the benefits and advantages as disclosed, taught or suggested herein. For example, the proximal section 224 may be configured in other suitable polygonal or non-polygonal shapes.

In the illustrated embodiment of FIGS. 21–26, the proximal section 224 has a generally circular through hole or cavity 232 (shown in the exploded perspective view of FIG. 23) for receiving the pin 220. In other embodiments, the proximal section 224 and/or opening 232 may be configured in modified manners with efficacy, as required or desired, giving due consideration to the goal of achieving one or more of the benefits and advantages as disclosed, taught or suggested herein. For example, the opening 232 may be rectangular or square in shape, or configured in the form of other suitable polygonal or non-polygonal shapes.

In the illustrated embodiment of FIGS. 21–26, the main body portion or section 226 is generally flat and rectangular in shape. In other embodiments, the main body portion 226 may be configured in modified manners with efficacy, as required or desired, giving due consideration to the goal of achieving one or more of the benefits and advantages as disclosed, taught or suggested herein. For example, the main body portion 226 may be configured in other suitable polygonal or non-polygonal shapes.

In the illustrated embodiment of FIGS. 21–26, the main body portion 226 includes the slot 234 for overlapping with at least a portion of the slot 254 of the lower connector arm 218 to form the rod- or bolt-receiving hole or passage 230. The slot 234 extends inwards from a side edge 236 (see, for example, FIG. 23) of the body portion 226 towards the side wall 228 and is spaced from the side wall 228. The slot 234 is preferably generally U-shaped. In other embodiments, the slot 234 may be shaped in modified manners with efficacy, as required or desired, giving due consideration to the goal of achieving one or more of the benefits and advantages as disclosed, taught or suggested herein. For example, the slot 234 may be rectangular, V-shaped or configured in other suitable polygonal or non-polygonal shapes.

In the illustrated embodiment of FIGS. 21–26, and as shown in FIG. 23, cuts or niches 237, 239 are provided at the intersection of the side edge 236 and respective proximal and distal edges 241, 243 of the main body portion 226. As best seen in FIG. 21, this allows side portions 251 of the upper arm main body portion 226 to be received in a groove of the lower arm 218. Simultaneously, the upper arm niches 237, 239 receive portions (which flank the lower arm groove, as discussed in more detail below) of the lower arm side wall 248. Advantageously, this facilitates interlocking and alignment between the arms 216 and 218.

In the illustrated embodiment of FIGS. 21–26, the upper arm side wall 228 is generally rectangular in shape. In other embodiments, the side wall 228 may be configured in modified manners with efficacy, as required or desired, giving due consideration to the goal of achieving one or more of the benefits and advantages as disclosed, taught or suggested herein. For example, the side wall 228 may be configured in other suitable polygonal or non-polygonal shapes.

In the illustrated embodiment of FIGS. 21–26, and as best seen in FIGS. 22 and 23, the side wall 228 has a lower edge 240 which is spaced from the main body portion 226 and has a groove or slot 238 formed thereon for interlocking or mating with a corresponding portion of the lower arm 218. The groove 238 extends inwards from the lower edge 240 and is generally rectangular in shape. In other embodiments, the groove 238 may be configured in modified manners with efficacy, as required or desired, giving due consideration to the goal of achieving one or more of the benefits and advantages as disclosed, taught or suggested herein. For example, the groove 238 may be V-shaped or configured in other suitable polygonal or non-polygonal shapes.

In the illustrated embodiment of FIGS. 21–26, the upper arm side wall 228 extends substantially perpendicularly from the main body portion 226 and is substantially planar with the proximal section 224. In other embodiments, the side wall 228 may be oriented in modified manners with efficacy, as required or desired, giving due consideration to the goals of spacing the body portions 226, 246 and/or of achieving one or more of the benefits and advantages as disclosed, taught or suggested herein.

In the illustrated embodiment of FIGS. 21–26, the junction between the main body portion 226 and the side wall 228 forms a generally smooth curve. In another embodiment, the junction between the main body portion 226 and the side wall 228 forms a generally sharp corner. In other embodiments, the junction between the main body portion 226 and the side wall 228 may be efficaciously configured in modified manners, as required or desired, giving due consideration to the goal of achieving one or more of the benefits and advantages as disclosed, taught or suggested herein. For example, the junction between the main body portion 226 and the side wall 228 may be partially smooth and partially sharp.

In the illustrated embodiment of FIGS. 21–26, the lower arm proximal section 244 is generally rectangular in shape with a generally curved proximal end 245 (see, for example, FIG. 23). In other embodiments, the proximal section 244 may be configured in modified manners with efficacy, as required or desired, giving due consideration to the goal of achieving one or more of the benefits and advantages as disclosed, taught or suggested herein. For example, the proximal section 244 may be configured in other suitable polygonal or non-polygonal shapes.

In the illustrated embodiment of FIGS. 21–26, the proximal section 244 has a generally circular through hole or cavity 252 (shown in the exploded perspective view of FIG. 23) which is generally aligned with the upper arm hole 232 for receiving the pin 220. In other embodiments, the proximal section 244 and/or opening 252 may be configured in modified manners with efficacy, as required or desired, giving due consideration to the goal of achieving one or more of the benefits and advantages as disclosed, taught or suggested herein. For example, the opening 252 may be rectangular or square in shape, or configured in the form of other suitable polygonal or non-polygonal shapes.

In the illustrated embodiment of FIGS. 21–26, the main body portion or section 246 is generally flat and rectangular in shape. In other embodiments, the main body portion 246 may be configured in modified manners with efficacy, as required or desired, giving due consideration to the goal of achieving one or more of the benefits and advantages as disclosed, taught or suggested herein. For example, the main body portion 246 may be configured in other suitable polygonal or non-polygonal shapes.

In the illustrated embodiment of FIGS. 21–26, and as indicated above, the main body portion 246 includes the slot 254 for overlapping with at least a portion of the slot 234 of the upper connector arm 216 to form the rod- or bolt-receiving hole or passage 230. The slot 254 extends inwards from a side edge 256 (see, for example, FIG. 23) of the body portion 246 towards the side wall 248 and is spaced from the side wall 248. The slot 254 is preferably generally U-shaped. In other embodiments, the slot 254 may be shaped in modified manners with efficacy, as required or desired, giving due consideration to the goal of achieving one or more of the benefits and advantages as disclosed, taught or suggested herein. For example, the slot 254 may be rectangular, V-shaped or configured in other suitable polygonal or non-polygonal shapes.

In the illustrated embodiment of FIGS. 21–26, and as shown in FIG. 23, cuts or niches 257, 259 are provided at the intersection of the side edge 256 and respective proximal and distal edges 261, 263 of the main body portion 246. When the arms 216 and 218 are closed (FIG. 21), these niches 257, 259 receive portions of the upper arm side wall 228 which flank the upper arm side wall groove 238. Simultaneously, side portions 271 (see, for example, FIGS. 22 and 23) of the lower arm main body portion 246 are received within the upper arm side wall groove 238. Advantageously, this facilitates interlocking and alignment between the arms 216 and 218.

In the illustrated embodiment of FIGS. 21–26, the lower arm side wall 248 is generally rectangular in shape. In other embodiments, the side wall 248 may be configured in modified manners with efficacy, as required or desired, giving due consideration to the goal of achieving one or more of the benefits and advantages as disclosed, taught or suggested herein. For example, the side wall 248 may be configured in other suitable polygonal or non-polygonal shapes.

In the illustrated embodiment of FIGS. 21–26, and as best seen in FIGS. 22 and 23, the side wall 248 has an upper edge 260 which is spaced from the main body portion 246 and has a groove or slot 258 formed thereon for interlocking or mating with side portions 251 of the upper arm main body portion 226. The groove 258 extends inwards from the lower edge 260 and is generally rectangular in shape. In other embodiments, the groove 258 may be configured in modified manners with efficacy, as required or desired, giving due consideration to the goal of achieving one or more of the benefits and advantages as disclosed, taught or suggested herein. For example, the groove 258 may be V-shaped or configured in other suitable polygonal or non-polygonal shapes.

In the illustrated embodiment of FIGS. 21–26, the lower arm side wall 248 extends substantially perpendicularly from the main body portion 246 and is substantially planar with the proximal section 244. In other embodiments, the side wall 248 may be oriented in modified manners with efficacy, as required or desired, giving due consideration to the goals of spacing the body portions 226, 246 and/or of achieving one or more of the benefits and advantages as disclosed, taught or suggested herein.

In the illustrated embodiment of FIGS. 21–26, the junction between the main body portion 246 and the side wall 248 forms a generally smooth curve. In another embodiment, the junction between the main body portion 246 and the side wall 248 forms a generally sharp corner. In other embodiments, the junction between the main body portion 246 and the side wall 248 may be efficaciously configured in modified manners, as required or desired, giving due consideration to the goal of achieving one or more of the benefits and advantages as disclosed, taught or suggested herein. For example, the junction between the main body portion 246 and the side wall 248 may be partially smooth and partially sharp.

In the illustrated embodiment of FIGS. 21–26, and as best seen in FIGS. 21 and 24, the rod- or bolt-capturing hole or passage 230 is formed by overlapping of the arm slots 234 and 236. The passage 230 is generally defined by having ends formed by overlapping portions of the slots 234, 236 and the space therebetween as determined by the spacing between the body portions 226, 246 due to the side walls 228, 248. Advantageously, having such a rod- or bolt-receiving passage 230 allows a longer length of the rod or bolt to be captured within the connector 212, thereby providing a secure and stable connection. Moreover, and desirably, this is achieved in a light weight configuration and lower material costs since a generally hollow space exists between the spaced body portions 226, 246 due to the side walls 228, 248.

In the illustrated embodiment of FIGS. 21–26, and as best seen in FIGS. 24 and 26, the passageway 230 has a generally circular or ellipsoidal cross-section and can be thought of as being generally cylindrical. The passage or opening 230 is sized to receive a rod or bolt of a predetermined diameter. In other embodiments, the passage 230 may be configured in modified manners with efficacy, as required or desired, giving due consideration to the goals of capturing a supporting rod, bolt or the like and/or of achieving one or more of the benefits and advantages as disclosed, taught or suggested herein. For example, the passage 230 may be configured in other suitable polygonal or non-polygonal cross-sections.

In the illustrated embodiment of FIGS. 21–26, and as best illustrated by the drawings of FIGS. 21 and 23, when the connector arms 216, 218 are interlocked, the upper arm niches 237, 239 mate with corresponding portions of the lower arm side wall 248 which generally flank the lower arm side wall slot 258; the upper arm groove 238 mates with the lower arm side portions 271; the lower arm niches 257, 259 mate with corresponding portions of the upper arm side wall 228 which generally flank the upper arm side wall slot 238; and the lower arm groove 258 mates with the upper arm side portions 251. Advantageously, such interlocking and alignment between the upper and lower arms 216, 218 facilitates in alignment between the slots 234, 254 and also provides a more stable connector 212.

In the illustrated embodiment of FIGS. 21–26, the arm 216 and the arm 218 are substantially structurally identical and interchangeable. Advantageously, this can facilitate fabrication of the connector 212, for example, in die-cutting and die-casting processes, a single die can be used to manufacture either of the arms 216, 218. This desirably reduces manufacturing costs. In other embodiments, the arms 216, 218 may be configured to not be substantially identical with efficacy, as required or desired, giving due consideration to the goal of achieving one or more of the benefits and advantages as disclosed, taught or suggested herein.

As best illustrated in FIG. 23, in accordance with one embodiment, the connector 212, and hence the arms 216, 218, and the clamp 14 are permanently or quasi-permanently mechanically connected to one another by a rivet 220a and a clinched rivet head 266a. Also as best illustrated in FIG. 23, in accordance with another embodiment, the connector 212, and hence the arms 216, 218, and the clamp 14 are removably or releasably mechanically connected to one another by a bolt or screw 220b and a nut 266b. In a modified embodiment, the nut 266b is used in combination with a clinched rivet head or the like to connect to the bolt 220b and hence provide a permanent or pseudo-permanent mechanical connection between the connector 212 and the clamp 14. In other embodiments, the connector 212 and the clamp 14 may be efficaciously connected buy other permanent or temporary attachment fasteners, as required or desired, giving due consideration to the goals of providing a secure attachment and/or of achieving one or more of the benefits and advantages as disclosed, taught or suggested herein.

In a modified embodiment, one of the arms 216 or 218 is substantially irrotational or fixed relative to the pin 220 and/or the clamp 14. Thus, only one of the arms 216 or 218 is swivelably manipulated to capture a support rod, bolt or the like within the hole 230. Such a modified configuration achieves at least some of the benefits and advantages as disclosed, taught or suggested herein.

Preferably, the connector arms 216, 218 are fabricated from a suitably strong material to meet the standards set by the Underwriters Laboratories (U.L.), Factory Mutual Engineering (F.M.), and other such quality control groups. In one embodiment, the connector arms 216, 218 comprise a carbon steel. In another embodiment, the connector arms 216, 218 comprise a mild steel. In yet another embodiment, the connector arms 216, 218 have an electro-galvanized finish. In other embodiments, the connector arms may efficaciously comprise other materials, as required or desired, giving due consideration to the goals of providing suitably strong connector arms 216, 218 and/or of achieving one or more of the benefits and advantages as disclosed, taught or suggested herein. For example, the connector arms 216, 218 can comprise other suitable metals, alloys, ceramics, plastics and the like.

In the exemplary embodiment, and referring in particular to FIG. 21 with the connector arms 216, 218 in the closed position, the length $L_{211}$ is about 13.0 cm (5 and ⅛ inches), the length $L_{212}$ is about 10.5 cm (4 and ⅛ inches), the length $L_{213}$ (1 and ¼ inches) and the width $W_{211}$ is about 5.72 cm (2 and ¼ inches). In other embodiments, the connector-clamp assembly 210 may be dimensioned in modified manners with efficacy, as required or desired, giving due consideration to the particular application and/or to the goal of achieving one or more of the benefits and advantages as disclosed, taught or suggested herein.

In the exemplary embodiment, when the arms 216 and 218 are interlocked, the retrofit connector 212 has an overall length of about 7.6 cm (3.0 inches), a width of about 5.72 cm (2 and ¼ inches) and a height of about 2.54 cm (1.0 inch). In other embodiments, the connector 212 may be dimensioned in modified manners with efficacy, as required or desired, giving due consideration to the particular application and/or to the goal of achieving one or more of the benefits and advantages as disclosed, taught or suggested herein.

In the exemplary embodiment, when the arms 216 and 218 are closed or interlocked, the slots 234, 254 are configured so that the rod- or bolt-receiving passage 230 has at its ends a diameter or minor diameter or cross-sectional dimension $D_{241}$ (see FIG. 24) in the range from about 0.95 cm (⅜ inches) or slightly greater than about 0.95 cm (⅜ inch to about 1.9 cm (¾ inches) or slightly greater than about 1.9 cm (¾ inches). Stated differently, the passage 230 can have dimensions such that it can receive and allow a retrofit connection to rods, bolts and the like having a diameter in the range from about 0.95 cm (⅜ inches) to about 1.9 cm (¾ inches). In other embodiments, the hole 230 can be dimensioned in modified manners, have a smaller or larger size and/or accommodate rods, bolts and the like having a smaller or larger diameter with efficacy, as required or desired, giving due consideration to the goals of providing a secure retrofit connection and/or of achieving one or more of the benefits and advantages as disclosed, taught or suggested herein.

In the exemplary embodiment, the arm main body portions 226, 246, the arm proximal sections 224, 244 and the arm side walls 228, 248 have a thickness of about 6.35 mm (0.25 inches), the spacing between the main body portions 226, 246 when the arms 216 and 218 are closed or interlocked is about 1.27 cm (0.5 inches), and the grooves 238, 258 have a length of about 3.8 cm (1.5 inches), a width of about 6.35 mm (0.25 inches) and a depth of about 6.35 mm (0.25 inches). In other embodiments, the connector 212 may be dimensioned in modified manners with efficacy, as required or desired, giving due consideration to the particular application and/or to the goal of achieving one or more of the benefits and advantages as disclosed, taught or suggested herein.

The connector 212 of the preferred embodiments can be manufactured or fabricated by a wide variety of methods and/or technologies. These include, without limitation, stamping/punching, casting, molding, forging, machining, among others.

In one preferred embodiment, the arms 216, 218 of the seismic connector 212 are manufactured by stamping generally flat strips of a material. Preferably, the material comprises a metal, such as mild steel or carbon steel. The stamping includes the steps of punching holes and slots of a predetermined configuration in the flat plates. The plates are bent at predetermined locations by predetermined angles to form the two arms 216, 218. The pin 220 is used to connect the arms 216, 218 to a clamp or fitting, such as the clamp 14 to form the connector-clamp assembly 210.

This manufacturing process or method, for the embodiments wherein the seismic connector arms 216, 218 are substantially structurally identical, can use the same cutting-die for fabricating both arms 216, 218. Advantageously, this saves on cost.

Moreover, such a manufacturing process is especially suited for automated assembly lines, wherein stamping, punching and bending operations can be performed at high speeds and pick-and-place robotic arms or systems can efficiently manipulate the various components. The simplicity and speed of this manufacturing method results in an end product that is economical to manufacture, and thus is desirably inexpensive.

In another embodiment, the connector arms 216, 218 are manufactured by casting or molding. For the embodiments wherein the seismic connector arms 216, 218 are substantially structurally identical, the same casting-die or mold can be used for fabricating both arms 216, 218. Advantageously, this saves on cost.

As the skilled artisan will appreciate, the connector 212 (FIGS. 21–26) can be used in a variety of applications as has been described above in connection with the connector 12 (see, for example, FIGS. 11 and 12). Thus, for the sake of brevity of disclosure, this discussion will not be repeated again.

The connector-clamp assembly 210 (FIGS. 21–23) is manipulated in a manner similar to the description above in connection with the connector-clamp assembly 10 (see, for example, FIGS. 9A–9E and 10A–10E). Thus, again for the sake of brevity of disclosure, this discussion will only be briefly described below.

During installation of the assembly 210 (FIGS. 21–23), one of the main body portion slots 234 or 254 is placed around the already installed rod or bolt with the connector arms 216 and 218 open. The assembly 210 is pivoted about the longitudinal axis 215 and the arm 216 or 218 that is not already engaged with the rod is lowered or raised so that the appropriate slot 234 or 254 engages the rod to capture it within the passage 230. Appropriate nut(s) or the like are then used to secure the connector 212 (FIGS. 21–26) to the rod to complete the installation.

Cable Clamp and Connector Assembly

Figure 27:
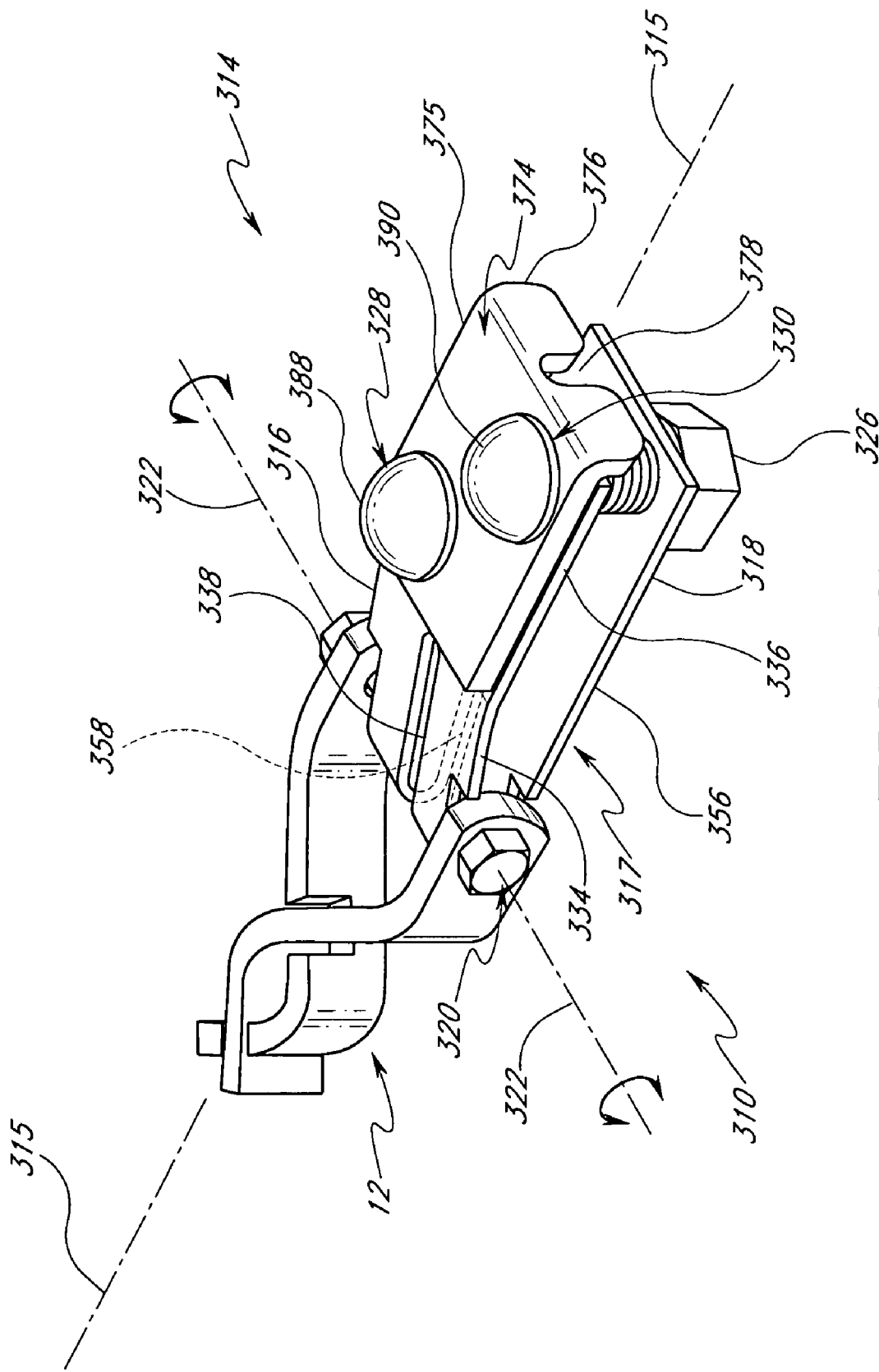
FIG. 27 is a perspective view of a cable sway brace clamp and interlocking swivel connector assembly having features and advantages in accordance with one embodiment of the invention.
Figure 28:
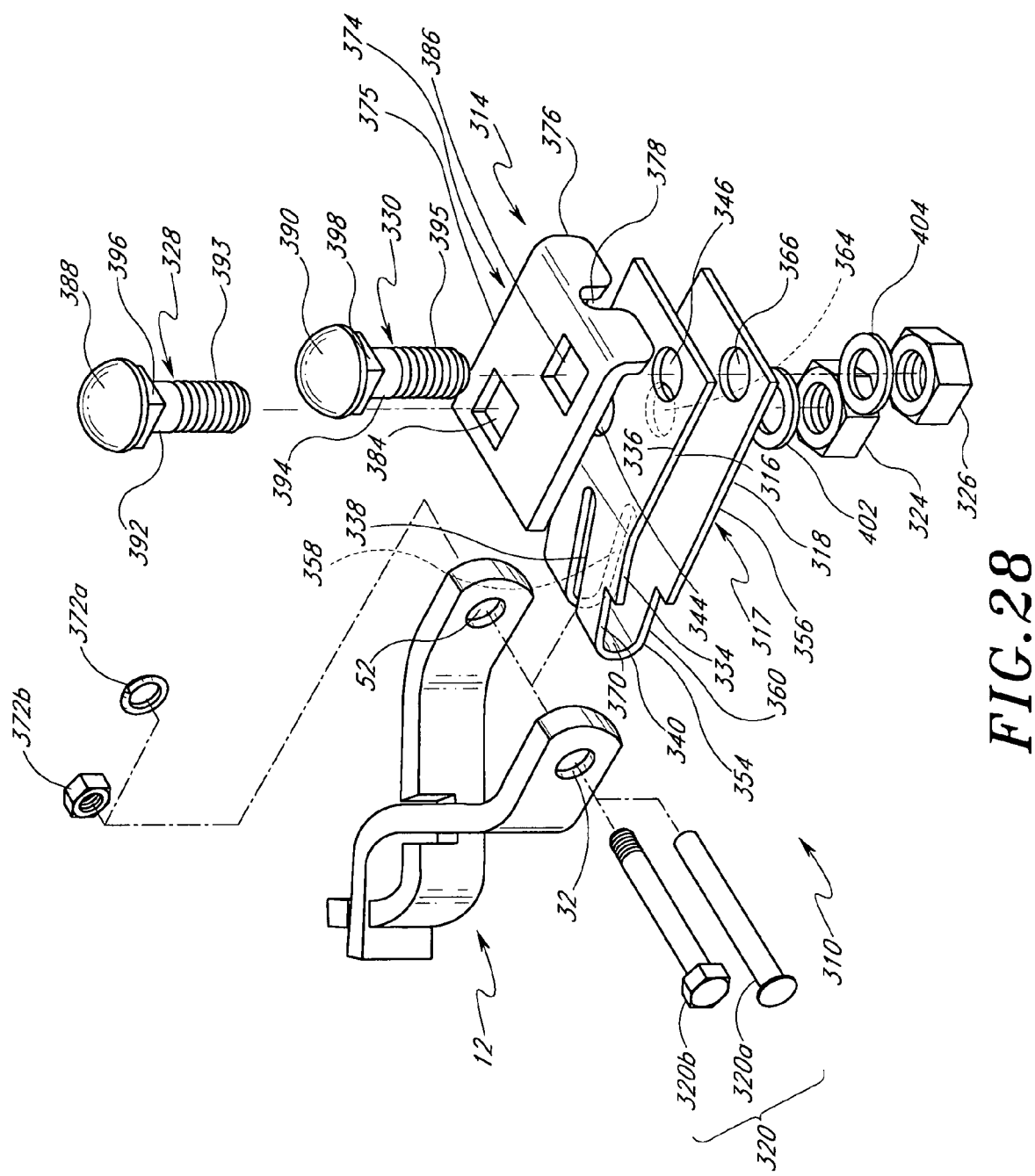
FIG. 28 is an exploded perspective view of the assembly of FIG. 27.

FIGS. 27 and 28 show different views of one embodiment of a cable sway brace assembly or system 310 generally comprising a cable sway brace clamp 314 and the interlocking swivel connector, bracket or attachment device 12. FIGS. 29–33 show different views of the cable sway brace clamp 314.

As has been discussed in detail above, the seismic earthquake brace connector 12 is attachable to a rod or bolt of an already installed system supporting a suspended load, such as a pipe and the like, without disassembly of the existing system. As discussed in greater detail later herein, the cable clamp 314 is securely attachable to a brace, such as a bracing cable, to protect the suspended load against adverse sway and seismic disturbances. The assembly 310 and/or the clamp 314 and/or the connector 12 have a generally longitudinal axis 315.

Though, in the illustrated embodiment of FIGS. 27–28, the clamp 314 is attached to the connector 12, it should be appreciated that the clamp 314 may be efficaciously used in conjunction with a wide variety of other suitable connectors and the like, some of which are disclosed later herein.

In the illustrated embodiment of FIGS. 27–33, the cable clamp 314 comprises a main body portion 317 having a pair of flexible arms or jaws 316, 318 spaced from one another and movable towards one another by tightening of nuts 324, 326 attached to respective bolts 328, 330 which traverse the arms 316, 318, thereby securing a bracing cable 332 therebetween, as shown in FIGS. 32 and 33. Referring in particular to FIG. 30, in the open position, the jaws 316 and 318 are generally parallel and separated by a gap 319.

In the illustrated embodiment of FIGS. 27–33, the clamp 314 and arms 316, 318 are pivotable or swivelable about a fastener or pin 320 the longitudinal axis of which generally defines a rotation, pivot or swivel axis 322. The pin 320 mechanically connects or couples the clamp 314 and the connector 12.

In the illustrated embodiment of FIGS. 27–33, the clamp longitudinal axis 315 is oriented substantially perpendicular to the rotation axis 322. In other words, the projections of the clamp longitudinal axis 315 and rotation axis 322, on a common plane that is not perpendicular to either of the axes 315, 322 intersect perpendicularly or at 90°.

In the illustrated embodiment of FIGS. 27–33, the upper arm or jaw 316 is generally in the form of a sheet and is generally rectangular in shape. In other embodiments, the arm 316 may be configured in modified manners with efficacy, as required or desired, giving due consideration to the goals of achieving one or more of the benefits and advantages as disclosed, taught or suggested herein. For example, the arm 316 may be shaped in other suitable polygonal or non-polygonal shapes.

In the illustrated embodiment of FIGS. 27–33, the upper arm 316 has a proximal section or portion 334 and a distal section or portion 336. Preferably, the proximal section 334 includes a generally central slot 338 for providing access to the cable 332 (and/or clearance space) and a pair of side cut-off sections, slots or grooves 340, 342 (see FIGS. 28 and 29) for providing clearance space for the connector 12. The distal section 336 extends generally away from the proximal section 334 and includes a pair of holes 344, 346, as best seen in the exploded perspective view of FIG. 28, which receive respective bolts 328, 330.

In the illustrated embodiment of FIGS. 27–33, and as shown for example in FIG. 30 with the arms 316 and 318 open, the proximal section 334 has a slanted portion 348 which extends upwardly towards the distal portion 336. Such a configuration provides a predetermined spacing between the arms 316, 318, as needed. In other embodiments, the proximal section of the arm 316 may be configured in modified manners with efficacy, as required or desired, giving due consideration to the goals of providing a desired spacing between the arms 316, 318 and/or achieving one or more of the benefits and advantages as disclosed, taught or suggested herein. For example, clearance for a larger connector pin 320 may be provided and/or the lower arm 318 may be suitably configured to achieve a desired spacing between the arms.

In the illustrated embodiment of FIGS. 27–33, and as best seen in FIGS. 27–29, the slot 338 is generally U-shaped and extends inwardly from a proximal-most end 347 (FIGS. 29 and 30) of the proximal section 334. In other embodiments, the slot 338 may be configured in modified manners with efficacy, as required or desired, giving due consideration to the goals of providing access to the cable 332 and/or of achieving one or more of the benefits and advantages as disclosed, taught or suggested herein. For example, the slot 338 may be rectangular, V-shaped or may be shaped in other suitable polygonal or non-polygonal shapes.

In the illustrated embodiment of FIGS. 27–33, and as best seen in FIG. 29, the pair of side slots 340, 342 are generally rectangular in shape and extend inwardly towards the upper arm distal section 336 from the proximal-most end 347 of the proximal section 334. In the illustrated embodiments, the side slots 340, 342 are formed on the slanted section 348 (FIG. 30) of the upper arm proximal section 334. In other embodiments, the slots 340, 342 may be configured in modified manners with efficacy, as required or desired, giving due consideration to the goals of providing clearance space for attachment to the connector 12 (or other suitable connectors) and/or of achieving one or more of the benefits and advantages as disclosed, taught or suggested herein. For example, the slots 340, 342 may be shaped in other suitable polygonal or non-polygonal shapes.

In the illustrated embodiment of FIGS. 27–33, and as best seen in FIG. 28, the pair of bolt-receiving holes 344, 346 are located in the distal section 336 of the upper arm or jaw 316. The holes 344, 346 are spaced from one another in a predetermined manner such that a reliable clamping force is generated to secure the cable 332 within the clamp 314. Moreover, the spacing between the holes 344 and 346 permits adequate clearance between the bolts 328, 330, cable 332 and other components such as washers, as discussed further below.

In the illustrated embodiment of FIGS. 27–33, the lower arm or jaw 318 is generally in the form of a sheet and is generally rectangular in shape. In other embodiments, the arm 318 may be configured in modified manners with efficacy, as required or desired, giving due consideration to the goals of achieving one or more of the benefits and advantages as disclosed, taught or suggested herein. For example, the arm 318 may be shaped in other suitable polygonal or non-polygonal shapes.

In the illustrated embodiment of FIGS. 27–33, the lower arm 318 has a proximal section or portion 354 and a distal section or portion 356. Preferably, the proximal section 354 includes a generally central slot 358 for providing access to the cable 332 (and/or clearance space) and a pair of side cut-off sections, slots or grooves 360, 362 (see FIGS. 28 and 29) for providing clearance space for the connector 12. The distal section 356 extends generally away from the proximal section 354 and includes a pair of holes 364, 366, as shown in FIG. 28, which receive respective bolts 328, 330.

In the illustrated embodiment of FIGS. 27–33, and as shown in FIGS. 27–29, the slot 358 is generally U-shaped and extends inwardly from the proximal-most end 347 (FIGS. 29 and 30) of the proximal section 354. Preferably, the lower jaw slot 358 and the upper jaw slot 338 are substantially aligned with one another and connect with each other at the proximal-most end 347 (FIGS. 29 and 30). In other embodiments, the slot 358 may be configured in modified manners with efficacy, as required or desired, giving due consideration to the goals of providing access to the cable 332 and/or of achieving one or more of the benefits and advantages as disclosed, taught or suggested herein. For example, the slot 358 may be rectangular, V-shaped or may be shaped in other suitable polygonal or non-polygonal shapes.

In the illustrated embodiment of FIGS. 27–33, and as best seen in FIG. 29, the pair of side slots 360, 362 are generally rectangular in shape and extend inwardly from the proximal-most end 347 of the proximal section 354. As shown in the drawings, the lower jaw slot 360 is substantially aligned with and connects with the upper jaw slot 340 at the proximal-most end 347 (FIGS. 29 and 30). Similarly, the lower jaw slot 362 is substantially aligned with and connects with the upper jaw slot 342 at the proximal-most end 347 (FIGS. 29 and 30). In other embodiments, the slots 360, 362 may be configured in modified manners with efficacy, as required or desired, giving due consideration to the goals of providing clearance space for attachment to the connector 12 (or other suitable connectors) and/or of achieving one or more of the benefits and advantages as disclosed, taught or suggested herein. For example, the slots 360, 362 may be shaped in other suitable polygonal or non-polygonal shapes.

In the illustrated embodiment of FIGS. 27–33, and as best seen in FIG. 28, the pair of bolt-receiving holes 364, 366 are located in the distal section 356 of the lower arm or jaw 318. As shown in the drawings, respective lower jaw holes 364, 366 are substantially aligned with respective upper jaw holes 344, 346. The holes 364, 366 are spaced from one another in a predetermined manner such that a reliable clamping force is generated to secure the cable 332 within the clamp 314. Moreover, the spacing between the holes 364 and 366 permits adequate clearance between the bolts 328, 330, cable 332 and other components such as washers, as discussed further below.

In the illustrated embodiment of FIGS. 27–33, the upper and lower arms 316, 318 meet a generally curved or bent transition portion 368 (FIG. 30). This forms a passage 370 (FIG. 28) for receiving the connector pin 320, thereby forming a hinged connection between the clamp 314 and the retrofit connector 12. When assembled, the passage 370 (FIG. 28) is substantially aligned with the connector holes 32, 52 (see FIG. 28) with the pin 320 passing therethrough.

As best illustrated in FIG. 28, in accordance with one embodiment, the clamp 314 and the connector 12 are permanently or quasi-permanently mechanically connected to one another by a rivet 320a and a clinched rivet head 372a. Also as best illustrated in FIG. 28, in accordance with another embodiment, the clamp 314 and the connector 12 are removably or releasably mechanically connected to one another by a bolt or screw 320b and a nut 372b. In a modified embodiment, the nut 372b is used in combination with a clinched rivet head or the like to connect to the bolt 320b and hence provide a permanent or pseudo-permanent mechanical connection between the clamp 314 and connector 12. In other embodiments, the clamp 314 and the connector 12 14 may be efficaciously connected buy other permanent or temporary attachment fasteners, as required or desired, giving due consideration to the goals of providing a secure attachment and/or of achieving one or more of the benefits and advantages as disclosed, taught or suggested herein.

In the illustrated embodiment of FIGS. 27–33, the cable clamp 314 further comprises a reinforcement plate 374 above the upper arm 316 and in mechanical communication with it or mechanically connected to it. Advantageously, the reinforcement plate provides rigidity, increased strength and structural integrity to the upper arm 316 and the cable clamp 314. In a modified embodiment, the main body portion 317 (and/or the upper arm 316) and the reinforcement plate 374 comprise an integral unit. In another modified embodiment, the upper arm 316 may include the plate 374 as an integral unit or as a mechanical connection to provide improved rigidity to the upper arm 316.

In the illustrated embodiment of FIGS. 27–33, the reinforcement plate 374 is generally rectangular in shape and preferably has a generally flat main body portion 375 and an overhang portion 376. The plate 374 includes a pair of bolt-receiving holes 384, 386 (FIG. 28) on the flat portion 375 of the plate 374 and receives respective bolts 328, 330. As shown in the drawings, the plate holes 384, 386 are substantially aligned with respective upper jaw holes 344, 346 and respective lower jaw holes 364, 366. The holes 384, 386 are spaced from one another in a predetermined manner such that a reliable clamping force is generated to secure the cable 332 within the clamp 314. Moreover, the spacing between the holes 384 and 386 permits adequate clearance between the bolts 328, 330, cable 332 and other components such as washers, as discussed further below.

In the illustrated embodiment of FIGS. 27–33, the overhang portion 376 extends beyond the arms 316, 318 and towards the lower arm 318 when the arms 316, 318 are open, as best seen in FIG. 30. Preferably, the overhang 376 has a generally central slit, slot or recess 378 extending upwards towards the main body portion 375 from a lowermost edge of the overhang portion 376 and substantially aligned with the arm slots 338 and 358. Advantageously, the slot 378 receives the cable 332 and aligns it.

In the illustrated embodiment of FIGS. 27–33, the securement bolts 328, 330 comprise respective heads 388, 390 and respective cylindrical portions 392, 394 comprising respective threads 393, 395. Preferably, the bolts 328, 330 are carriage bolts with respective interlocking portions 396, 398 (see FIG. 28) which substantially irrotationally mate with respective holes 384, 386 of the reinforcement plate 374. This facilitates in tightening the nuts 324, 326 to securely grasp the bracing cable 332 by closing the gap 319 between the jaws 316, 318.

In the illustrated embodiment of FIGS. 27–33, and as shown in FIG. 28, the bolt interlocking portions 396, 398 and reinforcement plate holes 384, 386 are generally square or rectangular in shape. In other embodiments, the interlocking portions 396, 398 and/or reinforcement plate holes 384, 386 may be configured in modified manners with efficacy, as required or desired, giving due consideration to the goals of providing reliable use of the cable clamp 314 and/or of achieving one or more of the benefits and advantages as disclosed, taught or suggested herein. For example, the interlocking portions 396, 398 and/or reinforcement plate holes 384, 386 may be shaped in other suitable polygonal or non-polygonal shapes.

In the illustrated embodiment of FIGS. 27–33, and as best illustrated by FIG. 28, the upper jaw holes 344, 346 are generally circular and receive generally smooth (non-threaded) portions of respective cylindrical portions 392, 394 of the bolts 328, 330 with a small tolerance. In a modified embodiment, the upper jaw holes 344, 346 are adapted to substantially irrotationally interlock with respective bolt interlocking portions 396, 398. In the illustrated embodiment of FIGS. 27–33, and as best illustrated by FIG. 28, the lower jaw holes 364, 366 are generally circular and receive respective threaded portions 393, 395 of the bolts 328, 330 with a small tolerance.

In other embodiments, upper jaw holes 344, 346 and/or the lower jaw holes 364, 366 may be configured in modified manners with efficacy, as required or desired, giving due consideration to the goals of achieving one or more of the benefits and advantages as disclosed, taught or suggested herein. For example, upper jaw holes 344, 346 and/or the lower jaw holes 364, 366 may be shaped in other suitable polygonal or non-polygonal shapes.

In the illustrated embodiment of FIGS. 27–33, the locking hex nuts 324, 326 which are threadably engaged with respective bolt threaded portions 392, 394 are used to tighten the jaws 316, 318 against the bracing cable 332 to securely clamp it. Preferably, washers 402, 404 (see, for example, FIGS. 28 and 30) are provided between respective nuts 324, 326 and the lower jaw 318. These may comprise various types of washers as known in the art such as flat washers, lock washers, among others.

Preferably, the generally U-shaped main body portion 317 (FIGS. 27–33) comprising the two arms 316, 318 is fabricated from sheet metal, for example, #14 GA steel, carbon steel, mild steel, stainless steel, aluminum and the like. In other embodiments, the main body portion 317 can be fabricated from other materials with efficacy, as required or desired, giving due consideration to the goals of providing a suitably strong cable clamp 314 and/or of achieving one or more of the benefits and advantages as disclosed, taught or suggested herein. For example, the main body portion 317 can be fabricated from other suitable metals, alloys, ceramics, plastics and the like.

Preferably, the reinforcement plate 374 (FIGS. 27–33) is fabricated from a metal, for example, carbon steel, mild steel, stainless steel and the like. In other embodiments, the reinforcement plate 374 can be fabricated from other materials with efficacy, as required or desired, giving due consideration to the goals of providing a suitably strong cable clamp 314 and/or of achieving one or more of the benefits and advantages as disclosed, taught or suggested herein. For example, the reinforcement plate 374 can be fabricated from other suitable metals, alloys, ceramics, plastics and the like.

In the exemplary embodiment, and referring in particular to FIGS. 29–30, the cable clamp main body portion 317 has a length $L_{291}$ of about 10.2 cm (4 inches), a width $W_{291}$ of about 5.1 cm (2 inches), a thickness of about 1.6 mm (1/16 inch) or larger, the width $W_{292}$ is about 3.8 cm (1.5 inches), and the spacing between the arms 316, 318 when they are open (FIG. 30) is about 1.59 cm (0.625 inches). In other embodiments, the cable clamp main body portion 317 may be dimensioned in modified manners with efficacy, as required or desired, giving due consideration to the goals of providing a suitably strong cable clamp and/or of achieving one or more of the benefits and advantages as disclosed, taught or suggested herein.

In the exemplary embodiment, and referring in particular to FIGS. 29–30, the clete or reinforcement plate 374 has a length $L_{292}$ of about 6.4 cm (2.5 inches), a width $W_{293}$ of about 5.1 cm (2 inches) and a thickness of about 3.2 mm (1/8 inch) or larger. In other embodiments, the reinforcement plate 374 may be dimensioned in modified manners with efficacy, as required or desired, giving due consideration to the goals of providing a suitably strong cable clamp and/or of achieving one or more of the benefits and advantages as disclosed, taught or suggested herein.

In the exemplary embodiment, the pin 320 (see, for example, FIGS. 27–28) is a 3/8 inch diameter bolt 320b or rivet pin 320a. In other embodiments, the pin 320 may be dimensioned in modified manners with efficacy, as required or desired, giving due consideration to the goals of providing a suitably strong hinged connection and/or of achieving one or more of the benefits and advantages as disclosed, taught or suggested herein.

In the exemplary embodiment, and as best seen in the exploded view of FIG. 28, the bolts 324, 326 comprise 5/8 inch carriage bolts, the plate holes 384, 386 are generally square with each side having a length of about 1.3 cm (0.52 inches) to accommodate the bolt interlocking portions 396, 398, the upper jaw holes 344, 346 and lower jaw holes 364, 366 are generally circular and have a diameter of about 1.6 cm (5/8 inches) or slightly larger to accommodate the bolt threaded portions 392, 394 with a slight tolerance. In other embodiments, the bolts 324, 326 and the corresponding bolt-receiving holes may be dimensioned in modified manners with efficacy, as required or desired, giving due consideration to the goals of providing a strong clamping force and/or of achieving one or more of the benefits and advantages as disclosed, taught or suggested herein.

The cable sway brace clamp 314 (FIGS. 27–33) can be manufactured or fabricated by a wide variety of methods and/or technologies. These include, without limitation, stamping/punching, casting, molding, forging, machining, among others.

In one preferred embodiment, the clamp main body portion 317 (see, for example, FIG. 28) including the arms 316, 318 is fabricated by stamping a generally flat strip of sheet metal. The stamping includes the step of punching the upper arm holes 344, 346, the lower arm holes 364, 366, the slots 338, 358 and forming the cut-off portions 340, 342, 360, 362. The stamped strip is then bent to form the transition bend 368 and further bent to form the upper arm slanted proximal portion 348, the generally flat section of the proximal portion 334 and the generally flat upper arm distal portion 336. These bending operations substantially align the upper and lower arm slots 338 and 358, the upper and lower arm holes 344 and 364, the upper and lower arm holes 346 and 366, the upper and lower arm side slots 340 and 360, and the upper and lower arm side slots 342 and 362. The bending operations also control the spacing, alignment and relative juxtaposition between the upper arm 316 and lower 318 when the arms 316, 318 are in the open position, as shown, for example, in the side view of FIG. 30, with the upper arm distal portion 336 and the lower arm distal portion 356 being substantially parallel.

In one preferred embodiment, the reinforcement member 374 (see, for example, FIG. 28) is fabricated by stamping a generally flat strip of metal plate. The stamping includes the step of punching the holes 384, 386 and the slot 378. The stamped plate is then bent at a predetermined position by about 90° to form the overhang portion 376. The reinforcement plate 374 is placed in contact with the upper arm 316 such that its overhang portion 376 extends just beyond the upper arm 316 and its slot 378 is substantially aligned with the arm slots 338 and 358. Simultaneously, the plate hole 384 is aligned with the upper arm hole 344 and the lower arm hole 364 for receiving the bolt 328, and the plate hole 386 is aligned with the upper arm hole 346 and the lower arm hole 366 for receiving the bolt 330.

The bolts 328 and 330 (see, for example, FIG. 28) are then inserted respectively through the set of aligned holes 384, 344, 364 and the set of aligned holes 386, 346, 366. Preferably, and as stated above, the bolts 328 and 330 comprise carriage bolts having respective interlocking portions 396, 398 which interlock with respective reinforcement plate holes 384, 386. The bolt heads 388 and 390 are seated on or abut against the upper surface of the reinforcement plate 374. The respective bolt cylindrical portions 392, 394 pass through the respective upper jaw holes 344, 346. The respective bolt threaded portions 393, 395 pass through respective lower jaw holes 364, 366.

Respective washers 402, 404 (see, for example, FIG. 28) are inserted around respective bolt threaded portions 393, 395 and contact or abut against the lower surface of the lower jaw 318. Respective nuts 324, 326 are threaded and tightened on to respective bolt threaded portions 393, 395. This assembly of the cable clamp 314 is best seen in the perspective view of FIG. 27 and the side view of FIG. 30 with the clamp arms 316, 318 in the open position. The pin 320 is used to hingedly connect the clamp main body portion 317 to a connector, such as the scissor connector 12 to form the clamp-connector assembly 310 (see FIG. 27).

Such a manufacturing process is especially suited for automated assembly lines, wherein stamping, punching and bending operations can be performed at high speeds and pick-and-place robotic arms or systems can efficiently manipulate the various components. The simplicity and speed of this manufacturing method results in an end product that is economical to manufacture, and thus is desirably inexpensive.

As discussed above and in further detail below, the cable clamp 314 (FIGS. 27–33) is securely attachable to a bracing cable 332 (FIGS. 29–33), to protect a suspended load, such as a pipe and the like, against adverse sway and seismic disturbances. The cable clamp 314 can be used in conjunction with the retrofit connector 12, as shown in FIGS. 27 and 28, or other suitable connectors, as discussed further later herein.

Referring in particular to FIGS. 29–31, in use, a free end 406 of the cable 332 is inserted into the cable clamp 314. The portion of the cable 332 generally within the clamp 314 is generally referred to by the reference numeral 408. The cable free end 406 generally extends within and/or is generally aligned with the upper and lower jaw slots 338, 358.

The cable portion 408 travels between the jaws 316, 318 and between the bolt shank portions 392, 394 and exits the clamp from within the reinforcement plate slot 378. The other free end of the cable 332 is connected to other suitable devices, such as a clamp-connector assembly and the like, as discussed further below.

Referring in particular to FIGS. 32 and 33, the nuts 324, 326 are tightened to close the flexible jaws 316, 318 which grip the cable portion 408 and securely capture the cable 332 within the clamp 314. Advantageously, the spacing between the bolt shank portions 392, 394 allows a close fit for the cable 332 passing therebetween, and hence desirably prevents or restricts any lateral displacement of the cable 332. Additionally, the reinforcement plate slot 378 is substantially aligned with the spacing between the bolt shank portions 392, 394 and further assists in preventing or restricting lateral movement of the cable portion 408 of the cable 332 passing therethrough.

Referring in particular to FIGS. 32 and 33, with the clamp jaws or arms 316, 318 in the closed position, only the lower jaw 318 has been shown as displaced from the open position (FIGS. 29–31). It is contemplated, that either or both jaws 316,318 are flexible and displaceable by tightening of the nuts 324, 326 to grip the bracing cable 332. Moreover, a reinforcement plate or the like may efficaciously be provided in conjunction with either or both jaws 316, 318, as needed or desired, to provide the desired rigidity. In one embodiment, the upper jaw 316 comprises a rigid material while the lower arm 318 comprises a flexible material, for example, by using a thicker upper jaw 316 and a thinner lower jaw 318.

In the illustrated embodiment of FIGS. 27–33, and as indicated above, each of the upper jaw holes 344, 346, each of the lower jaw holes 364, 366, and each of the reinforcement plate holes 384, 386 are spaced from one another in a predetermined manner which spaces the bolts 328, 330 from one another in a predetermined manner. Also, as indicated above, the holes 344, 364, 384 are aligned with one another and the holes 346, 366, 386 are aligned with one another and receive respective bolts 328, 330.

In the illustrated embodiment of FIGS. 27–33, each of the upper jaw holes 344, 346, each of the lower jaw holes 364, 366, each of the reinforcement plate holes 384, 386 and hence each of the bolts 328, 300 are arranged asymmetrically about the longitudinal axis 315, as shown in the top view of FIG. 29. In a modified embodiment, each of the upper jaw holes 344, 346 and/or each of the lower jaw holes 364, 366 and/or each of the reinforcement plate holes 384, 386 can efficaciously be arranged generally symmetrically about the longitudinal axis 315, as required or desired, giving due consideration to the goals of providing a strong clamping force and/or of achieving one or more of the benefits and advantages as disclosed, taught or suggested herein.

In the illustrated embodiment of FIGS. 27–33, the upper jaw holes 344, 346 are laterally spaced on opposite sides of the clamp longitudinal axis 315 and are also longitudinally spaced from one another along the general direction of the clamp longitudinal axis 315; the lower jaw holes 364, 366 are laterally spaced on opposite sides of the clamp longitudinal axis 315 and are also longitudinally spaced from one another along the general direction of the clamp longitudinal axis 315; the reinforcement plate holes 384, 386 are laterally spaced on opposite sides of the clamp longitudinal axis 315 and are also longitudinally spaced from one another along the general direction of the clamp longitudinal axis 315. Thus, the bolts 328, 330 are laterally spaced on opposite sides of the clamp longitudinal axis 315 and are also longitudinally spaced from one another along the general direction of the clamp longitudinal axis 315.

Advantageously, the lateral spacing between the bolts 328, 330 permits the bracing cable 332 to pass between the bolt shank portions 392, 394 in a snug or close tolerance fit, and prevents undesirable lateral movement of the cable 332 when gripped by the clamp jaws 316, 318 (FIGS. 32 and 33). Moreover, and advantageously, the longitudinal spacing between the bolts 328, 330 permits the clamping force to be distributed over the length of the jaws 316, 318, and desirably provides a more reliable clamping force. Additionally, and advantageously, the longitudinal spacing between the bolts 328, 330 provides clearance space between the bolt heads 388, 390 and the between the washers 402, 404. In other embodiments, the upper jaw holes 344, 346, the lower jaw holes 364, 366, the reinforcement plate holes 384, 386, and hence the bolts may be efficaciously arranged in modified manners, as required or desired, giving due consideration to the goals of achieving one or more of the benefits and advantages as disclosed, taught or suggested herein.

In the exemplary embodiment, and referring in particular to FIG. 29 with the clamp arms or jaws 316, 318 in the open position, an imaginary line 410 passing generally through the centers of the bolts 328, 330 or through the centers of the upper jaw holes 344, 346 or through the centers of the lower jaw holes 364, 366 or through the centers of the reinforcement plate holes 384, 386 forms an angle θ with the clamp longitudinal axis 315. Stated differently, the projections of the lines 315 and 410 on a plane parallel to the lower jaw 318, upper jaw distal portion 336 or the reinforcement plate flat portion 375 form an angle θ or intersect at an angle θ.

Referring in particular to FIG. 29, the angle θ is preferably about 30°. In another embodiment, the angle θ is in the range from about 25° to about 35°. In yet another embodiment, the angle θ is in the range from about 15° to about 45°. In yet another embodiment, the angle θ is 90° (that is, the bolts 328, 330 are not longitudinally spaced) or less.

In the illustrated embodiment of FIGS. 27–33, the cable clamp 314 comprises two bolts 328, 330 which when tightened via respective nuts 324, 326 provide the clamping mechanism for the jaws 316, 318. In other embodiments, more than two nut-bolt combinations may be efficaciously used to provide the clamping force, as required or desired, giving due consideration to the goals providing a suitably strong clamping force and/or of achieving one or more of the benefits and advantages as disclosed, taught or suggested herein. Moreover, other suitable fastening means, such as, for example, other pins, locks, clamps and the like, in combination with or independently of the bolts 328, 330, may be used to urge or bias the clamp jaws 316, 318 towards one another, as needed or desired.

Referring in particular to FIGS. 29–33, each bolt 328, 330 has a respective longitudinal axis 412, 414. It should be noted that the bolt longitudinal axis 412 generally coincides with the longitudinal axes of the upper jaw hole 344, lower jaw hole 364 and reinforcement plate hole 384, and the bolt longitudinal axis 414 generally coincides with the longitudinal axes of the upper jaw hole 346, lower jaw hole 366 and reinforcement plate hole 386.

Still referring in particular to FIGS. 29–33, the bolt longitudinal axes 412, 414 are generally perpendicular to the clamp longitudinal axis 315. Stated differently, the projections of the bolt longitudinal axes 412, 414 and clamp longitudinal axis 315, on a common plane that is not perpendicular to either of the axes 412, 414, 315, intersect perpendicularly or at 90°. Additionally, the bolt longitudinal axes 412, 414 are generally perpendicular to planes parallel to the lower jaw 318, upper jaw distal portion 336 and the reinforcement plate flat portion 375.

Still referring in particular to FIGS. 29–33, and more particularly to FIG. 32 with the clamp 314 in the closed position, the bolt longitudinal axes 412, 414 are generally perpendicular to the bracing cable portion 408 gripped between the jaws 316, 318. Stated differently, the projections of the bolt longitudinal axes 412, 414 and the bracing cable portion 408 gripped between the jaws 316, 318, on a common plane that is not perpendicular to either of the axes 412, 414 and the bracing cable portion 408 gripped between the jaws 316, 318, intersect perpendicularly or at 90°.

Preferably, the bracing cable 332 (see, for example, FIGS. 29–33) comprises (7×19) strand core pre-stretched galvanized aircraft cable. In other embodiments, the cable 332 may comprise other bracing cables and the like with efficacy, as required or desired, giving due consideration to the goals of providing suitably strong bracing means and/or of achieving one or more of the benefits and advantages as disclosed, taught or suggested herein.

The bracing cable 332 (see, for example, FIGS. 29–33) can be efficaciously dimensioned in various manners depending on the particular application. For example, the bracing cable 332 can have a diameter of about 3.18 mm (⅛ inch), 4.76 mm (³⁄₁₆ inch), 6.35 mm (¼ inch), among other suitable diameters.

As discussed above, and referring to FIGS. 29–33, the cable clamp 314 is configured such that the bracing cable 332 can pass between the bolt shank portions 392, 394 and/or the reinforcement plate slot 378 in a snug or close tolerance fit. Advantageously, this facilitates in unwanted lateral movement of the cable portion 408. In a modified embodiment, the cable clamp 314 can advantageously be used to accommodate multiple sizes of cables. For example, if the clamp 314 is configured to receive a cable 332 having a diameter of 6.35 mm (¼ inch) in a snug or close tolerance fit (that is, a maximum design limit), it may also be used with cables of smaller diameters, such as, for example, 3.18 mm (⅛ inch), 4.76 mm (³⁄₁₆ inch), 6.35 mm (¼ inch) or other.

One advantage of the cable clamp 314 of the invention is that it is easy to handle and install, thus allowing for efficient use. Another advantage of the cable clamp 314 of the invention is that it is compact. Yet another advantage of the cable clamp 314 of the invention is that it is inexpensive to manufacture, as has been discussed in greater detail above.

Figure 34:
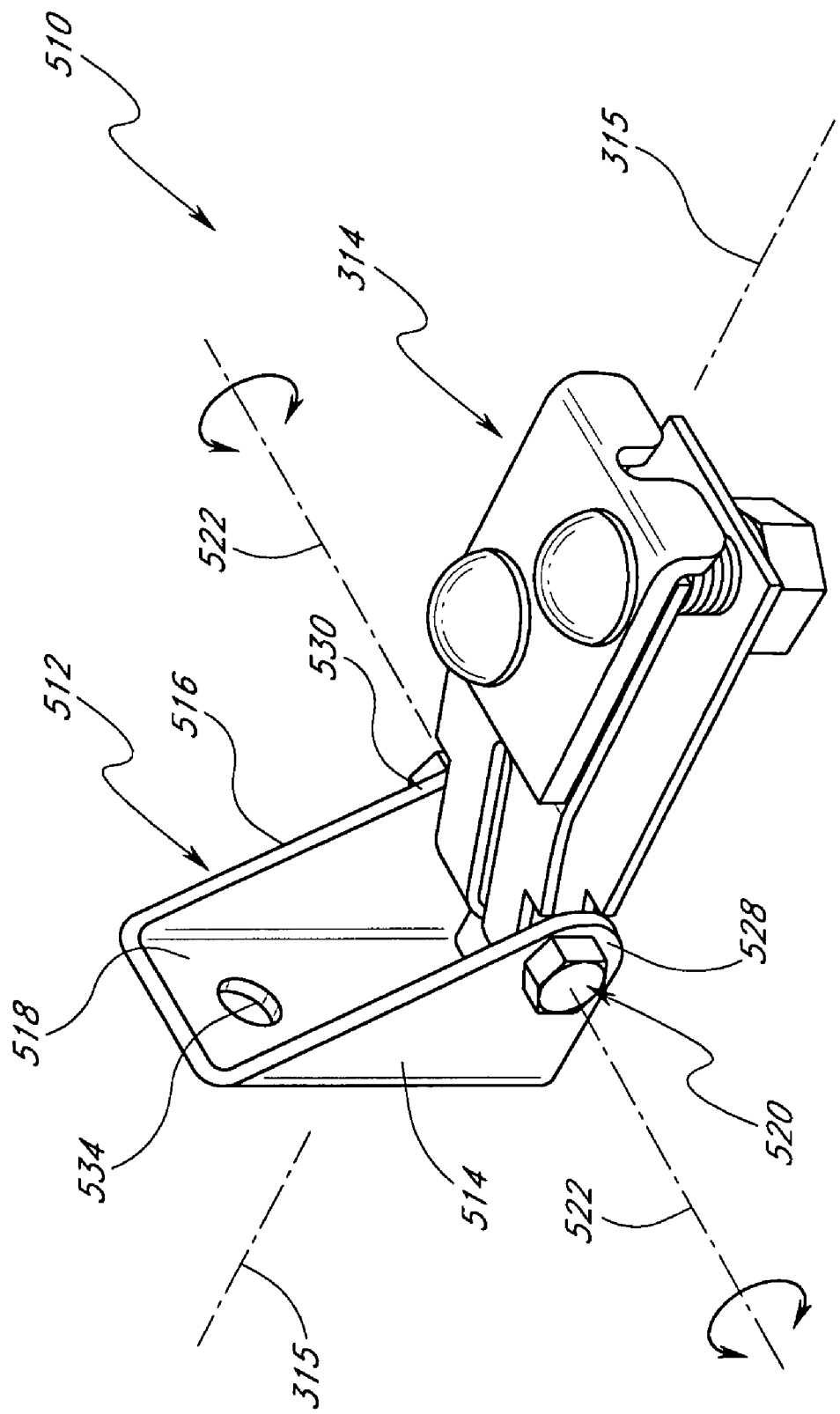
FIG. 34 is a perspective view of a cable sway brace clamp and yoke connector assembly having features and advantages in accordance with one embodiment of the invention.
Figure 35:
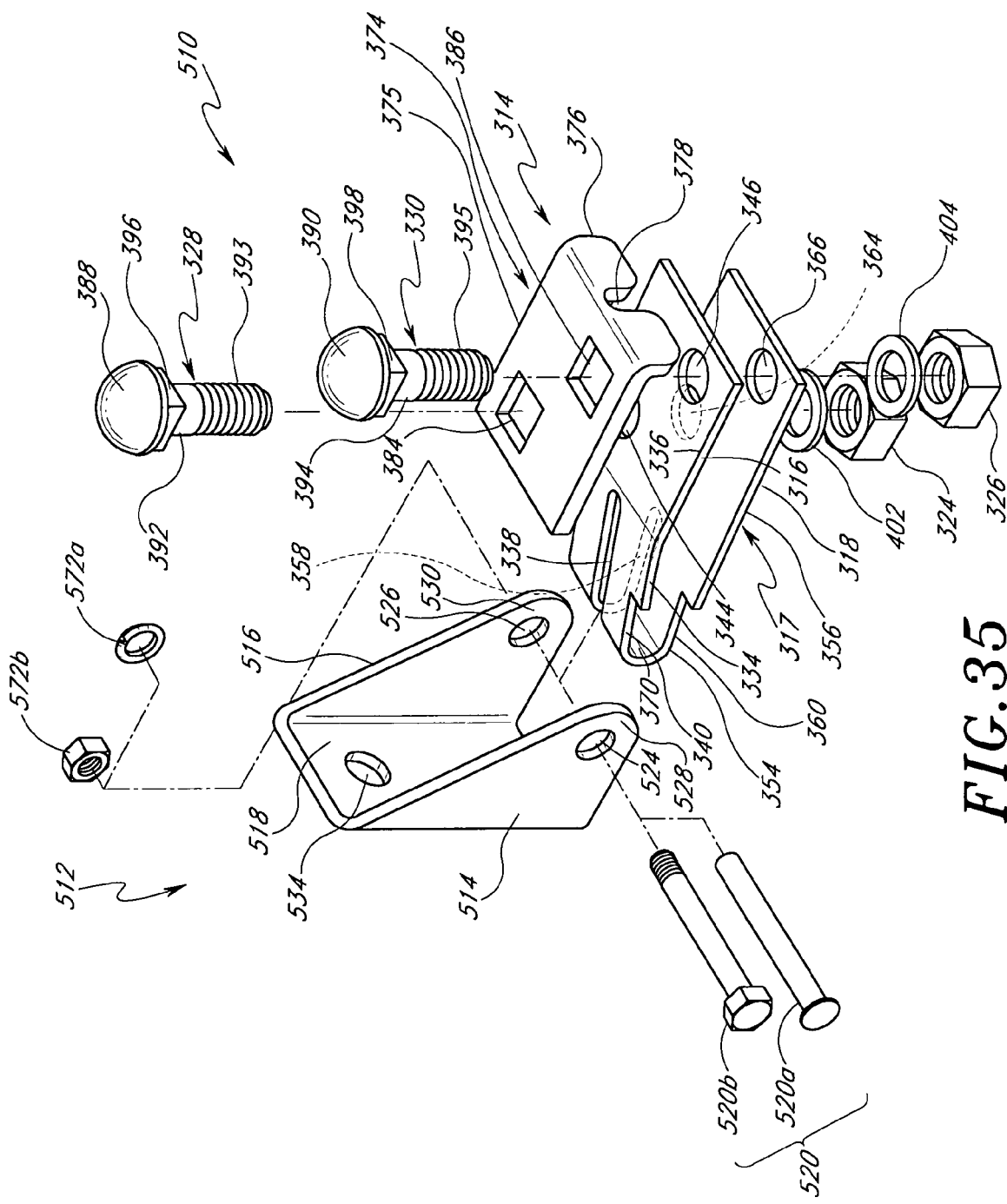
FIG. 35 is an exploded perspective view of the assembly of FIG. 34.

FIGS. 34 and 35 show different perspective views of a cable sway brace assembly or system 510 generally comprising a yoke member 512 and the cable sway brace clamp 314. As discussed further below, the yoke 512 is attachable to a surface and in conjunction with the clamp 314 and other components is used to support loads suspended below ceilings, floors, beams and the like, against sway and seismic disturbances. These loads may include pipes, ducts, sprinkler systems, fans, air-conditioners, electrical cables, communication lines, among others.

In the illustrated embodiment of FIGS. 34 and 35, the yoke 512 and clamp 314 are pivotably, rotatably or swivelably attached to one another via a connector pin 520 the longitudinal axis of which generally defines a rotation, pivot or swivel axis 522. The pin 520 mechanically connects or couples the clamp 314 and the yoke 512.

In the illustrated embodiment of FIGS. 34 and 35, the clamp longitudinal axis 315 is oriented substantially perpendicular to the rotation axis 522. In other words, the projections of the clamp longitudinal axis 315 and rotation axis 522, on a common plane that is not perpendicular to either of the axes 315, 522 intersect perpendicularly or at 90°.

As best illustrated in FIG. 35, in accordance with one embodiment, the clamp 314 and the yoke 512 are permanently or quasi-permanently mechanically connected to one another by a rivet 520a and a clinched rivet head 572a. Also as best illustrated in FIG. 35, in accordance with another embodiment, the clamp 314 and the yoke 512 are removably or releasably mechanically connected to one another by a bolt or screw 520b and a nut 572b. In a modified embodiment, the nut 572b is used in combination with a clinched rivet head or the like to connect to the bolt 520b and hence provide a permanent or pseudo-permanent mechanical connection between the clamp 314 and yoke 512. In other embodiments, the clamp 314 and the yoke 512 may be efficaciously connected buy other permanent or temporary attachment fasteners, as required or desired, giving due consideration to the goals of providing a secure attachment and/or of achieving one or more of the benefits and advantages as disclosed, taught or suggested herein.

Referring in particular to FIGS. 34 and 35, the yoke member 512 generally comprises a pair of side walls 514, 516 spaced by an end wall 518. Preferably, the side walls 514 and 516 are generally parallel to one another and generally perpendicular to the end wall 518. In other embodiments, the walls 514, 516, 518 may be efficaciously arranged in modified manners, as required or desired, giving due consideration to the goals of providing suitable means for connecting the clamp 314 to a surface and/or of achieving one or more of the benefits and advantages as disclosed, taught or suggested herein.

In the illustrated embodiment of FIGS. 34 and 35, the side walls 514, 516 are generally triangular in shape. In other embodiments, the one or both of the side walls 514, 516 may be configured in modified manners with efficacy, as required or desired, giving due consideration to the goal of achieving one or more of the benefits and advantages as disclosed, taught or suggested herein. For example, one or both of the side walls 514, 516 may be configured in other suitable polygonal or non-polygonal shapes.

In the illustrated embodiment of FIGS. 34 and 35, and as shown in FIG. 35, each side wall 514, 516 has a respective through hole 524, 526 with the holes 524, 526 being substantially aligned with one another. The yoke holes 524, 526 are further aligned with the clamp passage 370 and together receive the connector pin 520 which hingedly couples the yoke 512 and cable clamp 314. Respective ends or portions 528, 530 of the respective side walls 514, 516 are generally received within the pair of clamp slots 340, 360 and 342, 362 (see FIG. 29), respectively, thus desirably providing for a compact assembly 510.

In the illustrated embodiment of FIGS. 34 and 35, the end wall 518 is generally rectangular in shape. In other embodiments, the end wall 518 may be configured in modified manners with efficacy, as required or desired, giving due consideration to the goal of achieving one or more of the benefits and advantages as disclosed, taught or suggested herein. For example, the end wall 518 may be configured in other suitable polygonal or non-polygonal shapes.

In the illustrated embodiment of FIGS. 34 and 35, the end wall 518 has a through hole 534. As discussed below, in use, the hole 534 receives an anchor bolt, stud, pin, screw or the like which allows the end wall 514, and hence the yoke 512 and clamp assembly 510, to be connected to a desired surface of a structure, such as that of a ceiling, beam, floor or wall.

The retrofit cable clamp-connector assembly 310 (FIGS. 27–33) and the cable clamp-connector assembly 510 (FIGS. 34–35) can be used in various applications to support loads suspended from or below a structure against adverse sway and seismic disturbances. Certain exemplary embodiments of the use of the retrofit cable clamp-connector assembly 310 and the cable clamp-connector 510 are described now with reference to FIGS. 36–38.

Figure 36:
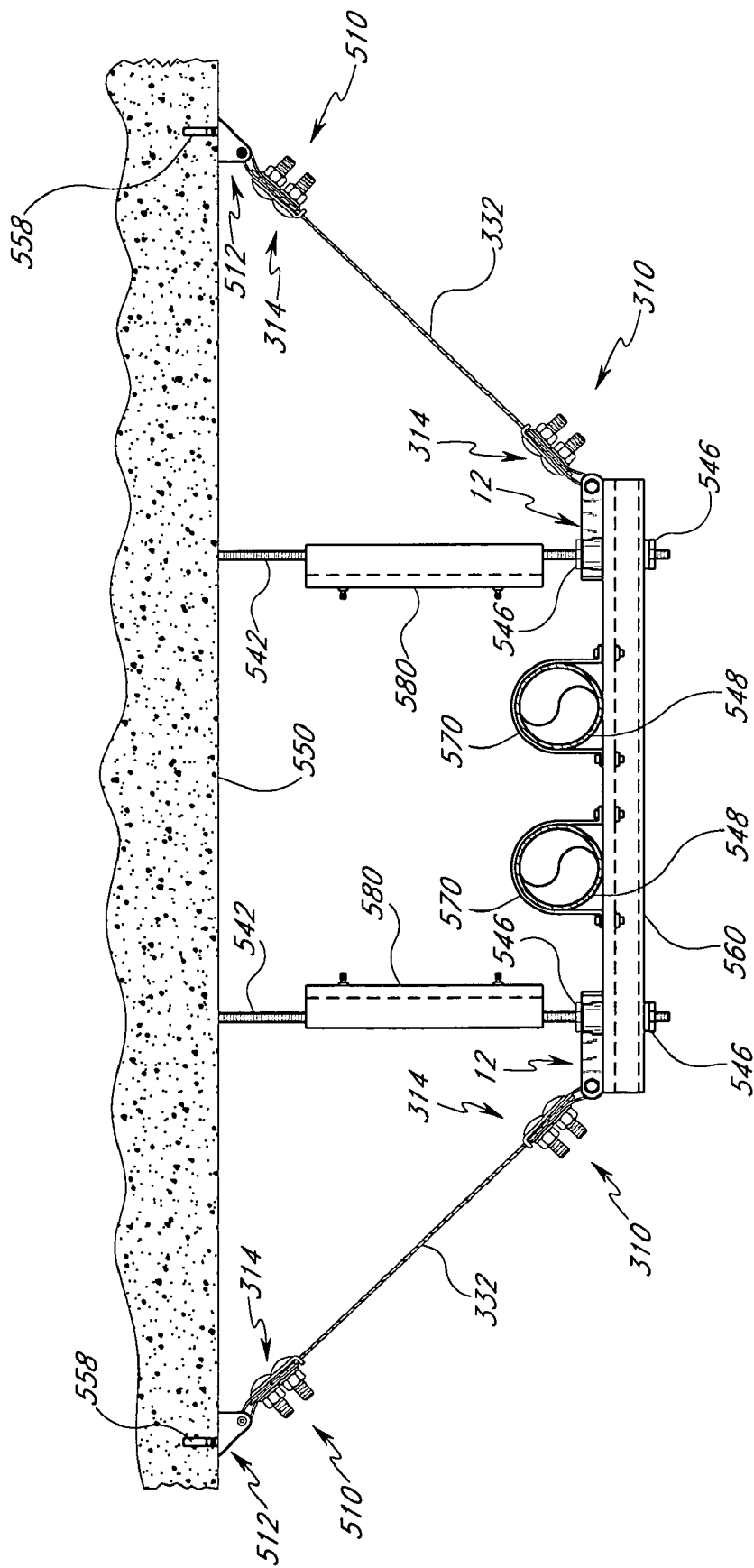
FIG. 36 is a simplified view showing the assemblies of FIGS. 27 and 34 in use supporting a plurality of pipes suspended below a structure in accordance with one embodiment of the invention.

FIG. 36 is a simplified view in accordance with one embodiment, showing the installation of a pair of retrofit cable clamp-connector assemblies 310 and a pair of cable clamp-connector assemblies 510 for supporting a load such as one or more pipes 548 below a structure 550. A pair of threaded support rods 542 extend from the structure 550 and are engaged with or connected to a trapeze type hanger 560, as known in the art. The hanger 560 supports the pipes 548 which are seated on and secured to the hanger 560 by respective holders 570. Optionally, rod stiffener assemblies 580 are utilized to provide enhanced strength and rigidity to the installation.

Referring to the illustrated embodiment of FIG. 36, the retrofit connectors 12 of respective clamp-connector assemblies 310 receive respective rods 542 within respective cavities 30 (see, for example, FIG. 1) formed by each pair of interlocking arms 16, 18 (see, for example, FIG. 1) and each retrofit connector 12 is secured to the hanger 560 by a pair of pre-existing nuts 546 on each of the rods 542. The cable clamps 314 of respective clamp-connector assemblies 310 are connected to respective ends of respective cables 332, as has been described above.

Still referring to the illustrated embodiment of FIG. 36, the other respective ends of respective cables 332 are connected to respective cable clamps 314 of respective assemblies 510. The yokes 512 of respective seismic assemblies 510 are secured to the structure 550 by respective anchors, bolts or screws 558 or the like.

FIG. 37 is a simplified view in accordance with one embodiment, showing the installation of a pair of retrofit cable clamp-connector assemblies 310 and a pair of cable clamp-connector assemblies 510 for supporting a load such as one or more pipes 548 below a structure 550. A threaded support rod 542 extends from the structure 550 and is engaged with or connected to a trapeze type hanger 560, as known in the art. The hanger 560 supports the pipe 548 which is seated on and/or secured to the hanger 560. Optionally, a rod stiffener assembly 580 is utilized to provide enhanced strength and rigidity to the installation.

Referring to the illustrated embodiment of FIG. 37, the retrofit connectors 12 of respective clamp-connector assemblies 310 are stacked one on top of the other with their cavities 30 (see, for example, FIG. 1) aligned. The rod 542 is received within the two cavities 30 (see, for example, FIG. 1) formed by each pair of interlocking arms 16, 18 (see, for example, FIG. 1) and the retrofit connectors 12 are secured to the hanger 560 by a pair of pre-existing nuts 546 on the rod 542. The cable clamps 314 of respective clamp-connector assemblies 310 are connected to respective ends of respective cables 332, as has been described above.

Still referring to the illustrated embodiment of FIG. 37, the other respective ends of respective cables 332 are connected to respective cable clamps 314 of respective assemblies 510. The yokes 512 of respective seismic assemblies 510 are secured to the structure 550 by respective anchors, bolts or screws 558 or the like.

FIG. 38 is a simplified view in accordance with one embodiment, showing the installation of a pair of retrofit cable clamp-connector assemblies 310 and a pair of cable clamp-connector assemblies 510 for supporting a load such as a pipe 548 below a structure 550. A threaded support rod 542 extends from the structure 550 and is engaged with or connected to a clevis hanger 552, as known in the art, which supports the pipe 548. The hanger 552 generally comprises a lower portion 552a in which the pipe 548 is received and is connected by a cross-bolt spacer 552b to an upper portion 552c of the hanger 552 in which an end of the rod 542 is received. Optionally, a rod stiffener assembly 580 is utilized to provide enhanced strength and rigidity to the installation.

Referring to the illustrated embodiment of FIG. 38, the retrofit connectors 12 of respective clamp-connector assemblies 310 are stacked one on top of the other with their cavities 30 (see, for example, FIG. 1) aligned. The rod 542 is received within the two cavities 30 (see, for example, FIG. 1) formed by each pair of interlocking arms 16, 18 (see, for example, FIG. 1) and the retrofit connectors 12 are secured to the hanger 552 by a pair of pre-existing nuts 546 on the rod 542. The cable clamps 314 of respective clamp-connector assemblies 310 are connected to respective ends of respective cables 332, as has been described above.

Still referring to the illustrated embodiment of FIG. 38, the other respective ends of respective cables 332 are connected to respective cable clamps 314 of respective assemblies 510. The yokes 512 of respective seismic assemblies 510 are secured to the structure 550 by respective anchors, bolts or screws 558 or the like.

Though the embodiments of FIGS. 36–38 show the load suspended below a generally horizontal surface with the clamp-yoke assemblies 510 attached thereto, those of ordinary skill in the art will appreciate that the assemblies 510 may be efficaciously attached to other surfaces, as needed or desired. For example, one or more of the assemblies 510 may be attached to a generally vertical beam or wall or to an inclined surface.

The skilled artisan will also appreciate that in the situation that a retrofit connection is not needed or desired, the clamp-yoke assemblies 510 may be substituted for the retrofit connector-clamp assemblies 310 in FIGS. 36–38. Also, the retrofit connector 312 and other retrofit connectors of the preferred embodiments may be utilized in conjunction with a new, that is, not pre-existing, installation with efficacy, as needed or desired. This facilitates, for example, in adjustment, removal, and/or replacement of the retrofit connector and/or of the installation.

Also, as the skilled artisan will appreciate, that though the embodiments of FIGS. 36 38 refer to supporting one or more pipes, other loads may be efficaciously supported in conjunction with any of the preferred embodiments, as needed or desired. These include, without limitation, ducts, sprinkler systems, fans, air-conditioners, heaters, electrical cables, communication lines, and the like, among others.

Figure 39:
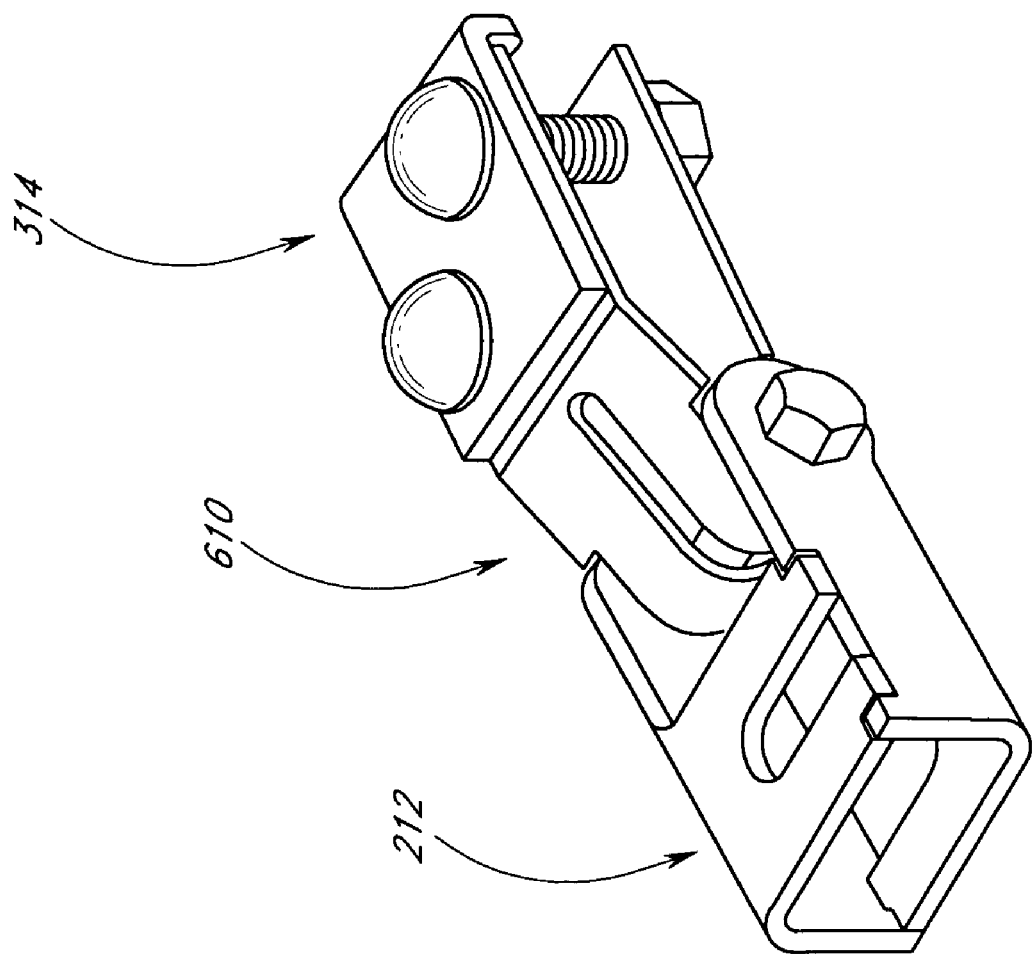
FIG. 39 is a perspective view of a cable sway brace clamp and interlocking swivel connector assembly having features and advantages in accordance with another embodiment of the invention.

FIG. 39 illustrates another embodiment of a seismic assembly 610 comprising the retrofit connector 212 and the cable clamp 314 pivotably attached to one another. The retrofit connector 212 has been described in detail above with reference to FIGS. 21–26 and the cable clamp 314 has been described in detail with reference to FIGS. 27–33. The skilled artisan will readily appreciate that one or more of the assemblies 610 can be used in a manner similar to the assemblies 310 to support a load as described above in conjunction with FIGS. 36–38.

While the components and techniques of the invention have been described with a certain degree of particularity, it is manifest that many changes may be made in the specific designs, constructions and methodology herein above described without departing from the spirit and scope of this disclosure. It should be understood that the invention is not limited to the embodiments set forth herein for purposes of exemplification, but is to be defined only by a fair reading of the appended claims, including the full range of equivalency to which each element thereof is entitled.

What is claimed is:

1. A method of attaching a connector to a rod, comprising:
   positioning a first arm of said connector proximate to said rod so that a first curved wall of said first arm generally circumscribes a portion of said rod, said first curved wall being adjacent a slot on said first arm;
   rotating said connector in a first direction about a generally longitudinal axis of said connector;
   pivoting a second arm of said connector about a pivot axis towards said first arm, said second arm having a second curved wall adjacent a slot on said second arm; and
   rotating said connector in a second direction generally opposite to said first direction about said longitudinal axis so that said arms mate and said slots of said arms are substantially aligned to form a passage comprising said curved walls which receives said rod with said slots being positioned intermediate said rod and said pivot axis.

2. The method of claim 1, wherein said method further comprises tightening a pre-existing nut on said rod to secure said connector.

3. The method of claim 1, wherein said method further comprises attaching said connector to a brace.

4. The method of claim 3, wherein attaching said connector to a brace comprises using a clamp coupled to said connector.

5. The method of claim 1, wherein said method further comprises retrofittingly attaching said connector to said rod.

6. The method of claim 5, wherein retrofittingly attaching said connector to said rod comprises attaching said connector to an already existing installation without requiring disassembly of said installation.

7. The method of claim 6, wherein said rod extends from a support surface and is attached to a hanger supporting a load.

8. The method of claim 1, wherein said first arm is pivotable.

9. The method of claim 1, wherein each of said first and second arms comprises a second slot and said second slots are substantially aligned when said arms mate.

10. A method of attaching a connector to a rod, comprising:
    positioning a first arm of said connector proximate to said rod so that a first wall of said first arm is adjacent to said rod, said first arm comprising a first slot and a second slot;
    angling said connector in a first direction about a generally longitudinal axis of said connector;
    positioning a second arm of said connector adjacent to said first arm, said second arm comprising a second wall; a first slot and a second slot; and
    angling said connector in a second direction generally opposite to said first direction about said longitudinal axis such that respective first and second slots of said arms interlock to form a passage generally circumscribed by said walls which receives said rod, said rod being interposed between said first slots and said second slots when said rod is received in said passage.

11. The method of claim 10, wherein said method further comprises pivoting said second arm to engage said first arm.

12. The method of claim 10, wherein said method further comprises tightening a nut to secure said connector to said rod.

13. The method of claim 10, wherein said method further comprises retrofittingly attaching said connector to said rod.

14. The method of claim 10, wherein said method further comprise providing an attachment device coupled to said connector for attaching said connector to a brace.

15. The method of claim 14, wherein said method further comprises connecting said attachment device to said brace.

16. The method of claim 15, wherein said method further comprises connecting said brace to a support surface.

17. The method of claim 16, wherein said rod extends from said support surface.

18. A method of attaching a connector to a support element of an installation, comprising:
    providing a first arm comprising a first curved section flanked by a first slot and a second slot of said first arm;
    providing a second arm comprising a second curved section flanked by a first slot and a second slot of said second arm; and
    manipulating said arms adjacent to said support element to form an opening generally circumscribed by said first and second curved sections which receives said support element without requiring disassembly of said installation, whereby said slots of said first arm are interlocked with said second arm and receive selected portions of said second arm therein and said slots of said second arm are interlocked with said first arm and receive selected portions of said first arm therein.

19. The method of claim 18, wherein manipulating said arms comprises pivoting at least one of said arms about a pivot axis of said connector.

20. The method of claim 19, wherein said pivot axis is substantially perpendicular to a longitudinal axis of said support element.

21. The method of claim 18, wherein said method further comprises angling said connector about a longitudinal axis of said connector.

22. The method of claim 18, wherein said method further comprises tightening one or more pre-existing nuts of said installation to secure said connector.

23. The method of claim 18, wherein both of said arms are pivotable.

24. The method of claim 18, wherein each of said slots has a base face and when said slots interlock said base face of said first slot of first arm and said base face of said first slot of said second arm abut against one another, and said base face of said second slot of said first arm and said base face of said second slot of said second arm abut against one another.

* * * * *

UNITED STATES PATENT AND TRADEMARK OFFICE
CERTIFICATE OF CORRECTION

PATENT NO. : 7,219,862 B2
APPLICATION NO. : 11/058960
DATED : May 22, 2007
INVENTOR(S) : Richard W. Heath It is certified that error appears in the above-identified patent and that said Letters Patent is hereby corrected as shown below:

At column 1, line 8, delete "6,896226" and insert --6,896,226--, therefor.

At column 13, line 12, delete "buy" and insert --by--, therefor.

At column 16, line 50, after "retrofitting" insert --.--.

At column 17, line 25 (Approx.), delete "buy" and insert --by--, therefor.

At column 28, line 46, delete "188f" and insert --188f'--, therefor.

At column 34, line 18, delete "buy" and insert --by--, therefor.

At column 34, line 51, after "$L_{213}$" delete "(" and insert --is about 3.18 cm (--, therefor.

At column 35, line 6, after "(3/8" delete "inch" and insert --inches)--, therefor.

At column 39, line 22, after "connector 12" delete "14".

At column 39, line 22, delete "buy" and insert --by--, therefor.

At column 44, line 14, before "between" delete "the".

At column 46, line 17, delete "buy" and insert --by--, therefor.

At column 48, line 47, delete "36 38" and insert --36-38--, therefor.

At column 49, line 56, in Claim 10, delete "wall;" and insert --wall,--, therefor.

UNITED STATES PATENT AND TRADEMARK OFFICE
CERTIFICATE OF CORRECTION

PATENT NO. : 7,219,862 B2
APPLICATION NO. : 11/058960
DATED : May 22, 2007
INVENTOR(S) : Richard W. Heath It is certified that error appears in the above-identified patent and that said Letters Patent is hereby corrected as shown below:

At column 50, line 13, in Claim 14, delete "comprise" and insert --comprises--, therefor.

Signed and Sealed this

Twenty-fifth Day of December, 2007

JON W. DUDAS
*Director of the United States Patent and Trademark Office*